United States Statutory Invention Registration [19]

[11] Reg. Number: H713

May et al. [43] Published: Nov. 7, 1989

[54] AUTOMATIC TARGET DETECTION AND RECOGNITION

[75] Inventors: Roger A. May, Longwood; Frank B. Link, Orlando, both of Fla.

[73] Assignee: The United States of America as represented by the Secretary of the Air Force, Washington, D.C.

[21] Appl. No.: 173,859

[22] Filed: Mar. 15, 1988

[51] Int. Cl.[4] ..... G06K 9/48

[52] U.S. Cl. ..... 364/517; 382/22

[58] Field of Search ..... 364/517, 516; 382/16, 382/22, 1

*Primary Examiner*—Thomas H. Tarcza
*Assistant Examiner*—Linda J. Wallace
*Attorney, Agent, or Firm*—Bernard E. Franz; Thomas L. Kundert

[57] ABSTRACT

A segment labeler/extractor outputs segments of video data stored in Random Access Memory for feature extraction and classification as targets. This function is accomplished by labeling the segments of a video frame as the segments are stored in a mass segment memory, sorting the mass segment memory to extract individual segment data, and storing this data in a segment memory where it can be accessed by an algorithm processor. Included in the subject invention is a segment labeler which consists of a segment label filter, adjacent label filter, memory, and sorter. The inputs to the segment labeler are a segment designator discrete which is set for only pixels which are in segments and a segment boundary designation discrete which is set for only pixels which are in segments and on the perimeter of the segment. The output of the segment labeler is a unique group of labels which define each segment. The groups of labels are then passed on to a control processor and handed to a segment extractor upon request. The segment extractor which consists of memory stores the segment intensity, position, status and label for all pixels in time sequence for a frame of data. Segments are then extracted individually by matching all pixels which belong to the unique group of labels. Individual segments are then presented for post processing, eliminating processing of any unnecessary data.

3 Claims, 31 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

Target Recognizer Hardware Architecture

Signal Processing Architecture and Associated Candidate Algorithms

TARGET SCREENER SYSTEM DIAGRAM

3-D Pipeline Circuit

High Speed General Purpose Screener Post Processor

Target Recognizer Hardware Architecture

TARGET LABELER/MEMORIES CONCEPT DIAGRAM

Fig. 10 ADJACENT LABEL FILTER 184

ADJACENT LABEL EXAMPLE

ADJACENT SEGMENT NUMBER MEMORY/SORTER 186

ADJACENT SEGMENT NO. MEMORY

| Address j | XSN | GSN | EOD |
|---|---|---|---|
| 0 | 4 | 3 | 0 |
| 1 | 3 | 1 | 0 |
| 1 | 4 | 3 | 0 |
| 3 | 3 | 1 | 0 |
| 4 | 8 | 5 | 0 |
| 5 | 8 | 5 | 0 |
| 6 | d | d | 1 |

$G_n$ = SN Groups = (0), (1,3,4), (2)
(5,8), (6), (7)

d = don't care

ASN MAP RAM

| Address | Data Sort 1 | Data Sort 2 | Data Sort 3 ... Data Sort i |
|---|---|---|---|
| 0 | 1 | 0 | 0 |
| 1 | 0 | 1 | 0 |
| 2 | 0 | 0 | 1 |
| 3 | 0 | 1 | 0 |
| 4 | 0 | 1 | 0 |
| 5 | 0 | 0 | 0 |
| 5 | 0 | 0 | 0 |
| 7 | 0 | 0 | 0 |
| 8 | 0 | 0 | 0 |
| 9 | 0 | 0 | 0 |
| . | . | . | . |
| . | . | . | . |
| . | . | . | . |
| $2^n$ | 0 | 0 | 0 |

ASN MEMORY & ASN MAP RAM EXAMPLE

Fig. 14

SIMPLIFIED FLOW DIAGRAM SEGMENT SORTER

SEGMENT EXTRACTOR EXAMPLE

X = Appropriate data
d = don't care

MSM Data

| MSM Address | Status | Intensity | X | Y | SN | EOD | 1st Sort SNINMAP | SMA Address | 2nd Sort SNINMAP | SMB Address |
|---|---|---|---|---|---|---|---|---|---|---|
| 0-4 | X | X | 24-28 | 3 | 0 | 0 | ✓ | 0-4 | | 0-2 |
| 5-9 | X | X | 24-28 | 4 | 0 | 0 | ✓ | 5-9 | | |
| 10-14 | X | X | 24-28 | 5 | 0 | 0 | ✓ | 10-14 | | |
| 15-17 | X | X | 12-14 | 6 | 1 | 0 | 1st Unprocessed SN Start Next Sort | | ✓ | 0-2 |
| 18-25 | X | X | 21-28 | 6 | 0 | 0 | ✓ | 15-22 | | |
| 26-28 | X | X | 12-14 | 7 | 1 | 0 | | | ✓ | 3-5 |
| 29-36 | X | X | 21-28 | 7 | 0 | 0 | ✓ | 23-30 | | |
| 37-39 | X | X | 12-14 | 8 | 1 | 0 | | | ✓ | 6-8 |
| 40-50 | X | X | 21-31 | 8 | 0 | 0 | ✓ | 31-41 | | |
| 51-57 | X | X | 8-14 | 9 | 1 | 0 | | | ✓ | 9-15 |
| 58-68 | X | X | 21-31 | 9 | 0 | 0 | ✓ | 42-52 | | |
| 69 | X | X | 3 | 10 | 4 | 0 | | | ✓ | 16 |
| 70-71 | X | X | 4-5 | 10 | 3 | 0 | | | ✓ | 17-18 |
| 72-80 | X | X | 6-14 | 10 | 1 | 0 | | | ✓ | 19-25 |
| 81-91 | X | X | 21-31 | 10 | 0 | 0 | ✓ | 52-62 | | |
| 92 | X | X | 41 | 10 | 5 | 0 | | | 1st Unprocessed SN Start Next Sort | |
| 93 | X | X | 3 | 11 | 3 | 0 | | | ✓ | 26 |
| 94-104 | X | X | 4-14 | 11 | 1 | 0 | | | ✓ | 27-37 |
| 105-108 | X | X | 38-41 | 11 | 5 | 0 | | | | |
| 109 | X | X | 3 | 12 | 3 | 0 | LWOM | End Sort | ✓ | 38 |
| . | . | . | . | . | . | . | | | | |
| . | . | . | . | . | . | . | | | LWOM End Sort | |
| . | . | . | . | . | . | . | | | | |
| 159 | d | d | d | d | d | 1 | | | | |

Fig. 17

MASS TARGET MEMORY

AUTOMATIC TARGET DETECTION AND RECOGNITION

RIGHTS OF THE GOVERNMENT

The invention described herein may be manufactured and used by or for the Government of the United States for all governmental purposes without the payment of any royalty.

BACKGROUND OF THE INVENTION

The present invention relates generally to an automatic target detection and recognition, and more particularly to a target screener using a segment labeler/extractor with data from an electronic warfare sensor, such as FLIR imagery.

The complexity of modern military operations dictates the need for automatic target acquisition, recognition, and weapon designation to reduce operator workload, increase weapon kill probability, and increase the number of weapons fired in a short exposure time. In close air support and battlefield interdiction, target acquisition, recognition, and weapon designation must take place within the few seconds available in an environment where the pilot is flying nap-of-the-earth while he must avoid topological obstacles and air defense weapons. The pilot must be free to navigate and fly the aircraft. He should only be alerted after the weapon has been locked on to the target, at which time he may initiate or cancel the launch of the weapon.

In addition to the pilot workload, the physics of targets and backgrounds in the IR spectrum, the electronic limitations of scanned FLIR detectors, and enemy countermeasures such as smoke and flares dictate a need for image enhancement as part of the acquisition capability. Once acquired, there is also a need for target classification (e.g., tank versus armored personnel carrier (APC) versus clutter differentiation).

The FLIR imagery that must be examined for targets has a large signal bandwidth of approximately 5 to 10 megahertz. This imagery must be continuously processed in real time by the automatic target screener so that a target does not slip undetected through the field of view. Each new image requires a number of complex decomposition steps to determine if a target is present. This set of requirements yields a high operations rate which must be handled by the automatic target cuer hardware.

United States Patents of interest include U.S. Pat. Nos. 3,878,384; 3,139,319; 3,940,602 and 3,596,068. U.S. Pat. No. 3,878,384 discloses a logic circuit including digital memory and a computer for designating the class to which an unknown event or observation belongs among a plurality of possible classes. Also of general interest are U.S. Pat. No. 3,139,319 which discloses electronic circuitry for monitoring and recording data from a system having a plurality of monitoring variables; U.S. Pat. No. 3,940,602 which discloses a signal processing imager array featuring independent control of transfer gates; and U.S. Pat. No. 3,596,068 which discloses logic circuitry for automatically arranging patterns on the surface of a material in a manner which will require less material than previously used.

SUMMARY OF THE INVENTION

An object of the invention is to provide for a high speed apparatus and method of extracting closed video bodies into separable lists so that they can be conveniently processed by a general purpose computer.

The overall task objective was to develop automatic target recognition technology for application to a variety of weapon systems. More specifically, due to current concentration on all-weather armored warfare, the initial goal was to determine the algorithms and hardware necessary to automatically recognize tanks and designate weapons against them for a variety of airborne antiarmor weapon systems operating in the infrared spectrum.

The invention is directed to a segment labeler/extractor which outputs segments of video data stored in Random Access Memory (RAM) for feature extraction and classification as targets. This function is accomplished by labeling the segments of a video frame as the segments are stored in a mass segment memory, sorting the mass segment memory to extract individual segment data, and storing this data in a segment memory where it can be accessed by an algorithm processor. Included in the subject invention is a segment labeler which consists of a segment label filter, adjacent label filter, memory, and sorter. The inputs to the segment labeler are a segment designator discrete which is set for only pixels which are in segments and a segment boundary designation discrete which is set for only pixels which are in segments and on the perimeter of the segment. The output of the segment labeler is a unique group of labels which define each segment. The segments are then passed on to a control processor and handed to a segment extractor upon request. The segment extractor which consists of a mass segment memory, segment sorter and two segment memories stores the segment intensity, position, status and label for all pixels in time sequence for a frame of data.

The combination of elements of the subject invention perform the functions of extracting contiguous pixels of any size or shape representative of targets from a frame of data. The resultant data is sorted into a data list for each separable object.

An advantage is that the technique reduces the amount of data to be operated on by a factor of 10 to 100 thus increasing by the same factor the number crunching capability of the post processor (i.e. where target feature extraction and classification are performed). previous techniques require a processor at the end of a pipeline to operate on all data.

BRIEF DESCRIPTION OF THE DRAWING

FIG. 14 is a chart of an example for adjacent segment memory and adjacent segment number random access memory contents;

FIG. 17 is a chart of a segment extractor example;

DETAILED DESCRIPTION

The invention is incorporated in a navigation pod for a low-altitude navigation and targeting infrared for night (LANTIRN) system, the planned use of which is stated in a note in Aviation Week & Space Technology, Dec. 8, 1986, page 22.

The segment labeler/extractor is used to interface a pipeline video processor to a high speed algorithm processor so that feature extraction can be performed on individual segments which represent targets.

OBJECTIVE

The airborne weapon systems considered were for close air support and battlefield interdiction by both fixed and rotary wing aircraft, and rear area interdiction by fixed wing aircraft.

Specific objectives were to:

1. Develop image enhancement, prescreening, segmentation, feature extraction and classification algorithms to support automatic target cueing
2. Conceive, design and develop a general purpose, realtime target screening hardware subsystem capable of performing the algorithms on 10 MHz TV-format converted FLIR video
3. Create a data base and demonstrate the algorithmic set in the Orlando Image Processing Laboratory (IPL) with typical FLIR imagery of military targets and scenes
4. program the hardware to perform automatic target acquisition and classification.

APPROACH

Figure 1:
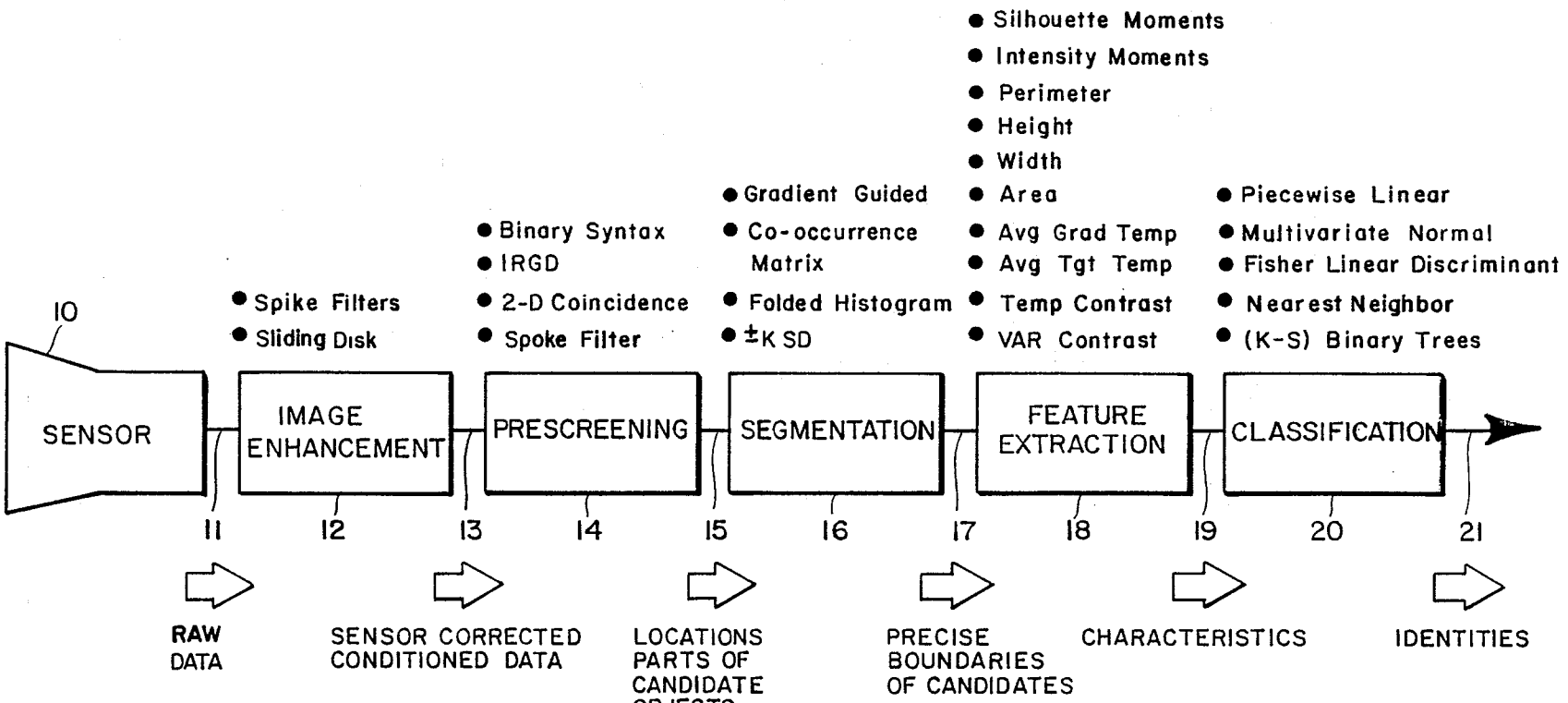
FIG. 1 is a block diagram showing a signal processing architecture and associated candidate algorithms.

The target detection and recognition capabilities sought for the target screener are achieved through a sequence of processing steps and attendant algorithms, as shown in FIG. 1 and discussed below. The sensor 10 provides raw input data on line 11.

The primary functions of Image Enhancement step 12 are twofold, to remove data dropout spikes from the data stream and to enhance the image contrast by removing high amplitude, low frequency image components (dc suppression). The output at point 12 is sensor corrected conditioned data.

A Prescreening function 14 identifies target candidate addresses in the frame of imagery. The prescreener threshold generally should be operated at a low value to provide a high detection probability with an attendant, if necessary, high internal false detection rate. A low contrast target cannot be detected following elements of algorithms if it is blocked by the prescreener.

The detailed prescreener requirements are both scenario and implementation dependent. If a search mode is used with a general purpose, lower operation rate processor, then the prescreener may require a low level classification capability based on robust, easily extracted features to reduce the false alarm rate, thereby reducing the computational load on the segmenter, feature extractor, and classifier. Concurrent use of shape/size and statistical-based prescreener appears to be most effective in reducing the false alarm rate while preserving detection probability. The output at point 15 provides data on locations of parts of candidate objects.

Segmentation step 16. Whereas the prescreener will find parts of candidate objects, the segmenter 16 must find most if not all of the object, separating it from its background. Accurate segmentation is perceived to be of ever-increasing importance as the requirements for classification are escalated from simple two class operation (target versus clutter) to multiple class operation (clutter, military vehicle, tracked vehicle, tanks, and trucks). The ability to extract robust features, which allows separation into these classes, will most probably be driven by the performance of the segmentation algorithm 16. The output at point 17 provides data on precise boundaries of candidates.

Feature Extraction step 18. Selected attributes of candidate objects, their boundaries, and local backgrounds are measured at this step. The set of features may differ at various stages within the target screener. That is, one set of features may be used to discriminate target, then the object must be classed as to the probability of being any of the following four subsets: tanks, other tracked vehicles, nontracked air defense weapons, and other wheeled vehicles. The output at point 19 provides characteristics.

Classification step 20 classifies the information, and the output at point 21 provides data relating to identities.

Hardware Design Work Tasks

Figure 2:
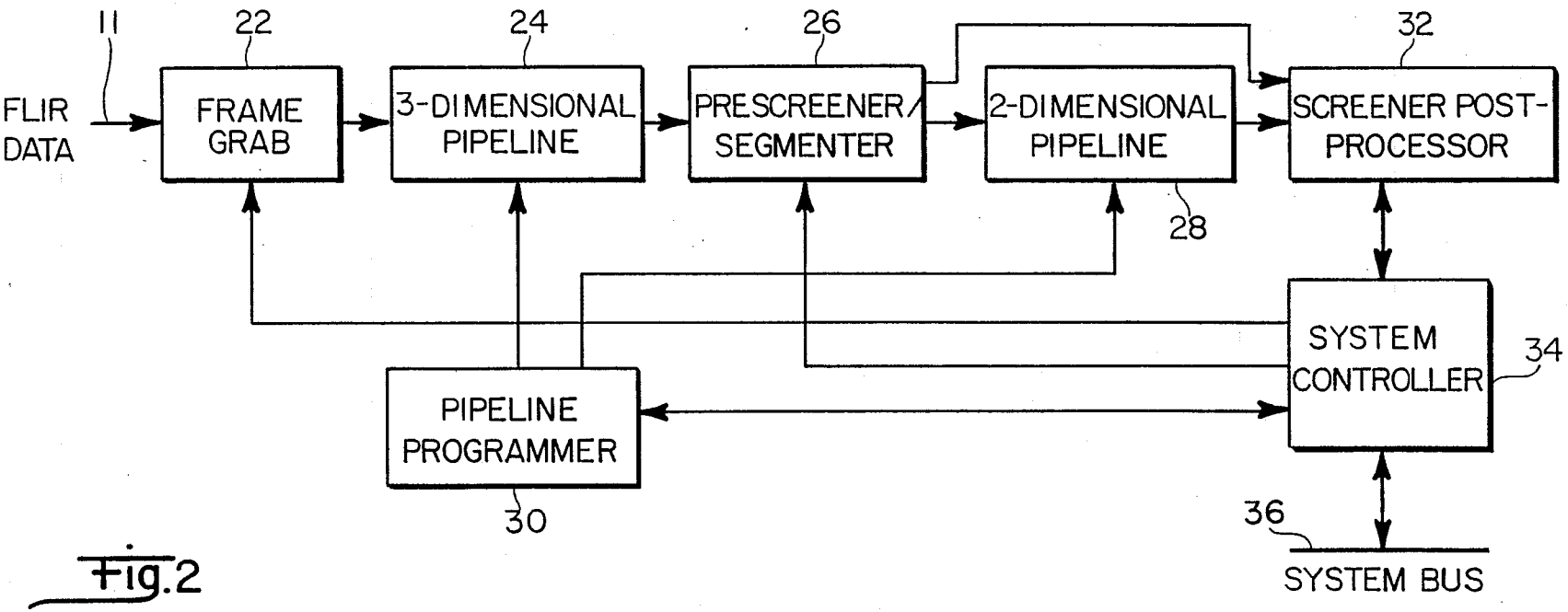
FIG. 2 is a block diagram of a target screener system.

FIG. 2 is a system block diagram of a target screener. A system analysis was performed to create function and mode control requirements. The results were used to formulate a time line that established function and speed requirements for each of the blocks. A description of each of the hardware subsystems and the associated work tasks follows.

A Frame Grab circuit 22 accepts 8-bit FLIR data from a digital scan converter and reformats the data for use by the target screener. The input to the frame grab circuit is the 180 FLIR lines spread over a 525-line interlaced TV format. The output format is one of two modes, detect mode or recognize mode. For the detect mode, 180 lines per field are output during each field time. For recognize mode, a 360-line frame is output in which the main and interlace lines are integrated into one continuous sequential frame. For example, a main line of value n is followed by an interlace line n, which is then followed by a main line of value n+1 and an interlace line of n+1.

The frame grab block 22 is also utilized to slow down the operating speed of the pipeline. This is accomplished by spreading the output data over the entire available frame time. In the detect mode, the 180 data lines are spread over 240 input TV line times. The resulting operating speed reduction considerably reduces the size and power consumption of the pipeline. Flexibility to operate on differing sample rates and different input formats were considered in the design.

Figure 3:
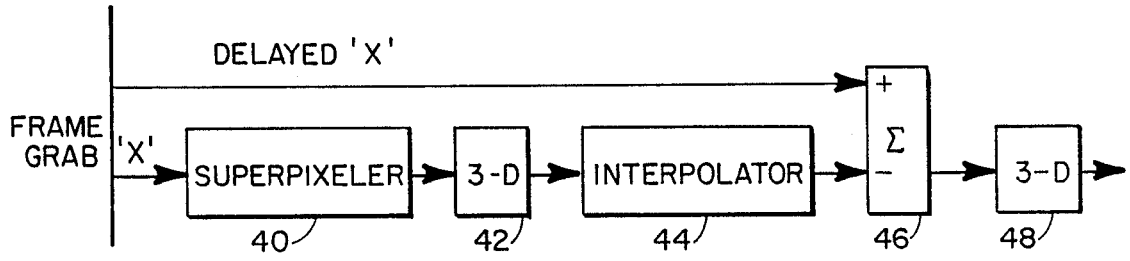
FIG. 3 is a block diagram of a three-dimensional pipeline circuit.

A 3-D pipeline circuit 24 is shown in more detail in FIG. 3. The output of the frame grab circuit is applied to a low frequency background removal circuit which effectively performs 2-D automatic low frequency gain limiting (2-D ALFGL). In this circuit, a superpixeler 40 should automatically reduce the bandwidth of the data by a factor of 9, through creating superpixels out of each 3-by-3 pixel neighborhood. Each 3-by-3 neighborhood is replaced by a single pixel, reducing the 360-line by 360-pixel data to 120-line by 120-pixel low frequency data. This reduces by a factor of three the 3-D stages needed to perform background normalization, and allows them to operate at only ⅓ original pixel rate, or at approximately 3 megapixels per second.

The 3-D stages 42 in the low frequency background removal circuit perform background normalization by effectively sliding a 2-D octagonal disc (analogous to a rolling ball) somewhat larger than the anticipated target size both above and below the 3-D video map represented by the bandwidth reduced input data. These low frequency data are re-expanded in circuit 42 by interpolation of a spatial resolution equivalent to the original input data, and subtracted in a circuit 46 from the original input data that have been delayed by an amount identical to the delay through the 3-D stage path. This delay is accomplished by merely accessing different data from the frame grab circuit. The output of the subtractor 46 has all of the low frequencies removed. This output is applied to the remainder of the pipeline for further processing.

The output of the subtractor 46 enters a noise filter consisting of a few 3-D stages 48. These stages remove singularities (single pixels whose value varies extremely from the local neighborhood), and are primarily intended to protect the processor from noise spikes and dropouts present in much of the existing FLIR data base which is presently available for test purposes. If the noise from the FLIR in the system is insignificant, as is anticipated, these initial 3-D stages are reprogrammed to perform hot-spot detection rather than noise filtering.

The next hardware subsystem, a prescreener/segmenter 26, applies one or more statistical prescreeners of the polynomial operator (mean, variance, skewness measures) or spatial filter 5-by-5 cross, Sobel, Laplacian filters) types. These prescreeners identify parts of potential targets in the scene; windows are established at those places in the video frame, and the enhanced FLIR data in each window are applied to digital comparators to quantize the features. The original input temperature data can then be sliced at different levels in each window. These thresholded data are input to 2-D stages for final pipeline processing.

The hardware task consisted of implementing the required algorithms in a flexible manner. For instance, a generalized binary operator was considered as a candidate for implementing a polynomial operator. This device can perform a sum of products of a 3-by-3 array with programmable coefficients. Other functions were analyzed to determine ways of combining several into one programmable function. Also certain parameters of some of the algorithms have to be programmable. An intensive effort was made to fold as much of those functions as possible into the 2-D pipeline.

A 2-D pipeline circuit 28 consists of hundreds of identical stages that are used to size features within the scene. provide shape feature extraction, perform template matching, and determine association of features. Feature association is performed either by requiring a particular feature to exist within the area of another feature, or requiring it to be within a certain distance (in terms of pixel dimensions) of the second feature.

The output of the 2-D state defines boundary areas to be examined by the postprocessor. The 2-D pipeline consists of 300 identical stages wired as one sequential pipeline. The operation of each stage is determined by a stored program received from the pipeline programmer.

A Pipeline Programmer 30 is used to load the 2-D and 3-D pipeline stages with the required programs. These programs change as a function of system mode and as a function of range. Therefore, the programmer has the capability of reprogramming the pipeline several times within each field. A great deal of flexibility had to be designed into this programmer to enhance the algorithms embedded in the pipeline. The size and number of different programs as well as the flexibility in defining algorithms were important capabilities to be determined by this task.

Figure 4:
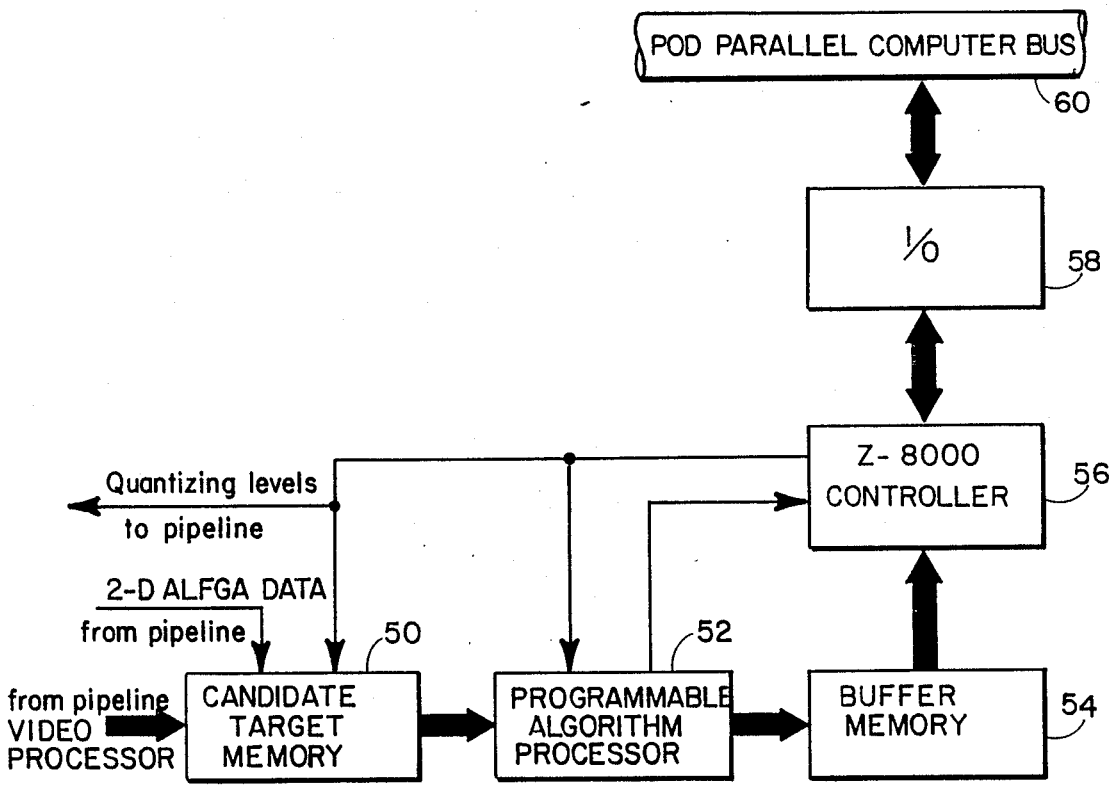
FIG. 4 is a block diagram of a high speed general purpose screener post processor.

A Screener Postprocessor 32 provides a flexible means of performing metrics not adaptable to the pipeline video processor, as well as target classification and prioritization. This high-speed general purpose signal processor consists of a candidate target memory, a programmable algorithm processor, and a buffer memory controlled by the pod parallel computer bus via a Z-8000 controller as illustrated in FIG. 4. The candidate target memory 50 receives detection and feature extraction/association reports from the pipeline video processor circuits 26 and 28 as X. Y position, the detection field position plus a notation of the various criteria the candidate target has met. As required by the detection/recognition algorithms, the candidate target memory 50 is also used to buffer 2-D automatic low frequency gain limited (AFLGL) data from the pipeline video processor in windows around candidate targets for further processing.

The programmable algorithm processor 52 is a 16-bit, fixed point, AMD-2901 bit-slice-based microprocessor programmed at the microcode level for efficient, high-speed performance of detection and recognition algorithms. The algorithms processor contains 2048 words, 64-bit wide of microcode storage providing direct microcoding of the highly repetitive portions of the screener postprocessor algorithms as well as general logical and arithmetic functions. The screener postprocessor performs redundancy removal and coarse pattern recognition for figure-of-merit (FOM) prioritization during detection mode as well as some metric measurements, classification, and target prioritization during recognition mode.

The programs to perform these functions reside in the program memory of the Z-8000 controller 56. This controller directs the operation of the algorithm operations and transfers a prioritized FOM list during detection mode, or a classified and prioritized target list during recognition mode, to the buffer memory 54.

The system controller 34 (FIG. 2) provides mode control and data presets to the target recognizer system. The controller receives the results of target classification operations from the screener post processor. The controller prioritizes the list and sends the results via the system bus to the main control computer.

The controller 34 receives mode control and preset data (e.g., range information) from the main control computer. The controller utilizes this information to determine which programs are to be used by the 2-D and 3-D pipeline stages. Commands are then sent to the pipeline programmer to identify the algorithms to be loaded by the programmer into the pipeline.

The controller 34 provides preset and mode control information to the frame grab and segmenter circuits and also receives statistical information from the segmenter, and evaluates these data.

Imaging System and FLIR Interface

The inputs to the target recognizer will include 10-bit digitized FLIR imagery from the digital scan converter. The imagery will be composed of odd and even fields, which are received at the rate of one every $16\frac{2}{3}$ milliseconds. Each field will contain 180 video lines with 360 horizontal digitized samples per line. In the stare-recognition mode, the odd and even field lines will be interlaced to provide full frames of imagery with 360 lines and 360 samples per line. Range information measured from the sensor to the ground area that is imaged will also be provided as an input from the algorithm processor.

Hardware Design Results

Using the results of system studies and algorithm simulation and analyses, a hardware system architecture was configured. This led to additional detailed hardware and algorithm studies to determine implementation feasibilities. Finally, detailed design of each of the building blocks was initiated and in some cases completed. The following is a description of architecture and a detailed description of each of the building blocks contained in the system. A system operating mode description will then show how the various blocks work together.

Figure 5:
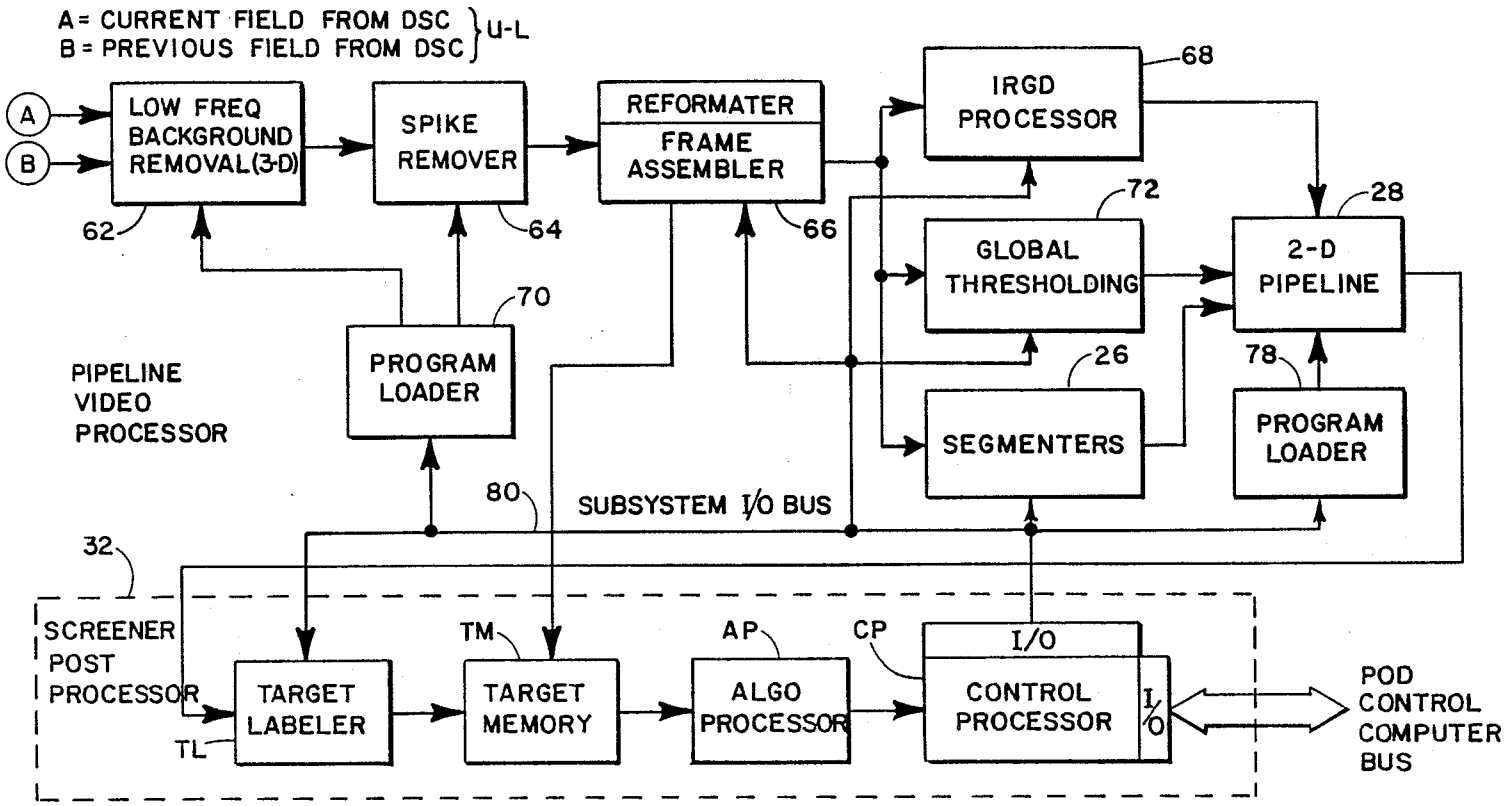
FIG. 5 is a block diagram of a target recognizer hardware architecture.

FIG. 5 illustrates the target recognizer (TR) hardware architecture. Signal inputs are received in horizontal scanned format from a digital scan converter. Bit serial, 10-bit byte parallel data is accepted at 30 Hz frame rate and 360 lines per frame. Two fields each with 180 lines spaced in a 2 to 1 interlace make up a frame. A line consists of 720 horizontal pixels.

The target recognizer communicates externally via a 16-bit parallel data bus. The target recognizer receives mode control command and data preset inputs and then outputs target metrics, figures of merit, and test results.

Referring to FIG. 5, all the blocks of the pipeline video processor except the program loaders operate on every pixel of data. Data flows from left to right down the pipeline with each pixel sample being operated on by the designated algorithm before being passed to the next block. The low frequency background removal circuit 62 and spike remover circuit 64 perform the image enhancement functions similar to two-dimensional high pass and low pass filtering. The reformatter 66 is a memory intensive block that accepts two interlaced fields and creates a high resolution noninterlaced frame.

The global thresholding block 72 slices the image enhanced data for use by the pipeline. The IRGD processor 68 and 2-D pipeline 28 perform prescreener functions. In a later operating mode, the 2-D pipeline 28 is reprogrammed to utilize segmenter data for performing recognition and some limited feature extraction algorithms. The program loaders 78 control the operation of the 2-D pipeline 28 and low frequency background remover 62 to account for mode changes and range variations.

The screener postprocessor 32 consists mainly of general purpose processing elements which operate in limited sets of data output from the pipeline video processor via the subsystem I/O bus 80. Only the target labeler TL and target memory TM are required to operate at the pixel data rates.

The target labeler TL examines each pixel output from the pipeline video processor and stores only those into the target memory TM which have been tagged by the 2-D pipeline 28 for further evaluation. The labeler TL also appends an identification onto each pixel stored, which is sufficient to sort the stored data into single target groupings. The algorithm processor AP works on a single target grouping to perform feature extraction and classification algorithms. A prioritized list of candidate targets with target figure of merits are then passed via the control processor CP to the pod control computer. The control processor CP serves as the target recognizers mode controller and controls internal and external communication.

Low Frequency Background Removal

The low frequency background removal circuit 62 performs 2-D automatic low frequency gain limiting. The circuit accepts 10-bit wide data in a 720 pixel (horizontal) by 180 pixel (vertical) form on a field-by-field basis from the digital scan converter. The processes which occur are:

1. Superpixeling
2. Low pass filer (3D stages)
3. Interpolation
4. Field delay
5. Number of lines/frame (180 or 360)
6. Number of program bits/stage (up to 48)
7. Number of lines per programmed subfield (20 to 39)
8. Number of subfields per frame (1 to 16)
9. Number of pixel delays/stage (1 line+2 to 8 pixel delays)
10. Order in which stored subfield programs can be sent to 2-D stages Once performance evaluation is complete, about 5 percent of the timing control logic can be eliminated by fixing the optional inputs.

Target Labelers/Memory

The target labeler/memories TM provides the capability to interface between the output of the 2-D pipeline 28 and the input to the algorithm processor AP. Data is received from the pipeline at the pixel rate with one bit plane of the output designating which bits are to be stored. Data output to the algorithm processor consists of the 2-D designated bits plus their X-Y coordinates and the reformatter outputs for the same X-Y coordinates. Format of the output is such that the pixels are collected into a single sequential list of all the pixels in a single target in recognize mode and in a single field in detect mode.

Figure 6:
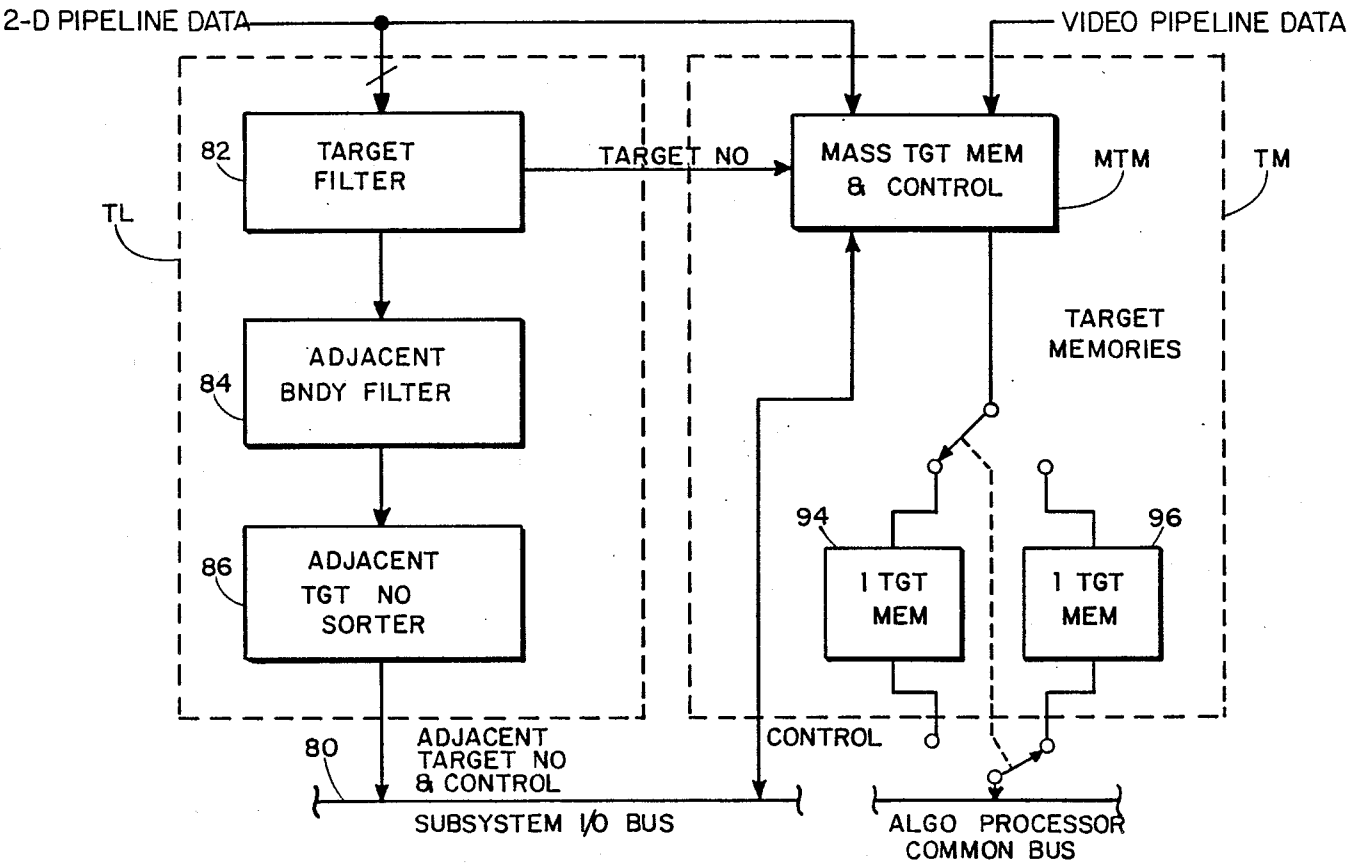
FIG. 6 is a block diagram of a target labeler/memories concept.

A functional diagram for the target labeler/memories concept is shown in FIG. 6. The target labeler TL accepts two bits of 2-D data and provides target number labels to be stored with the pipeline data. In addition the target labeler provides a list of adjacent target numbers that can be accessed from the subsystem I/O bus. The target memories TM accept 2-D and video pipeline data and target number labels. This data is then sorted to provide an ordered list of target points. The description of the building blocks of this concept are as follows.

The target labeler TL consists of the target filter 82. adjacent boundary filter 84, and adjacent target number sorter 86. The target filter accepts the 2-D target pixel designation bit and assigns target number labels based on three pixels of data from the previous frame line and two pixels from the present line. This forms a 2-by-3 mask as follows where A, B, C and D are previous pixels and XT is the present target pixel to be processed.

| | | | |
|---|---|---|---|
| C | B | A | previous line Y−1 |
| D | $X_T$ | | present line Y |

If previous target pixels exist at A, B, C, or D, this information and the adjacency to $X_T$ are logically processed to determine whether to assign a previous or new target to $X_T$.

A maximum of 512 target number labels can be assigned based on assigning an average of 6 per target for 64 targets maximum (384 maximum needed). The target number labels are provided to the target memories and the adjacent boundary filter for further processing.

The adjacent boundary filter accepts the 2-D target boundary designations bit and processes the target number label data, and determines which target number labels are adjacent (part of the same target area). This filter uses the following mask:

| | | | |
|---|---|---|---|
| | E | | previous line Y−1 |
| $X_{TB}$ | F | present | line Y |

If target boundary pixels E and $X_{TB}$ or F and $X_{TB}$ exist, and their target number labels are not equal, then they are adjacent target numbers belonging to the same single candidate target. This relationship is stored to later sort a single target data. Processing only target boundary pixels reduces the number of adjacent target numbers to two per target number label assigned.

The adjacent target number sorter consists of a memory to store a maximum of 768 adjacent target numbers (18 bits wide) and a hardware controller to sort the target number labels which define a single candidate target's data. The target number labels for each single candidate target are then transferred (via the subsystem I/O bus) to sort the target memory data.

A hardware controller was required to sort the adjacent target numbers to meet the system timing requirements. Neither the algorithm processor nor the Z-8000 controller 56 could sort this data within the timing constraints.

The Z-8000 controller 56 required 46 ms to set up the adjacent target number data in a lookup table for sorting one target number group. Each target number group required 1 ms to sort the look up table, hence 64 ms for 64 targets. This method was unacceptable because the initial 46 ms is in series with the time to process one frame's target data for feature extraction and classification, with 100 ms total available, not enough time remained for these later functions. Using the algorithm processor for the lookup table generation required only 6 ms, however, the hardware cost of this approach was an additional 6 K word bank switched RAM. The hardware controller was implemented at a cost of only about 10 additional MSI ICs and its processing time is in parallel with the target data processing time.

Target Memories

The target memories TM consist of a mass target memory MTM. two single candidate target memories 94 and 96 and a controller shown as part of block MTM. The mass target memory MTM provides storage for the 2-D and video pipeline data, target number labels and controller generated X, Y coordinates. The hardware controller in block MTM receives groups of adjacent target numbers from the Z-8000 controller 56 and sorts the mass target memory data for candidate targets data which are loaded into the single target memory. A hardware controller was required to sort the mass target memory data to meet the system timing requirements.

Two single target memories 94 and 96 were configured to allow parallel processing time for the loading of one single target memory during the algorithm processing of the other. The single target memories provide 2-D, video and X, Y coordinate data to the algorithm processor via the common bus.

Z-8000 Controller

System control over the target recognizer is provided by the Z-8000 controller 56. This control consists of mode control, timing control, and data presets.

The Z-8000 controller 56 receives mode control and preset data from the pod computer by way of pod I/O. This control and data information will be processed to determine which programs are to be utilized in the 2-D and 3-D pipeline stages. Commands will be sent to the 2-D and 3-D programmer for the purpose of algorithm selection. These control and data presets will also be used by the reformatter and segmenter circuits and algorithm processor.

The Z-8000 controller 56 will also process target classification results received from the algorithm processor. These target classifications will be prioritized in a list and passed on to the pod computer.

SCREENER POST PROCESSOR

The segment labeler/extractor, which is part of the screener post processor 32, will now be described with more design detail, using the designations "segment" or "segment label" as synonyms for "target" as was used above. To indicate the logical "not" function, an asterisk (*) will be used following a logical expression rather than overlining of the expression. A block diagram FIG. 7 corresponds generally to the diagram shown in FIG. 6.

The Segment Labeler/Extractor is an interface between serial data in video format and a parallel data bus. It outputs segments of video data stored in a random access memory for Feature Extraction and classification. This function is accomplished by labeling the segments of a video frame as they are stored in a Mass Segment Memory MSM, sorting the data in the Mass Segment Memory to extract an individual segment's data, and storing this data in a Segment memory SL where in can be accessed by an algorithm processor AP.

SEGMENT LABELER

The segment labeler SL consists of a segment label filter 182, an adjacent label filter 184, and an adjacent label memory and sorter 186. The inputs to the segment labeler are a segment designation discrete which is set for only pixels which are in segments and a segment boundary designation discrete which is set for only pixels which are in segments and on the perimeter of the segment. The output of the segment labeler is a unique group of labels which define each segment. These are passed on to the control processor and handed to the segment extractor upon request.

The segment labeler subelement descriptions follow.

Segment Label Filter

The segment label filter 182 (functional block diagram in FIG. 8) assigns a number label to each pixel which is within a segment. A number label is assigned based on the data contained in the mask and the equations that follow:

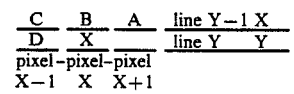

LET: ASN, BSN, CSN, XSN be the segment number for each location of the mask.

LET: ASD, BSD, CSD, XSD be the segment designation discrete for each location of the mask. i.e. ASD+1 if the pixel at this location is with any segment.

LET: NSN be a new segment number.

LET: "+" define logical OR operator and logical AND is implied

Then SSN=ASN(ASD BSD)+BSN(ASD* BSD)+DSN(BSD* CSD* DSD)

This is the selected segment number (SSN) from previous data in the mask. The SSN is the segment number meeting adjacency requirements to X and having highest priority on basis. A highest to D lowest.

LET: $ASN^1$, $BSN^1$, $LSN^1$, $DSN^1$ be the segment number to replace present data in the mask.

Then $$ASN_1 = SSN(ASD\ BSD\ XSD) + ASN(ASD\ BSD\ XSD)^*$$

$$BSN^1 = SSN(BSD\ XSD) + BSN(BSD\ XSD)^*$$

$$CSN^1 = SSN(BSD\ CSD + CSD\ DSD)XSD + CSN(BSD\ CSD + CSD\ DSD)^*XSD^*$$

$$DSN^1 = SSN(DSD\ XSD) + DSN(BSD\ XSD)^*$$

$$DSN^1 = SSN(BSD\ XSD) + BSN(BSD\ XSD)^*$$

Finally XSN=NSN(BSD* DSD* XSD)+SSN(BSD* DSD* XSD)*

A new segment number is assigned only when BSD* and DSD* because no adjacency information exists in the mask to use A or C. B must exist to use A or C and if B does not exist then D must exist to use C.

Figure 8:
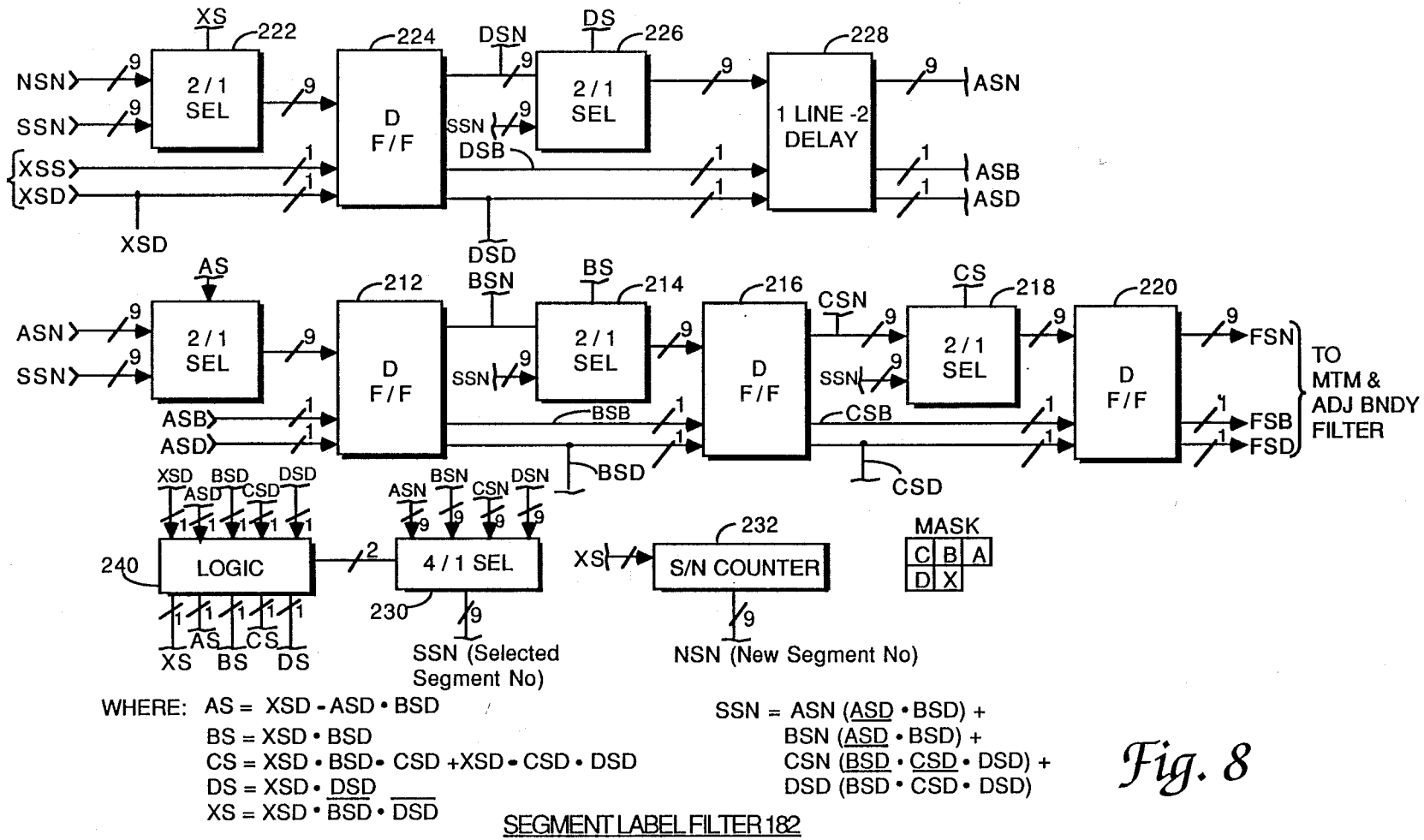
FIG. 8 is a functional block diagram of the segment label filter of FIG. 7.

The segment label filter is implemented as shown in FIG. 8 with D-type flip-flops to obtain adjacent X positions and a 1 line 2-pixel fixed delay from D to the A position, e.g. flip-flop units 224, 212, 216 and 220, each unit comprising a set of eleven flip-flops, for the D, B, C and F positions respectively, and a 1 line 2-pixel delay unit 228. The nine-bit lines ASN from unit 228, BSN from unit 212, CSN from unit 216, and DSN from unit 224 are inputs to a 4/1 selector unit 230. The nine-bit line SSN from the selector unit 230 is input to each of five 2/1 selector units 210, 214, 218, 222 and 226, which also respectively have inputs form nine-bit lines ASN, BSN, CSN. NSN and DSN. The outputs of the 2/1 selector units go respectively to the inputs of the units 212, 216, 220, 224 and 228. The unit 224 also has two flip-flops with D inputs from lines XSS and XSD, the outputs of which on lines DSB and DSD respectively are connected to inputs of the delay unit 228, which has corresponding outputs ASB & ASD. These lines ASB and ASD are connected to D inputs of flip-flops in unit 212, whose outputs BSB and BSD are coupled via flip-flops of unit 216 to lines CSB and CSD, which in turn are coupled via flip-flops of unit 220 to lines FSB & FSD. The control inputs of the 2/1 selector units are respectively AS. BS, CS, XS and DS from a logic unit 240, which provides the following logic:

$$AS = XSD\ ASD\ BSD$$

$$BS = XSD\ BSD$$

$$CS = XSD\ BSD\ CSD + XSD\ CSD\ DSD$$

$$DS = XSD\ DSD$$

$$XS = XSD\ BSD^*\ DSD^*$$

The logic unit 240 also provides two select lines to the 4/1 selector unit 230 so that SSN = ASN for the condition ASD BSD,
= BSN for the condition ASD* BSD,
= CSN for the condition BSD* CSD DSD, or
= DSN for the condition BSD* CSD* DSD, A segment number counter 232 provides new segment numbers as required to the X position.

Figure 9:
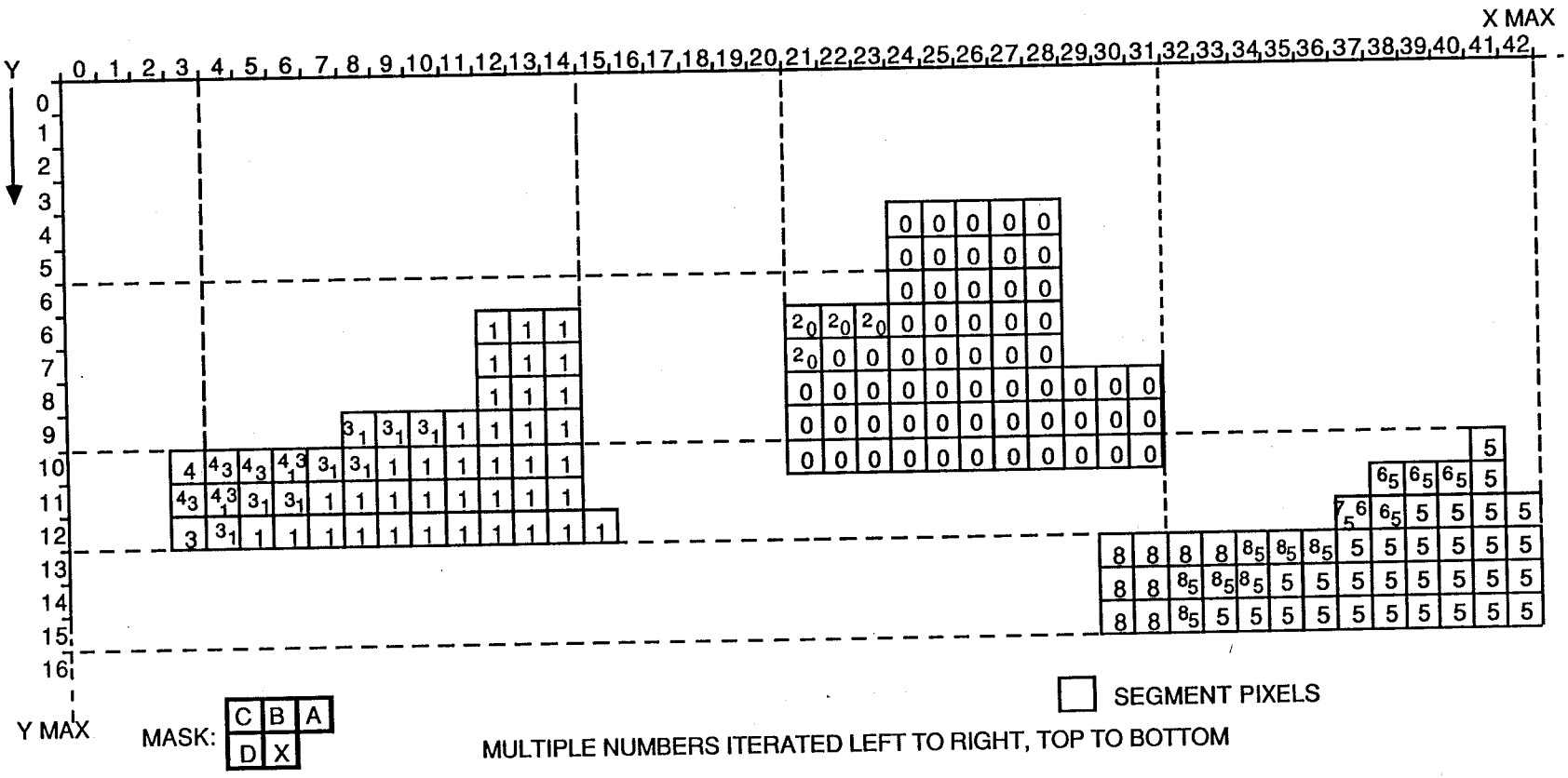
FIG. 9 is a diagram showing an example of the processing in the segment labeler of FIG. 8.

An example of the segment label filter processing is shown in FIG. 9. The pixels drawn as squares have the segment designation bit set. Squares with multiple numbers show segment number replacement per the filter processing.

The output of the segment label filter (position C) is stored in the mass segment memory MSM and further processed by the adjacent label filter.

Adjacent Label Filter

The inputs of the adjacent label filter (ALF) 184 are the segment labels and segment boundary designator discrete.

Figure 10:
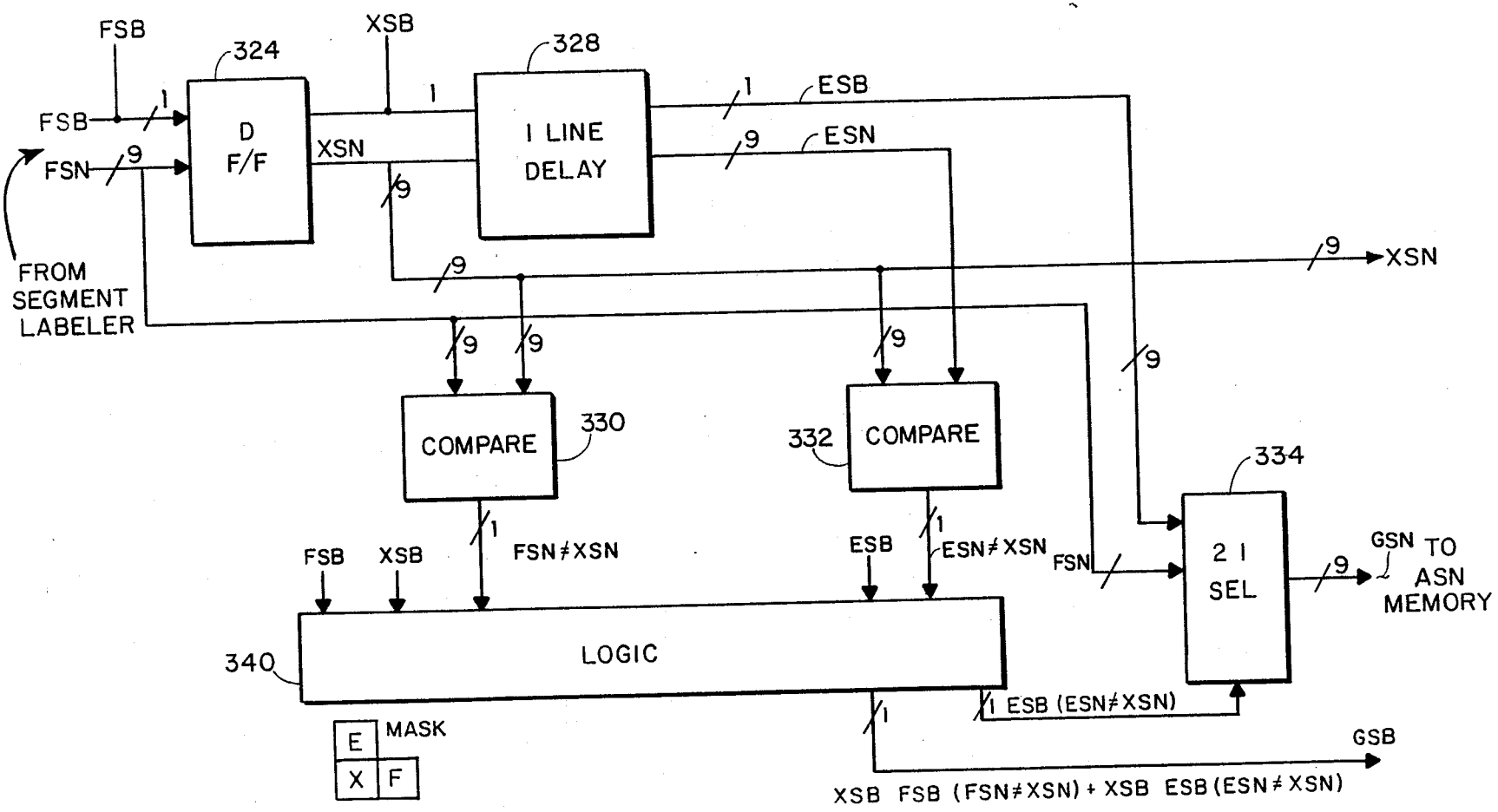
FIG. 10 is a functional block diagram of the adjacent label filter of FIG. 7.

The adjacent label filter shown in FIG. 10 links together adjacent segment labels which occur only on the segment boundary. The operation is performed only on the segment boundary to limit the number of duplicate detections. The ALF processes data using the mask and equations that follow:

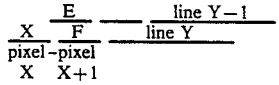

LET: ESN, FSN, XSN be the segment numbers for the corresponding pixel locations.

LET: ESB, FSB, XSB be the boundary designation discrete for each location of the mask i.e. ESB=1 if the pixel at this location is part or a segment and is on a boundary.

Then the filters outputs GSN and GSB are:

$$GSN = ESN(ESN \neq XSN)$$
$$ESB - FSN(ESN \neq XSN)^* \; ESB^*$$

$$GSB = XSB(FSB(FSN \neq XSN)$$
$$ESB - ESB(ESN \neq XSN)$$

XSN and GSN are adjacent segment labels if GSB is true.

The adjacent label filter is implemented, as shown in FIG. 10, with a D-type set of flip-flops 324 to obtain the adjacent X position and a one line fixed delay from X to the E position, provided by a circuit 328. Not-equal-to comparators 330 and 332 on FSN and XSN, and ESN and XSN provided discrete inputs to logic which provides the GSB output and the control of the 2/1 selector 334 which outputs ESN or FSN to the GSN output.

Figure 11:
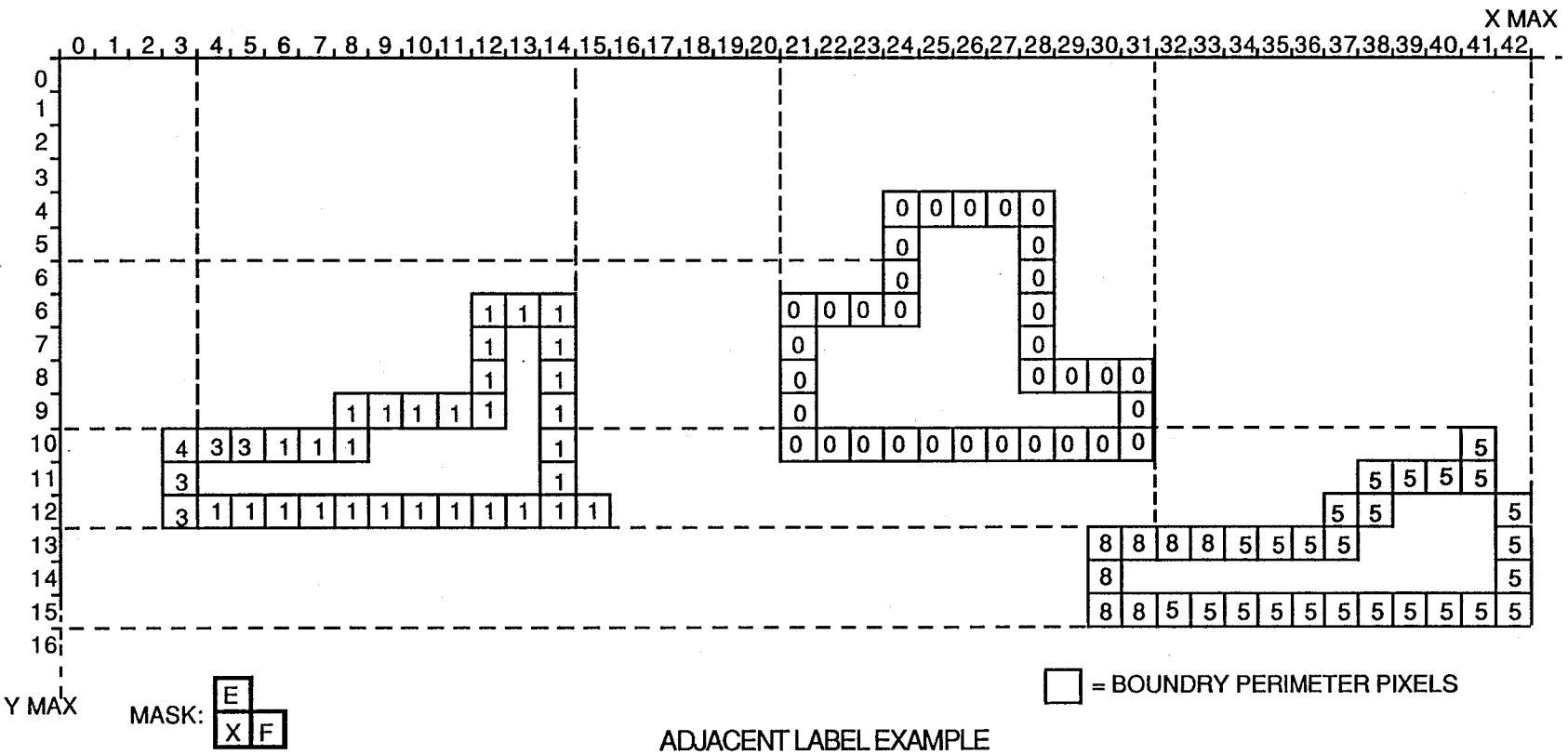
FIGS. 11 and 12 are diagrams showing examples of the processing in the adjacent label filter of FIG. 10.
Figure 12:
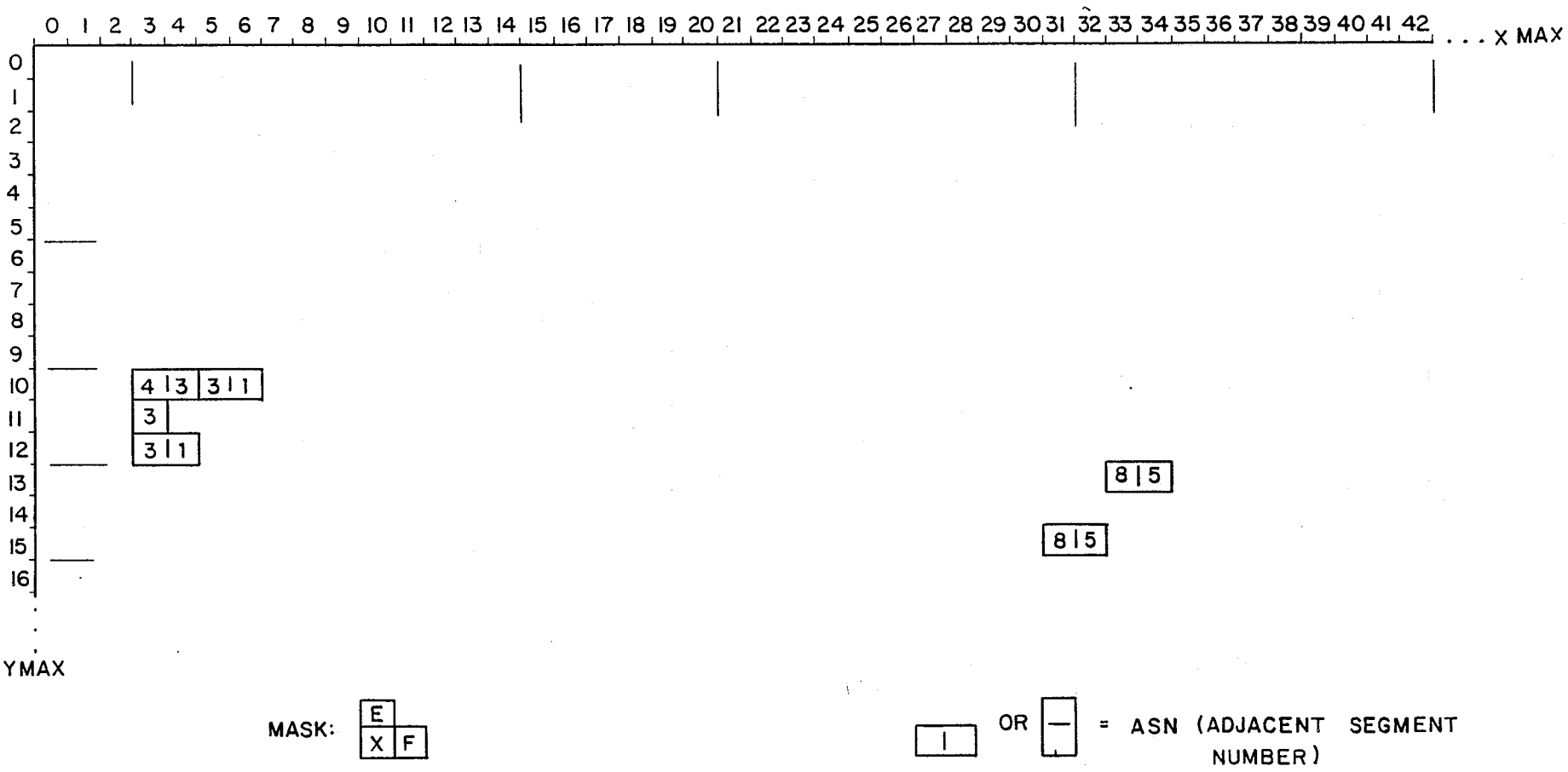

An example of the adjacent label filter processing is shown in FIGS. 11 and 12. FIG. 11 shows the segment numbers which are qualified by the segment boundary designation bit and FIG. 12 shows the final adjacent label outputs. Only pixels that have unequal segment numbers on the boundary are output.

Adjacent Segment Number Memory/Sorter

Figure 13:
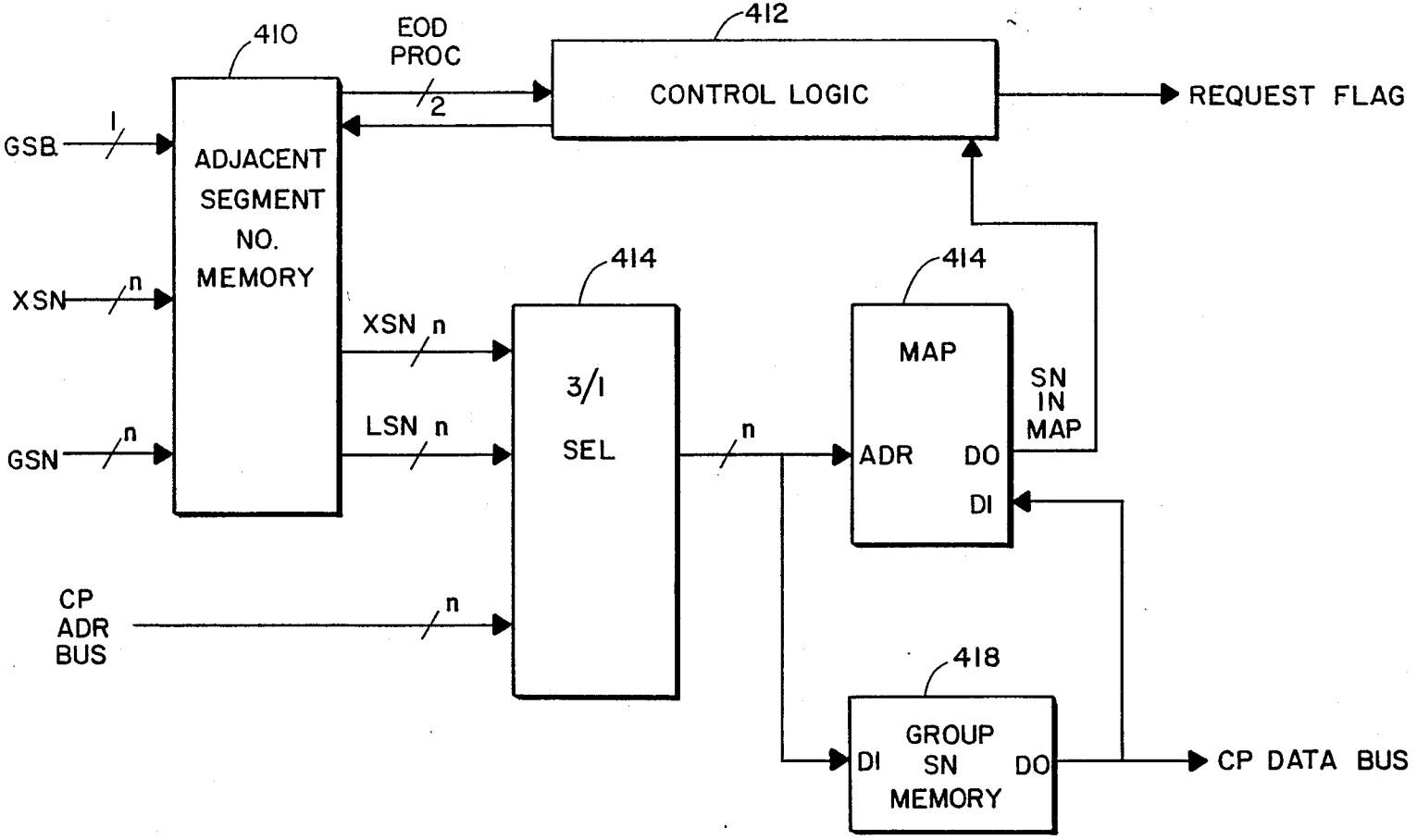
FIG. 13 is a functional block diagram of an adjacent segment number/memory sorter of FIG. 7.

The adjacent segment number memory/sorter, shown by a block diagram in FIG. 13, stores all XSN and GSN adjacent number pairs of one frame of data. After the data is received, it is sorted into groups of segment numbers which define single segments. A group of segment numbers is formed from the intersection of all adjacent segment numbers with an iteration of segment numbers as follows:

$$G_i = SN_i \; (XSN,GSN)_0 \ldots (XSN,GSN)_{jmax}$$
$$\text{where: } i = 0 \ldots imax$$
$$imax = \text{no seqments} - 1$$
$$j = \text{adjacent segment no.}$$

where $SN_{i+1}$=next greatest SN $G_O$ $G_I$ . . . $G_j$ This sorting process continues until $SN_i$=New Segment No. (NSN) which was not assigned in the frame. If no intersection occurs between $SN_i$ and the adjacent segment numbers then the SN forms a group with only one element which defines a segment. These groups of segment numbers are used by the Segment Extractor to sort individual segment's data.

Figure 7:
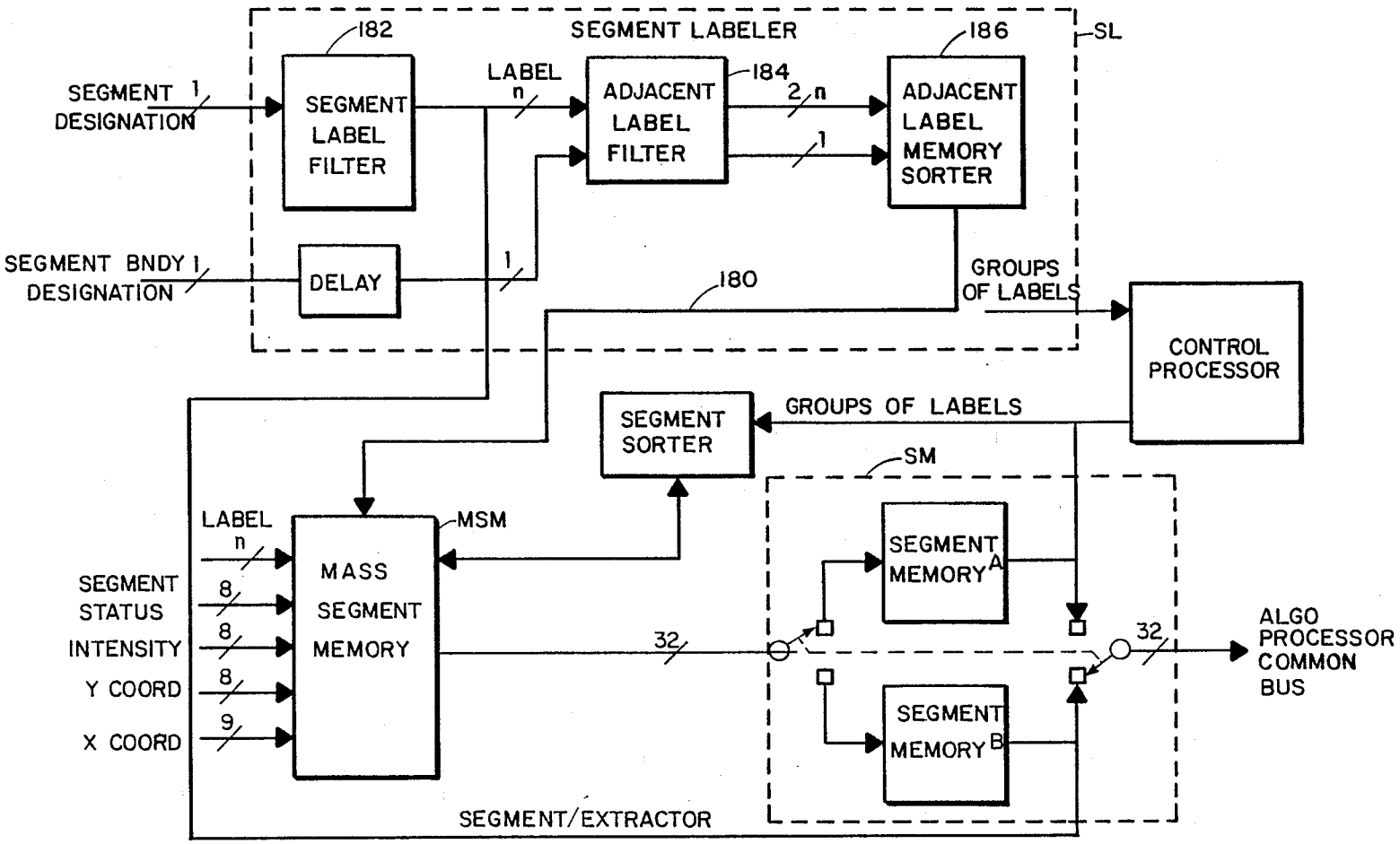
FIG. 7 is a block diagram of a segment labeler/extractor.

The adjacent segment number memory/sorter, shown by a block diagram in FIG. 7, contains an adjacent segment number memory 410 whose width is twice that of the segment No. (n) and length equal to $2^{n+1}$ because each adjacent number is duplicated since the propagation of the segment number in the segment label filter will intersect the boundary twice. The adjacent segment number outputs are XSN, GSN, End of Data (EOD), and processed (PROC). The XSN and GSN outputs are selected to the address of a Map RAM along with the CP address bus. The Map RAM dimensions are $2^n \times 1$. The Map RAM performs the intersection function between $SN_i$ and the adjacent segment numbers as follows. Initially the entire $2^n \times 1$ is cleared. The CP then sets location $SN_i$ and starts a $G_i$ sort. The control logic sequences thru each location of the adjacent segment memory. Each location requires 1 to 3 cycles. If the ASN was previously processed, a processed status bit signals the control logic the increment to the next ASN. If the ASN is not contained in the map or both numbers in the map (eliminates duplicate ASN's), two cycles are required one to inspect XSN and another for GSN. Finally if XSN exclusive or GSN is in the map, three cycles are required, one to inspect XSN. one to inspect GSN, and another to set the data at the XSN or GSN which was not in the map and store the XSN or GSN in the Group SN memory. The group SN memory has dimensions of maximum number of SN per segment Xn. The control logic sequences to the last valid ASN where an End of Data (EOD) flag signals end of valid data. At EOD, if an ASN was added to the Map RAM, another sort thru the ASNs is required to pick up any additional intersections which could occur in the list prior to the addition. If an ASN was not added to the Map RAM after a sort thru the $G_i$ processing is complete, the control logic sets a Request Flag to the CP to read the Group SN memory, and sets up the Map RAM for the next Gn process. The Group SN memory does not contain the initial $SN_i$, so $G_i = SN_i$. Group SN memory is performed by CP software and stored on a first in first out basis for transfer to the segment extractor upon request. The Map RAM is cleared only at the locations which are the elements of $G_n$. This restores a cleared Map RAM. The CP software generates the next $SN_i$ by keeping a histogram of the union of $G_O$. . . $G_i$ and selecting the next greatest SN that is not an element of the set. The address $G_i$ processes continue until the SN is equal to the last NSN which was not assigned. The last NSN is read by the CP after a frame of data has been processed by the segment labeler.

An example of the ASN memory data. Map RAM data and SN Groups are shown in FIG. 14 for the same example used for the SN filter and ASN filter.

SEGMENT EXTRACTOR

Figure 15:
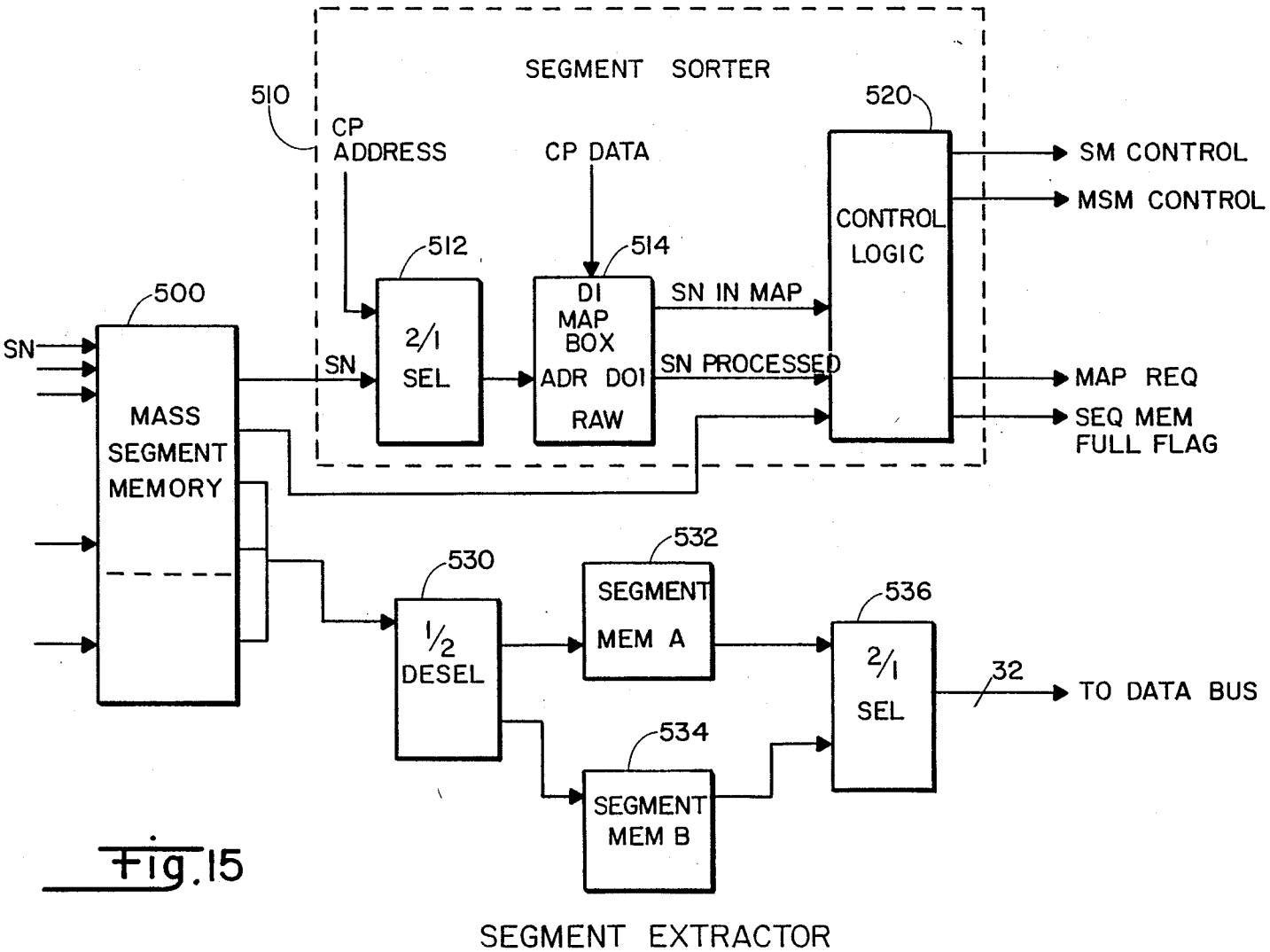
FIG. 15 is a functional block diagram of the segment extractor of FIG. 7.

The Segment Extractor, shown by a block diagram in FIG. 15 (see also FIG. 24), consists of a mass segment memory (MSM) 500 (see also FIG. 27), a segment sorter 510 (see also FIG. 26B) and two segment memories A 532 and B 534. The MSM stores the segment intensity, position (X,Y coordinates), status and label for all pixels in time sequence for a frame of data. The data is then sorted via the segment labels to provide a single segments data in a Segment Memory for feature extraction processing. The dual segment memories provide parallel processing for the Segment Sorter and algorithm processor except where significant differences in consecutive segments size exists.

The Segment Extractor subelement descriptions follow.

MASS SEGMENT MEMORY

The Mass Segment Memory has dimensions total segment pixels by the sum of the width of SN, position, status and intensity. It is divided in three width sections so that data may be written out of sync by delaying the segment designation discrete to be in sync with each data type. Data is then read with all three sections in sync for segment extraction. An EOD (end of valid data) status bit is also included in the field of the memory.

Segment Memory A and B

Segment Memory A and B (532 and 534) have dimension single segment size by the sum of the width of position, status and intensity. One segment memory is always selected to the Mass Segment Memory for writing data and the other to the algo processor data bus for reading it. A Segment Memory Full Flag is set when a segment transfer from SM MSM is complete. The algo processor (Ap in FIG. 5) resets the flag to swap memories A and B.

Segment Sorter

The function of the segment sorter 510 is to iterate the transfer of an individual segment data into a segment memory after one frame's segments are stored in the MSM. The segment sorter receives a group of SNs (segment numbers) from the control processor CP upon request and transfers the data from the intersection of this group and the MSM SNs into a segment memory. The segment memories are thus swapped, the next group of SNs received, and the process iterated until all segments have been transferred.

The intersection function is performed by a Map RAM 514 similar in operation to the segment sorters. The Map RAM's dimensions are $2^n \times 2$. The entire RAM is initially cleared. One bit is set at the addresses of the present SN group to extract the intersection of this group with the MSM SNs. The present group is cleared and the next SN group set by the CP after the MSM extraction for the present group is complete. This Map RAM's bit function is labeled SN IN MAP. The other Map RAM bit is set at the address of the present SN group but not cleared after the MSM extraction. Therefore, it contains the union of all SNs that have been processed. It is used to maintain a pointer at the top of the MSM to start the next sort at the address of the first unprocessed SN. This Map RAM's bit function is labeled SN PROCESSED.

Figure 16:
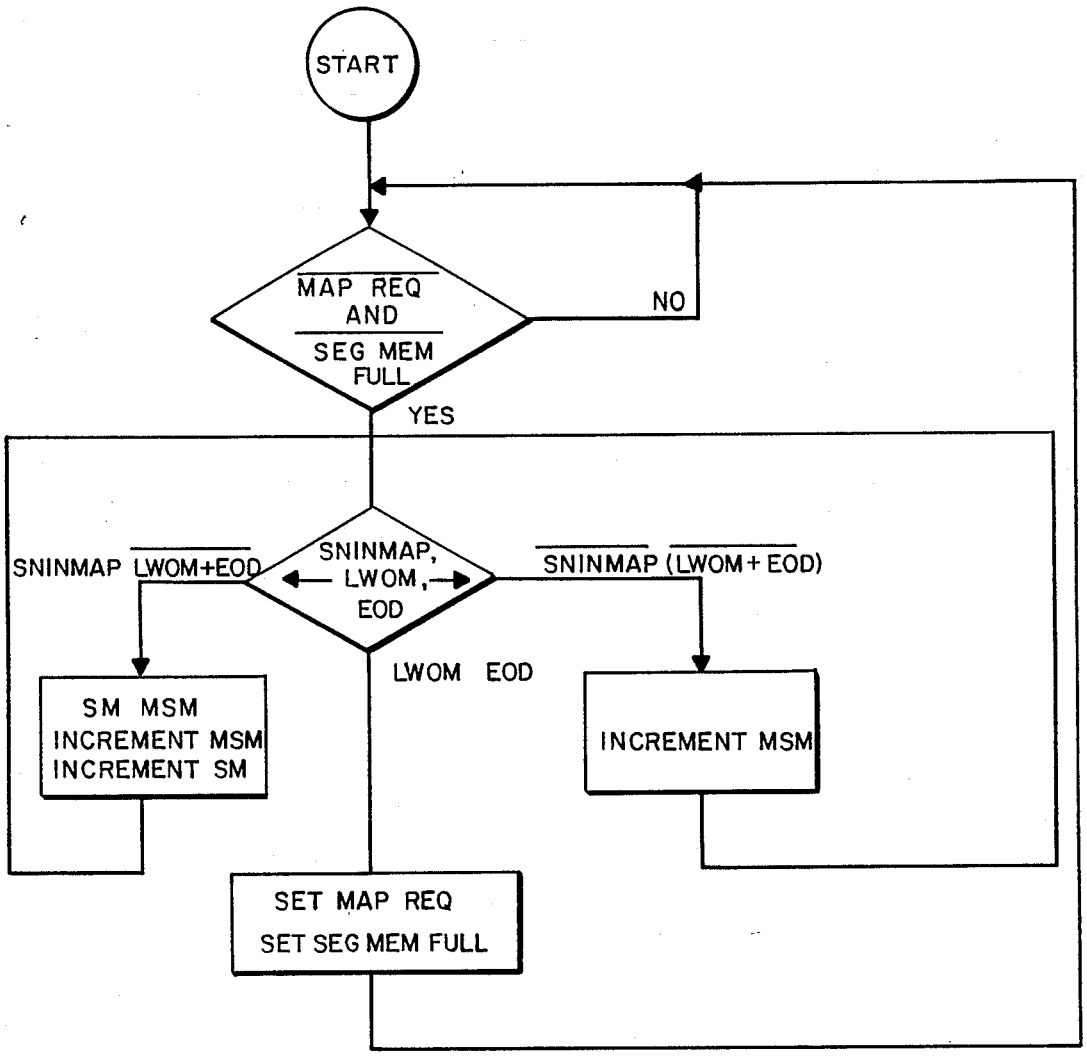
FIG. 16 is a simplified flow diagram of a segment sorter.

The segment sorter operation, shown by a flow chart diagram in FIG. 16, is controlled by two flags, a Map Reg flag to notify the CP that Map RAM processing is required for the next SN group and a SN full flag to notify the Ap that a SN is full and ready to be swapped. As shown in the flow diagram, when the Map Reg has been reset after service and the SN full flag reset after the memory swap, a segment extraction begins. A three-way branch on SN INMAP, Line Without Match, and End of Data (EOD) occurs. The LWOM+EOD function when true defines the end of the present segment extraction. Either a Y coordinate in the MSM position data exceeded the previous Y coordinate of a SN IN MAP pixel by Y+1 or the EOD in the MSM occurs to make the function true.

The left branch, SNIMAp* (LWOM+EOD)* occurs when the SN in the MSM does not intersect one of the SNs in the map. The only operation in this branch is to increment the MSM and then branch back to the multiway to test the next SN.

The center branch, LWOM+EOD, sets the Map Req and SM full flags to request the next SN group and swap the SMs.

Continuing with the same example used for the Segment Labeler. FIG. 17 shows the MSM data and segment extraction into the SMs for the first two sorts. Sort 1 starts at the top of the MSM and transfers lines 3, 4, 5 of 1 Segment 1 into the SM. On line six, the first unprocessed SN MSM address is saved to start the next sort. The process continues transferring only MSM data that has its SN IN MAp until a LNOM occurs on line 12 to end the sort.

The Segment Extractor processing is iterated until all segments have been transferred to the algorithm processor AP (see FIG. 5). This is detected by the MSM top pointer being left at EOD.

SPECIFIC EMBODIMENT

A specific embodiment of the Segment Labeler TL and of the Target Memory/Controller TMC has been implemented on two wirewrap circuit boards. In the following description and drawings the term "target" and designations with "T" are used as in FIGS. 1–6 and the description thereof, in the place of the term "segment" and designations with "S" used in FIGS. 7–17 and the corresponding description. In this description integrated circuit chips (or groups of chips) are designated by Z (or Z' for the second board), followed by an individual numerical designation. If the unit is part of a chip a letter follows the number, with all units having the same numerical part being on the same chip. The designation VCC indicates +5 volts filtered. Many details not shown on the drawing will be given in the description.

SEGMENT LABELER

Figure 18:
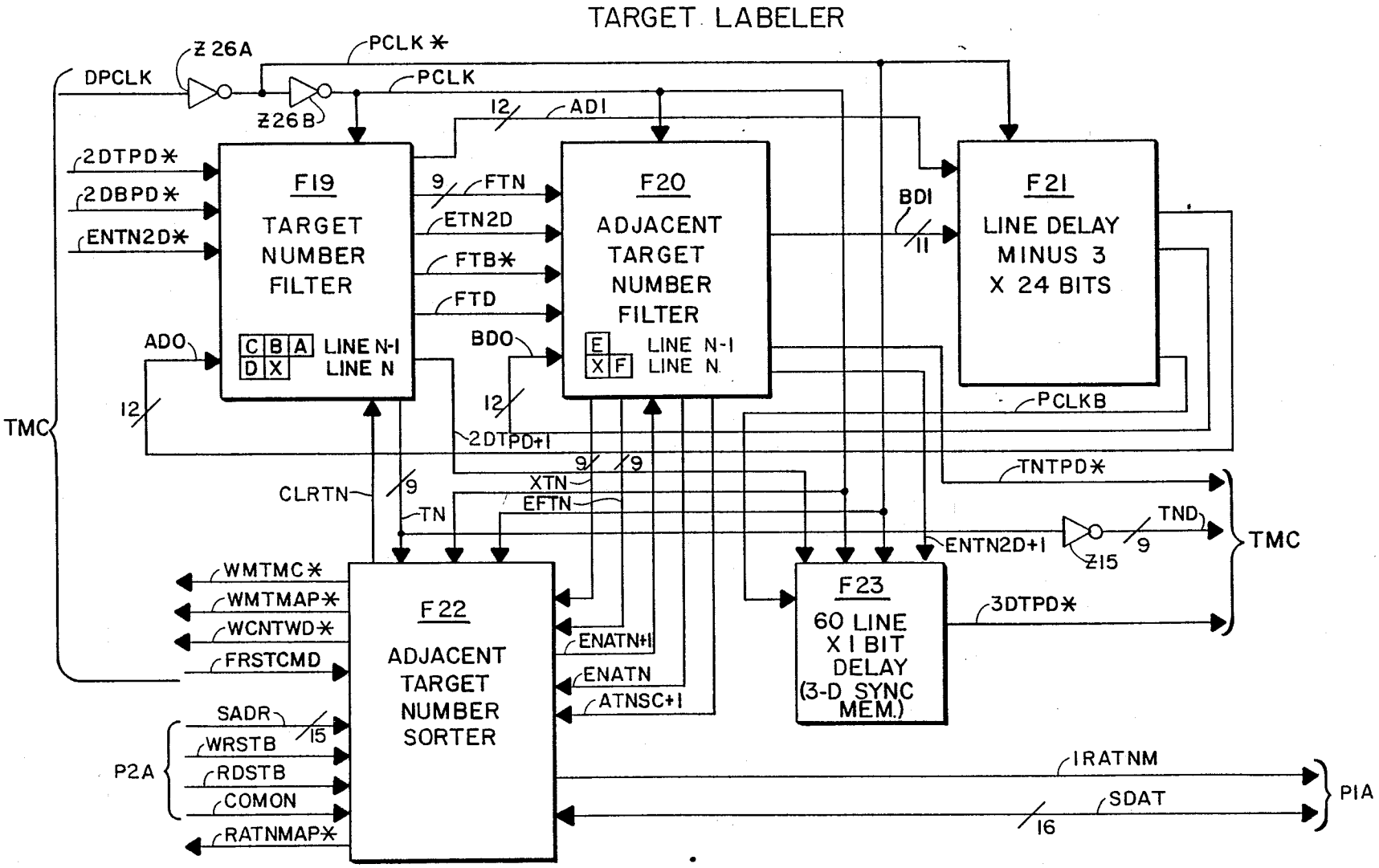
FIG. 18 is a block diagram of a specific embodiment of a target (segment) labeler.

A block diagram of the wirewrap circuit board for the segment labeler is shown in FIG. 18. It comprises the target number filter F19, the adjacent target number filter F20, a line delay minus 3×24 bits circuit F21, the adjacent target number sorter F22, and a 60 line×1 bit delay circuit F23.

FIG. 18 shows the clock input on lead DPCLK from the TMC board, coupled via one inverter Z26A (type 54S04) to a clock lead PCLK*, and via another inverter Z26B on the same chip to lead PCLK, for supplying clock signals to all of the circuits on the board.

The segment labeler subelement descriptions follow.

SEGMENT Label Filter

The segment label filter 182 (functional block diagram in FIG. 19, corresponding to part of FIG. 8) assigns a number label to each pixel which is within a segment.

The TN counter Z48 (232 in FIG. 8) comprises two type 54LS163 synchronized 4-bit counter chips and a JK flip-flop type 54LS109. The lead CLRTN* from FIG. 22A is connected to the CLR* pin 1 of the two counter chips, to an input of a 3-input NAND gate type 54LS10, and via an inverter type 54LS04 to the K input pin 14 of the flip-flop. The clock lead PCLK is connected to the clock pins 2 of the counter chips and 12 of the flip-flop. The control lead XS is connected to the ENP and ENT pins 7 and 10 of the first counter chip. The load control pin 9 of both counter chips are connected to VCC. The four output pins 14–11 of the two counter chips and the Q* pin 9 of the flip-flop are connected individually to the nine leads of line TN. The ripple carry pin 15 of the first counter chip is connected to the ENP and ENT pins 7 and 10 of the second counter chip and also to an input of the 3-input NAND gate, pin 15 of the second counter chip is connected to the 3rd input of the NAND gate. The output of the NAND gate is connected to the J input pin 13 of the flip-flop. The PR* and CL* pins 11 and 15 of the flip-flop are connected at a point RP via a resistor to VCC.

The select and store unit Z46 comprises three 54LS399 quad 2-in multiplexers (MUX) with storage, providing the functions of both the 2/1 selector 222 and the D flip-flops 224 of FIG. 8. The nine leads of line TN are connected individually to input pins 4, 5, 12 and 13 of two of the MUX chips and pin 4 of the 3rd. The nine leads of line STN are similarly connected to input 3, 6, 11 and 14 of two chips and pin 3 of the 3rd. The clock lead PCLK is connected to pin 9, and the select lead XS to pin 1, of all chips. The nine outputs to line DTN are from pins 2, 7, 10 and 15 of two chips and pin 2 of the 3rd. There are three leads from the board TMC, leads 2DTPD* and 2DBPD* connected respectively to inputs of type 54LS02 NOR gates Z200A, and a lead ENTN2D* connected to the other inputs of the two NOR gates and also to a type 54LS04 inverter Z27C. The outputs of the NOR gates Z200A are connected respectively to the D input of two type 54LS273 flip-flops Z53H and Z70D. The Q output of flip-flop Z53H is connected to the D inputs at pins 14 and 13 and also via an inverter Z110C to the two B inputs at pins 6 and 5 of the 3rd chip of unit Z46. The Q output of flip-flop Z70D is connected to the C inputs at pins 11 and 10 of the 3rd chip. The QB, QC and QD outputs of the third chip are connected to corresponding inputs of a select and store unit Z74.

There are four select and store units Z47, Z49, Z50 and Z51, each of which also comprise three type 54LS399 chips connected similarly to unit Z46.

The 4/1 select unit Z94 five type 54LS153 dual 4 to 1 selector chips, with the data inputs of one unit of one chip grounded, so that effectively nine units are used. Each of the four lines ATN, BTN, CTN and DTN has nine leads connected individually to corresponding inputs of the nine select units. The nine leads of line STN are connected individually to the Y outputs of the nine units. The A and B select inputs at pins 14 and of the five chips are connected respectively to leads SO and BTD*. Pins 1 and 15 of all five chips are grounded.

Figure 20:
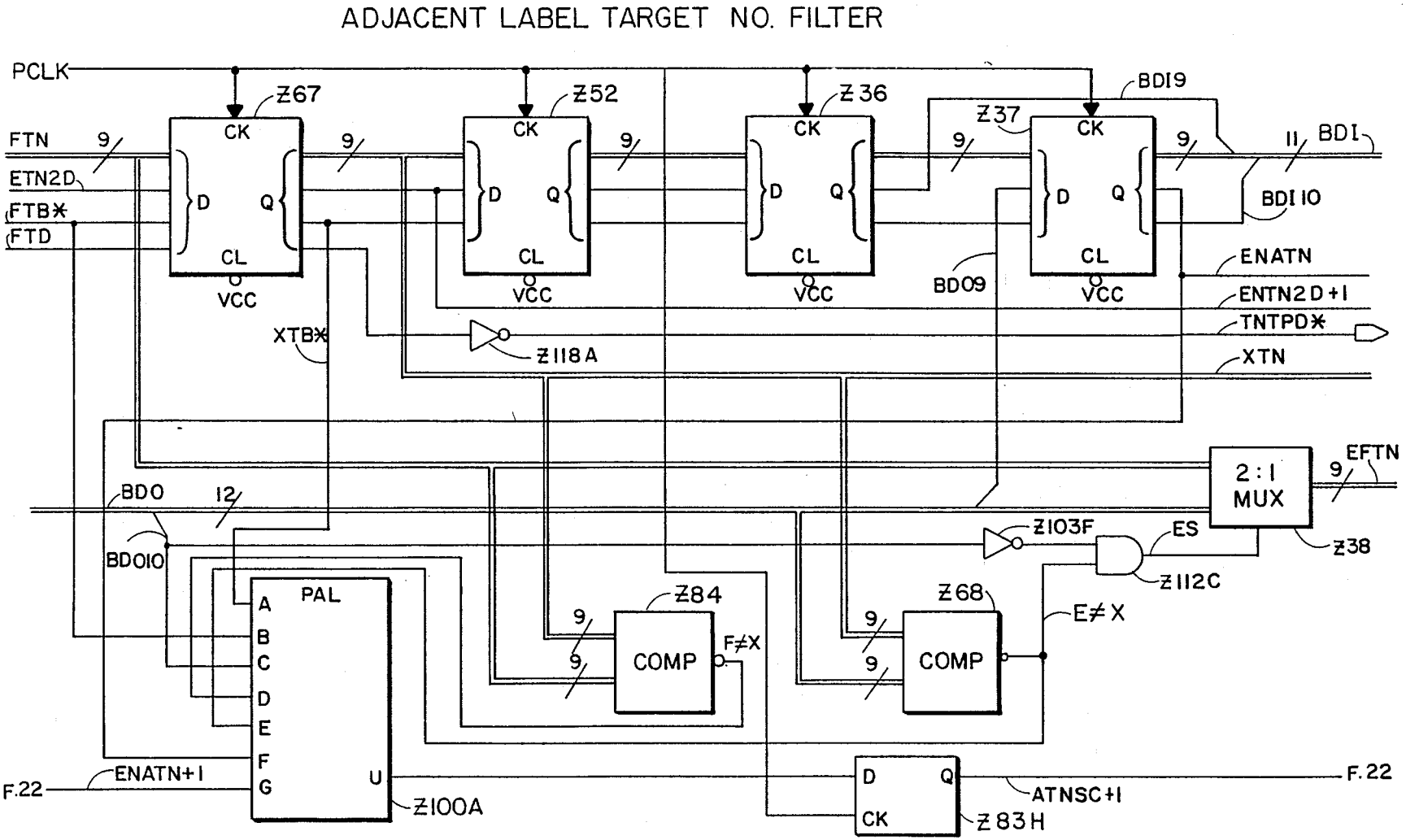

The PAL logic unit ZlOOB, with unit ZlOOA in FIG. 20, comprise a type 12H6 chip. Referring to the terminal designations inside block ZlOOB, the logic is as follows:

$$V=H\,I^*\,K^*$$

$$W=H\,I$$

$$X=H\,J\,K$$

$$Y=H\,K$$

$$Z=H\,K\,L^*+H\,I\,L$$

The logic unit Z99 comprises three type 54LS00 NAND gates, one having inputs from leads BTD and AD09, a second one having inputs from leads BTD* and CTD*, and the third having inputs from the outputs of the first two and an output to lead SO to provide the function (BTD AD09)+(BTD* CTD*). Logic units Z100B and Z99 together correspond to unit 240 in FIG. 8.

Adjacent Target Number Filter

The adjacent target number filter shown in FIG. 20 corresponds to the adjacent label filter shown in FIG. 10. The store unit Z67 comprises one type 54LS273 octal D flip-flop chip, three of the flip-flops of a type 54S374 chip, and one flip-flop of another 54LS273 chip. Eight of the leads of line FTN are connected to D inputs of the first chip, and the ninth lead is connected via two type 54LS04 inverters in tandem to one of the D inputs of the 54LS374 chip. The leads ETN2D and FTB* are connected to D inputs of the 54LS374 chip, and lead FTD is connected to the D input of the twelfth flip-flop. The store units Z52, Z36, and Z37 each comprise eleven flip-flops, eight on a type 54LS273 chip, and three as part of a 54S374 chip. All of the clock inputs of the four units Z67, Z52, Z36 and Z37 are connected to lead PCLK, and all of the clear* inputs go to VCC. Eleven of the Q outputs of unit Z67 are connected to corresponding D inputs of unit Z52, the eleven Q outputs of unit Z52 are connected to corresponding D inputs of unit Z36, the first nine and the eleventh Q outputs of unit Z36 are connected to corresponding D inputs of unit Z37, and the first nine and the eleventh Q outputs of unit Z37 (bits 0–8 and 10) go to line BDI. Bit 9 of line BDI comes from the tenth Q output of unit Z36. The tenth Q output of unit Z37 is lead ENATN.

There are two comparators, Z84 and Z68, each of which comprises a type 25LS2521 chip, plus a type 54S86 exclusive or gate having its output connected to the Ein pin 1 of the 2521 chip, so that there are two sets of nine inputs for comparison. Each unit has an Eo output at pin 19 which is high when the inputs are not equal. The comparator unit Z94 has the two sets of nine inputs from lines XTN and FTN, and its output to line F≠X. The comparator unit Z68 has the two sets of nine inputs from lines XTN and BDO (bits 0–8). and its output to line E≠X.

A two to one multiplexer unit Z38 comprises three quad chips type 54LS157, with pin 15 of each grounded. One chip has three inputs of each set grounded, leaving nine inputs of each set for the three chips, connected to lines FTN and BDO (bits 0–8). The nine output leads form line EFTN. The select input pin 1 of all three chips are connected to lead ES from a type 54S08 AND gate Z112C, which has one input connected to lead E≠X. and to other input via a type 54S04 inverter Z103F to the lead for bit 10 of line BDO.

Figure 22:
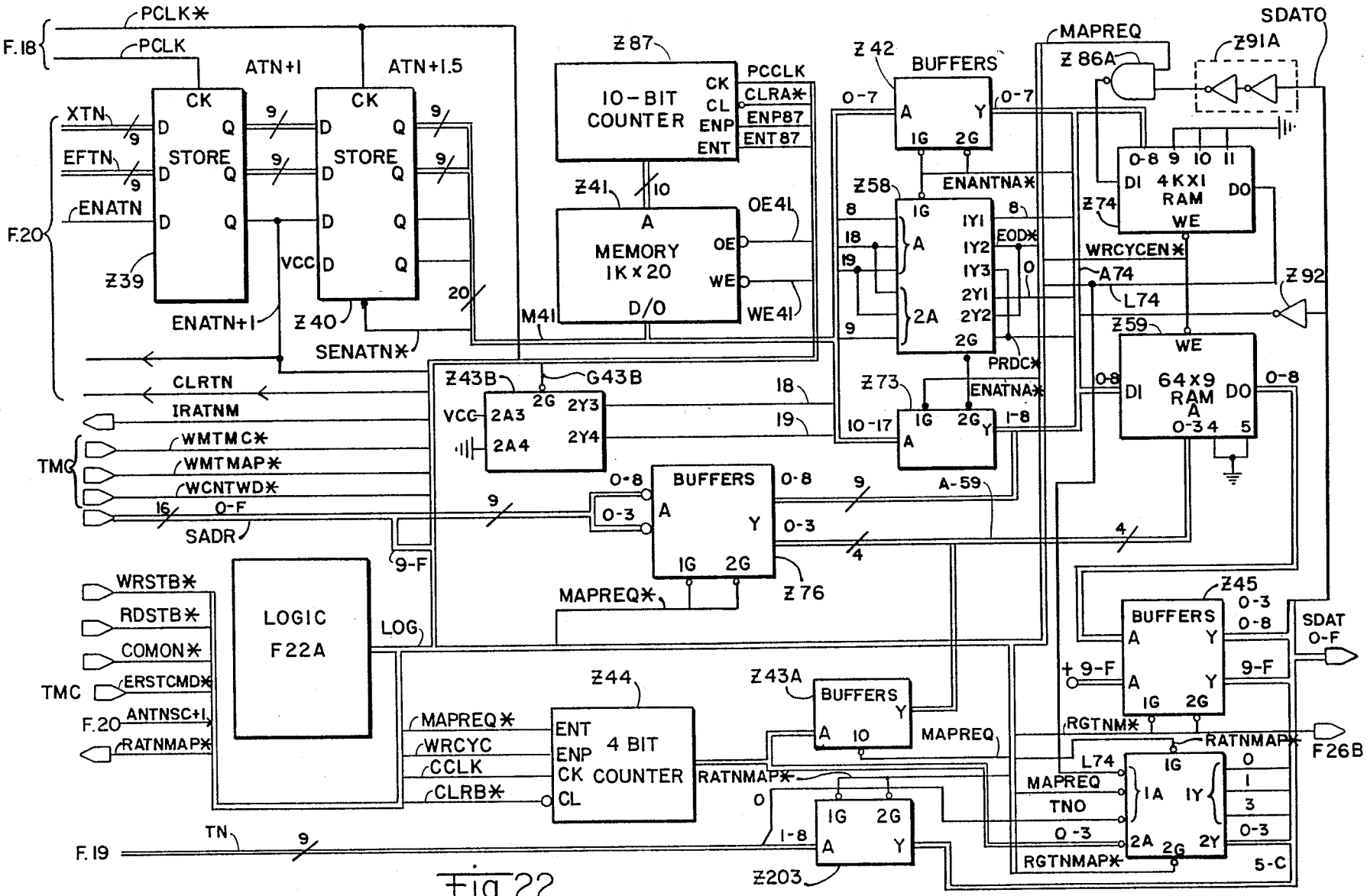
Figure 22A:
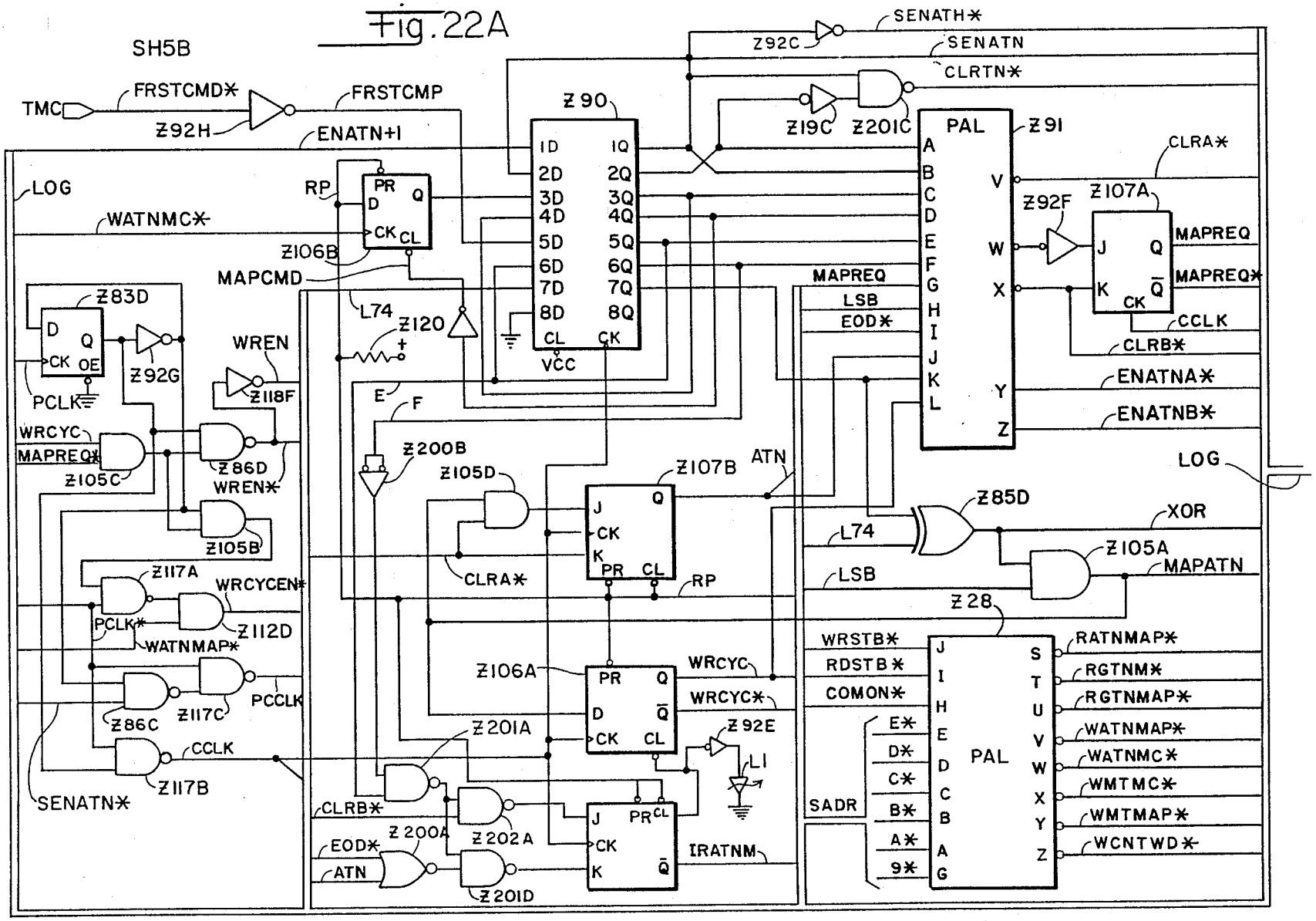

The logic unit ZlOOA has its A input connected to the eleventh Q output of unit Z67 via lead XTB*, its B input connected to the eleventh D input of unit Z67 via lead FTB*, its C input connected to the lead for bit 10 of line BDO, its D input connected to lead F≠X, its E input connected to the lead for bit 10 of line BDO, its E input connected to lead E≠X, its F input connected to lead ENATN, and its G input connected to lead ENATN+1 from FIG. 22. The logic of unit Z100A is as follows:

$$U=F^*G+A^*B^*D+A^*C^*E.$$

The output U is connected to the D input of a flip-flop Z83H (one part of a 54S74 chip) having a clock input from lead PCLK and its Q output to lead ATNSC+1 to FIG. 22.

Line Delay Minus 3×24

Figure 21:
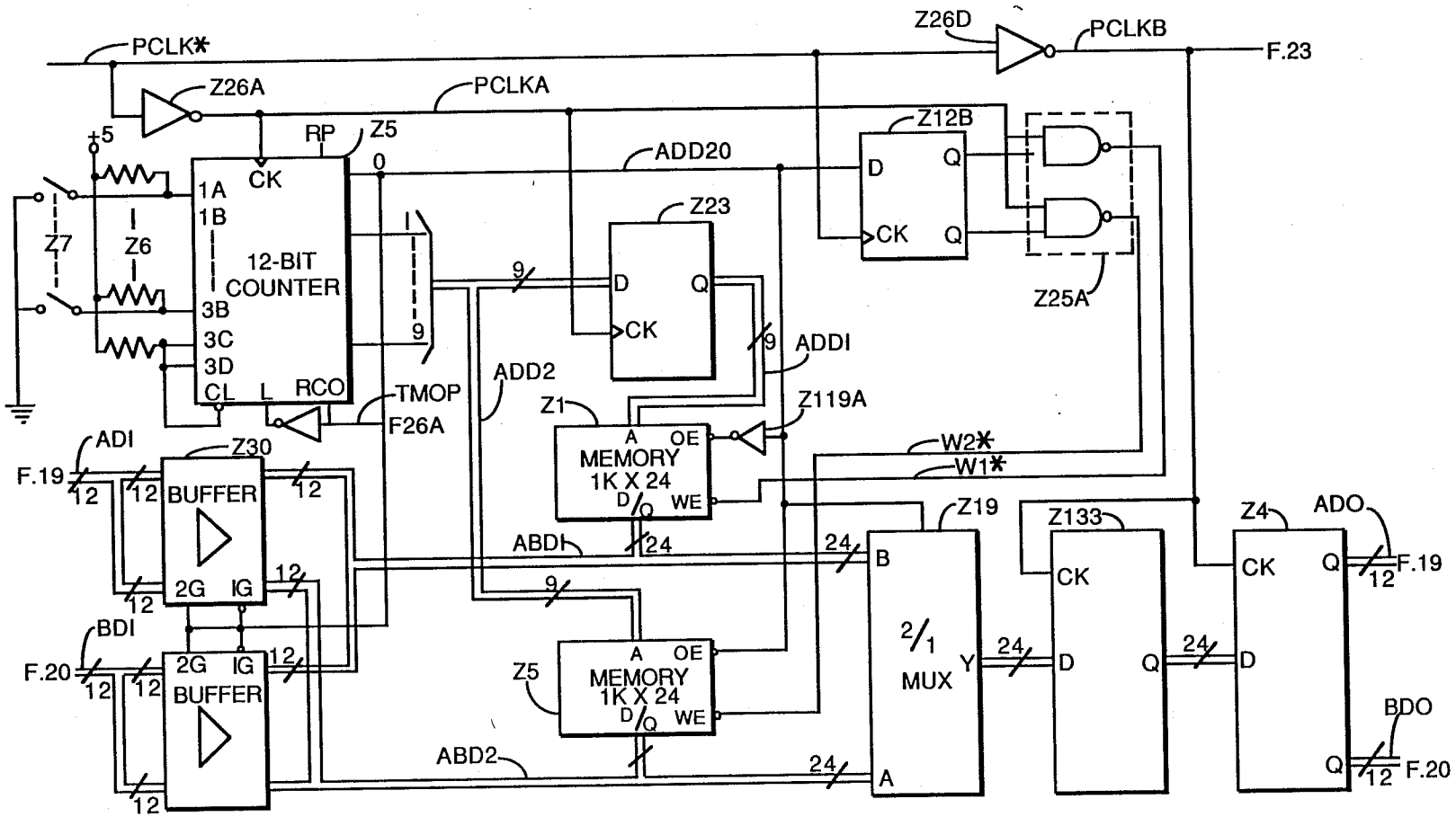

FIG. 21 shows the line delay minus 3×24 bits unit F21 of FIG. 18. A 12-bit counter Z5 three type 54S163 counter chips, each having four pins 3, 4, 5 & 6 for inputs A-D, or a total of twelve inputs. Ten of these inputs may be connected via DIP switches Z7 to ground, and are also connected via DIP resistors Z6 to +5 volts. The other two inputs 3C & 3D of the last of the three chips, as well as the clear* pins 1 of all three chips, are connected together and via one resistor to +5 volts. The clock pin 2 of all three chips are connected to lead PCLKA, which comes from lead PCLK* via a type 54S04 inverter Z26A. The ten outputs from pins 14, 13, 12 & 11 of the first two chips and pins 14 & 13 of the last chip form bits 0–9 of line ADD2, with bit 0 routed via lead ADD20 separately from the group of bits 1–9 to other circuits. The first chip has the enable D pin 7 & p pin 10 connected together to RP (+5 volts via a resistor). The ripple carry out RCO pin 15 of the first chip is connected to the P & T pins of the second chip, and also to the P Pin of the third chip. The RCO pin of the second chip is connected to the T enable of the third chip. The RCO pin of the third chip is connected via a type 54S04 inverter to load* (L) pin 9 of all three chips.

A set of nine flip-flops Z23 has the D inputs connected respectively to the nine leads of line ADD2, and the Q outputs to nine leads of line ADD1. The block Z23 comprises an octal D flip-flop chip type 54S374, and one unit of a type 54S74 dual D flip-flop chip. The clock inputs are connected to line PCLKA, the OE* pin 1 of the octal chip is grounded, and the pins 1, 13, 4 and 10 of the 54S74 flip-flop are connected together to a resistor to +5 volts. The other unit of the 54S74 chip is flip-flop Z12B having its D input connected to lead ADD20, its clock input to line PCLK*, and its Q and Q* outputs connected respectively to two type 54LS00 NAND gates Z25A. The other input of each of the two NAND gates is connected to the clock lead PCLKA, and the outputs are connected respectively to leads W1* and W2*.

Input buffers Z30 and Z16 each comprise three type 54LS241 octal buffer chips. Each of these chips has a group of four buffers enabled when a signal at G1 pin 1 is low, and another group of four buffers enabled when a signal at G2 pin 19 is high. Therefore each of the units Z30 and Z16 has a total of twelve buffers in the first group and a total of twelve buffers in the second group. The inputs of the two groups are connected in parallel, with unit Z30 connected to the 12-bit line ADI, and unit Z16 connected to the 12-bit line BDI. The outputs from the first group of buffers of the two units Z30 & Z16 together form a 24-bit line ABD1, and the outputs from the second group of buffers of the two units Z30 & Z16 together form a 24-bit line ABD2. The lead ADD20 is connected to the IG and 2G gates of all chips of the buffer units Z30 and Z16, so that the outputs to line ABD1 are enabled with ADD20 low, and the outputs to line ABD2 are enabled with ADD20 high.

There are two 1K×24 bit memories Z1 and Z5, each comprising three type MK4801AJ-70 RAM chips. For each memory, the nine address inputs are connected in parallel, to the nine leads of line ADD1 for memory Z1, and to line ADD2 for memory Z5. With eight D/Q pins on each chip, each memory has a total of twenty-four, which are connected to line ABDI for memory Z1, and to line ABD2 for memory Z5. Lead ADD20 is connected to the output enable terminal OE of all three chips of memory Z5, and also via a type 54LS04 inverter Z119A to the output enable of memory Z1. The write enable inputs WE of the chips of memory Z1 are connected to lead W1*, and for memory Z5 to lead W2*. The CE and A9 pins 18 & 22 of all six of the memory chips are grounded.

A select unit Z19 comprises six quad 2-to-1 multiplex chips type 54LS157, providing a total of 24 A inputs connected to line ABD2, 24 B inputs connected to line ABDI, and 24 Y outputs. The select inputs at pin 1 of all six chips is connected to lead ADD20, and the G terminal pins 15 are grounded.

A store unit Z133 comprises three octal D flip-flop chips type 54LS273, having the 24 D inputs connected to the Y outputs of the select unit Z19 and the clock inputs connected to lead PCLKB. This clock signal is supplied from lead PCLK* via a type 54S04 inverter Z26D, and also goes to FIG. 23.

A store unit Z4 comprises three octal D flip-flop chips type 54LS374, having the 24 D inputs connected to the Q outputs of the flip-flops Z133, and the clock inputs connected to lead PCLKB. The Q outputs of the flip-flops Z4 are divided into one group of twelve to line ADO which goes to FIG. 19, and another group of twelve to line BDO which goes to FIG. 20.

Adjacent Target Number Sorter

FIG. 22 shows the adjacent target number sorter F22 of FIG. 18. A line LOG is shown for convenience for several logic lead connections.

A store unit Z39 comprises two octal D flip-flop chips type 54LS273. and three units of a third chip, making a total of nineteen flip-flops, nine of which have the D inputs from line XTN, nine from line EFTN, and one from lead ENATN, all from FIG. 20. The clock inputs are connected to lead PCLK, and the clear inputs at pin 1 are to VCC.

A store unit Z40 comprises two octal D flip-flop chips type 54LS374. and four units of a third chip, making a total of twenty flip-flops, nineteen of which have the D inputs from the Q outputs of unit Z39, and one from VCC as a high signal. The nineteenth Q output of unit Z39 is also lead ENATN+1 to line LOG and also to FIG. 20. The clock inputs of unit Z40 are connected to lead PCLK*, and the output enable inputs at pin 1 are to lead SENATN* from logic F22A via line LOG. The twenty Q outputs are shown as a line M41 to the D/Q terminals of a memory Z41.

The memory Z41 comprises three type MK4801AJ-70 1K×8 memory chips, with twenty of the D/Q terminals used to provide a 1K×20 memory. The output enable and write enable signals on lines OE41 and WE41 come from FIG. 22B via line LOG. The CE pins 18 are grounded. The ten address inputs come from the Q outputs of a ten-bit counter Z87.

The counter Z87 comprises three type 54LS163A synchronized 4-bit counter chips, interconnected with the RCO pin 15 of the first connected to the ENT pin 10 of the second, and the RCO pin of the second connected to the ENT pin of the third. The ENT input of the first chip on lead ENT87, and the input on Lead ENP87 to the ENP pin of all three chips, come from FIG. 22B via line LOG.

The twenty-bit line M41 is also connected to buffers Z42, Z58 and Z73, each of which is a type 54LS244 octal buffer chip having first and second groups of four buffers each, enabled respectively with a low signal at gate inputs 1G and 2G. From line M41, eight bits 0–7 go to the eight inputs of buffers Z42, and eight bits 10–17 to the eight inputs of buffers Z73. At buffers Z58, bit 8 goes to the 1A1 input, bit 9 goes to the 2A1 input, bit 18 goes to the 1A2 and 2A2 inputs, and bit 19 goes to the 1A3 and 2A3 inputs. The IA4 and 2A4 inputs are grounded. The 1G and 2G gates of buffers Z42 and the 1G input of buffers Z58 are connected to lead ENANTNA* form logic F22A lia line LOG; and The 1A4 and 2A4 inputs are grounded. The IG and 2G gates of buffers Z42 and the 1G input of buffers Z58 are connected to lead ENANTNA*; and the IG and 2G gates of buffers Z73 and the 2G input of buffers Z58 are connected to lead ENANTNB* from logic F22A via line LOG. The eight Y outputs of buffers Z42 are connected to the leads for bits 0–7 of a nine-bit line A74, and the eight Y outputs of buffers Z73 are connected to the leads for bits 1–8 of line A74. From buffers Z58, the output connections are 1Y1 to bit 8 of line A74, 1Y2 and 2Y1 to a lead EOD* to line LOG, 1Y3 and 2Y2 to lead PRDO* of line LOG. and 2Y3 to bit 0 of line A74.

A memory Z74 comprises one type MD2147H-3 4K×1 RAM chip. The nine address inputs A0–8 are from line A74, and three inputs A9–11 along with the CS* pin 10 are grounded. The DI input pin 11 comes from the output of a type 54LS00 NAND gate Z86A, which has one input on lead MAPREQ from line LOG. and the other input from the 0 bit of line SDAT via two buffers Z91A in tandem of a type 54LS240 octal buffer chip. The write enable inputs of this and another memory Z59 come from lead WRCYCEN* of line LOG. The DO output of memory Z74 is designated L74 to line LOG.

A memory Z59 comprises one type S82S09 64×9 RAM chip. The four address inputs A0–3 are from line A59, and two inputs A4–5 are grounded. The nine DI inputs come from line A74. The nine DO outputs have DIP 1K pullup resistors to VCC, and go to the A inputs of nine buffers of unit Z45.

The buffer unit Z45 comprises two 54LS244 octal buffer chips. The last seven A inputs are from VCC as logical high. The 1G and 2G inputs of the two chips are connected together to lead RGTNM* from line LOG. The sixteen Y outputs are bits 0-F of line SDAT.

A counter Z44 comprises one type 54LS163 chip, having its inputs ENT, ENP, clock and clear inputs connected respectively to leads MAPREQ*, WRCYC, CCLK AND CLRB* from line LOG. The load pin 9 is to VCC. The four output leads are connected to the A inputs of buffers Z43A, and also to the 2A inputs of buffers Z60.

The buffer unit Z43A comprises four buffers of a type 54LS244 chip having the IG enable input connected to lead MAPREQ from line LOG. The Y outputs are an alternate source of the 4-bit address via line A59 for the memory Z59. The buffer Z43B on the same chip has inputs 2A3 and 2A4 to VCC for high and low respectively, and th®outputs 2Y3 and 2Y4 go to the leads for bits 18 and 19 of line M41. The enable at 2G on lead G43B come from FIG. 22B via line LOG.

Figure 19:
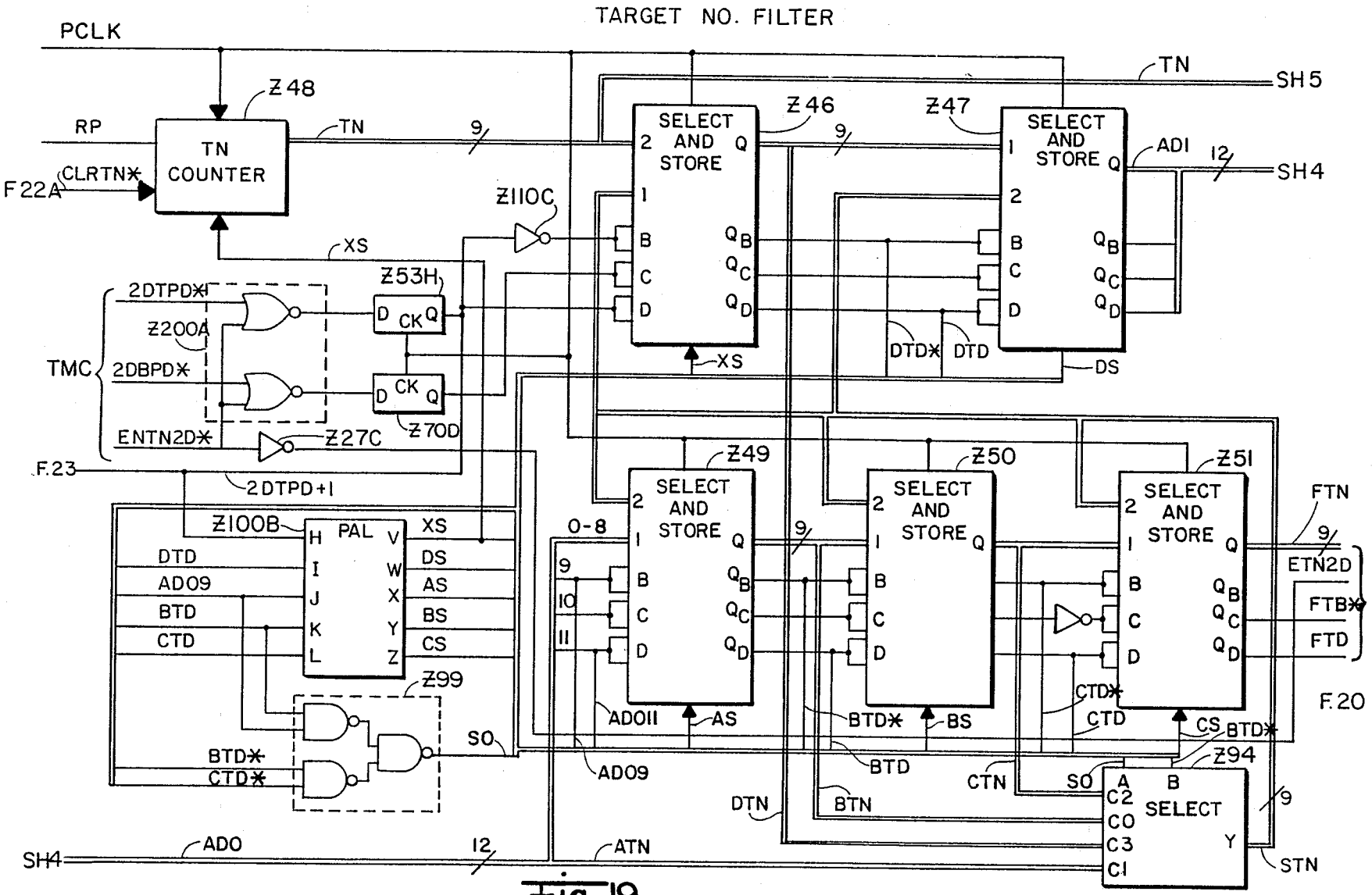
FIGS. 19, 20, 21, 22, 22A, 22B and 23 together comprise a more detailed functional block diagram of the target labeler of FIG. 18.

A buffer unit Z203 comprises one type 54LS240 chip having the eight A inputs connected to the leads for bits 1–8 of line TN from FIG. 19, and the eight Y outputs to the leads for the eight bits 5-C of line SDAT. The IG and 2G enable inputs are connected together to lead RATNMAP* from line LOG.

A buffer unit Z60 comprises one tristate inverting octal buffer chip type 54LS240. The input 1A1 is connected via lead L74 to the DO output of the memory Z74, input 1A2 to lead MAPREQ from line LOG. input 1A3 open and not used, and input 1A4 is connected to the lead TNO for bit 0 of line TN. The enable input 1G for the four buffers of the first set is connected to lead RATNMAP* from line LOG. The 1Y outputs 1, 2 and 4 are connected to the leads for bits 0, 1 and 3 of line SDAT. The four 2A inputs are connected to the output of the counter Z441, and the 2Y outputs.to the leads for the four bits 0–3 of line SDAT. The 2G enable input for the second set of four buffers is connected to lead RGTNMAP* from line LOG.

A buffer unit Z76 comprises two type 54LS240 tristate inverting octal buffer chips. All of the enable inputs 1G and 2G are connected together to lead MAPREQ* from line LOG. Nine of the A inputs are connected to the leads for bits 0–8 of line SADR, and the corresponding Y outputs are to the leads for the bits 0–8 of the line A74. Four of the A inputs are connected to the leads for bits 0–3 of line SADR, and the corresponding Y outputs are connected to the leads for bits 0–3 of line A59.

Figure 22B:
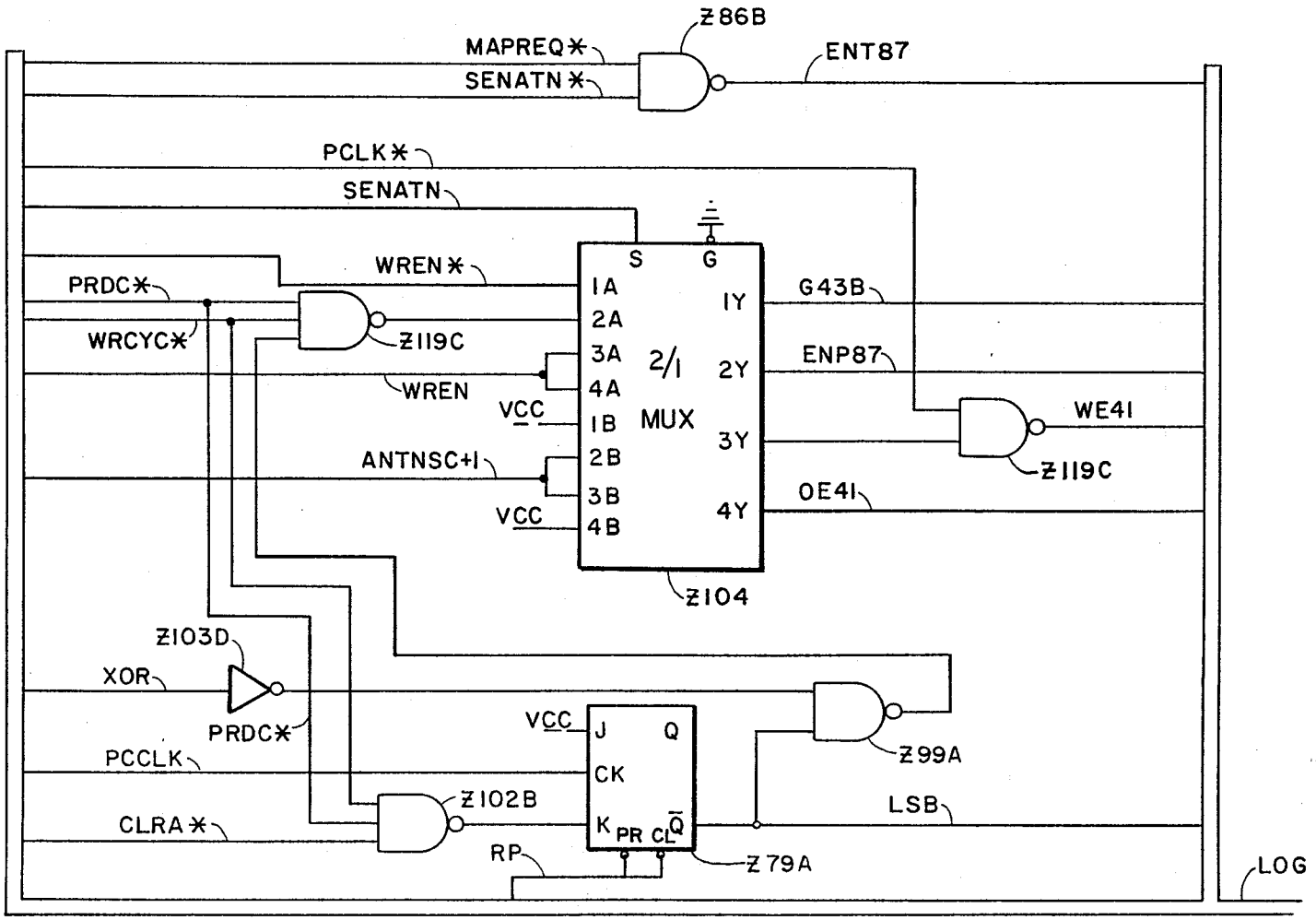

The circuits of the logic block F22 are shown in FIGS. 22A and 22B.

A Programmed array logic chip Z91 type 12L6 is programmed as follows:

V=AB*+A*B+I*J+CD*

W=EF*+I*J*

X=AB*+CD*

Y=G*H*L*+G*H*K+G*KL

Z=G*HL*+G*K*L

A programmed array logic chip Z28 type 10L8 is programmed as follows:

S=ABCDE*GH*I*

T=AB*CDE*GH*I*

U=A*B*CDE*GH*I*

W=A*BCDE*GH*J*

X=A*BC*D*E*GH*J*

Y=ABC*D*E*GH*J*

Z=AB*C*D*E*GH*J*

A type 54LS273 octal D flip-flop chip Z90 has the clear input to VCC, and its clock input on lead CCLK via line LOG from a type 5S00 NAND gate Z117B. The ID input is connected to lead ENATN+1 which comes from the last Q output of the store unit Z39 in FIG. 22 via line LOG. The IQ output is connected to the 2D input, and also to lead SENATN of line LOG, via a type 54LS240 inverting buffer Z92C to lead SENATN* of line LOG, to an input of a type 54LS00 NAND gate Z201C. and to input B of the logic unit Z91. The 2Q output is connected via a type 54LS04 inverter Z19C to the other input of NAND gate Z201C. and to the A input of logic unit Z91. The output of gate Z201C is lead CLRTN* via line LOG and FIG. 22 to FIG. 20. The 3D input of unit Z90 is from the output of a flip-flop Z106B. Flip-flops Z106A and Z106B are on a type 54LS74 chip. The 3Q output of unit Z90 is to the C input of the logic unit Z91, and also to the 4D input. The 4Q output goes to the D input of the logic unit Z91, and also via an inverter to the clear pin of flip-flop Z106B. The 5D input is from the lead FRSTCMD* via a type 54LS240 inverting buffer Z92H. The 5Q output goes to the 6D input, to the E input of the logic unit Z91, and via lead E to an input of a type 54LS201A NAND gate Z201A. The 6Q output goes to the F input of the logic unit Z91, and via lead F and a type 54LS02 gate Z200B connected as an inverter to another input of gate Z201B. The 7D input is connected to the DO output of the memory Z74 in FIG. 22 via line L74 and line LOG. The 7Q output goes to the K input of logic unit Z91, and to an input of a type 54S86 Exclusive-Or gate Z85D. The 8D input is grounded and its output not used.

The flip-flop Z106B has its D and preset inputs to lead RP via resistor Z120 to +5 volts. The clock input is from lead WATNMC* via line LOG from the W output of logic unit Z28.

Clock and synchronization circuits are shown at the left of FIG. 22A. A type 54S374 flip-flop Z83D has its clock input from lead PCLK. Its Q output is connected via a type 54LS240 inverting buffer Z92G to the D input, to an input of a type 54S00 NAND gate Z86D, and to an input of a type 54S00 NAND gate Z117B. The output of the inverter Z92G also goes to an input of a type 54LS08 AND gate ZI05B, and to an input of a NAND gate Z86C. An AND gate Z105C has one input from lead WRCYC from a flip-flop Z106A, another input from lead MAPREQ* from the Q* output of a flip-flop Z107A, and its output to an input of the gate Z86D, and also to an input of the gate Z105B. The output of gate Z86D is lead WREN*, and via an inverter Z118F to lead WREN. A NAND gate Z117A has one input from gate ZI05B, another input from lead PCLK*, and its output to an input of a type 54LS08 AND gate Z112D. Gate Z112D has another input from lead WATNMAP* via line LOG from the V output of the logic array Z28. The output of gate Z112D is lead WRCYCEN* to line LOG. Another input of gate Z86C is lead SENATN* from the IQ output or the logic array Z90 via the inverter Z92C and line LOG. A NAND gate Z117C has inputs from lead PCLK* and the output of gate Z86C, and an output to lead PCCLK of line LOG. The output of gate Z117B is to lead CCLK of line LOG.

Exclusive-Or gate Z85D has its inputs from the 7Q output of flip-flop unit Z90, nd from the memory Z74 of FIG. 22 via lead L74 and line LOG. The output of gate Z85D is lead XOR of line LOG, and also goes to an input of an AND gate Z105A. The other input of gate Z105A is on lead LSB from the Q* output of a flip-flop Z79A in FIG. 22B. The output of gate Z105A is on lead MAPATN to line LOG, to the D input of flip-flop Z106A, and to an input of a type 54LS08 AND gate Z105D. The other input of gate Z105D is on lead CLRA* from the V output of the logic array Z91.

The Write Cycle flip-flop Z105B is part of a dual JK type 54LS109 chip having the J and K inputs respectively from the output of gate Z105D and lead CLRA*. The clock input is on lead CCLK from gate Z117B. The preset and clear inputs are to resistance+5 volts on lead RP. The Q output is on lead ATN of line LOG, and also to the J input of the logic array Z91.

The Flip-flop Z106A has it clock input on lead CCLK from gate Z117B, its preset input to lead RP, its clear input from the Q output of a flip-flop Z202A, and its Q and Q* outputs respectively to leads WRCYC AND WRCYC* of line LOG. Lead WRCYC also goes to the L input of the logic array Z91.

The Flip-flop Z202A is part of a dual JK type 54LS109 chip, having the J and K inputs respectively from the outputs of gates Z201B and Z201D. The clock input is on lead CCLK from gate Zl17B. The preset and clear inputs are to resistance +5 volts on lead RP. The Q output is to the clear input of flip-flop Z106A, and via a type 54LS240 inverting buffer Z92A to a light emitting diode L1. The Q* output is to lead IRATNM via lin LOG to an edge connector in FIG. 22. The output of gate Z201A goes to inputs of NAND gates Z201B and Z201D. Gate Z201B has its other input jon lead CLRB* from the X output of the logic array Z91. Gate Z201D has its other input from the output of a type 54LS02 NOR gate, which has inputs on leads EOD* and ATN from the buffer unit Z58 in FIG. 22 and flip-flop Z107B.

From the logic array Z91, the outputs are V to lead CLRA*, W via a type 54LS240 inverting buffer Z92F to the J input of a flip-flop Z107A, X to the K input of the flip-flop, and to lead CLRB*, Y to lead ENATNA*, and Z to lead ENATNB* of line LOG. The type 54LS109 flip-flop Z107A has its clock input from gate Z117B on lead CCLK via line LOG. The Q and Q* outputs are respectively to leads MAPREQ and MAPREQ*.

The programmmed array logic unit Z28 has all of its inputs from edge connectors shown at the lower left of FIG. 22 via line LOG, WRSTB* to J, RDSTB* to I COMON* to H, SADR bit 9* to G, and five SADR bits A*-E* to A-E. The outputs are S to ATNMAP*, T to RGTNM*, U to RGTNMAP*, V to WATNMAP*, W to WATNMAP*, X to WMTMC*, Y to WMTMAP*, AND Z to WCNTWD* of line LOG.

In the part of the logic block F22A shown in FIG. 22B, connected via line LOG to FIGS. 22 and 22A, a type 54LS109 JK flip-flop Z79A has its J input high at VCC, it clock input on lead PCCLK, it K input from the output of a type 54LS10 NAND gate Z102B, its preset and clear inputs to lead RP. Gate Z102B has its inputs from lead CLRA* and PRDC*. The Q* output of the flip-flop Z79A is to an input of a gate Z99A, and also via lead LSB and line LOG to the H input of the logic array Z91 and to gate Z105A in FIG. 22A. The type 54LS00 NAND gate Z99A has another input from lead XOR via a type 54S04 inverter Z103D. A type 54LS10 NAND gate Zl19C has inputs from leads PRDC*. WRCYC* and the output of gate Z99A.

A type 54LS157 quad 2-to-1 multiplex chip input 1A from lead WREN*, input 2A from the output of gate Z119C, inputs 3A and 4A from lead WREN, input IB high at VCC, inputs 2B and 3B from lead ANTNSC+1, and input 4B high at VCC. The outputs are 1Y-4Y to leads G43B, ENP87, an input of a gate Zl19C. and lead OE41. The type 54LS10 NAND gate has another input from lead PCLK*, and its output to lead WE41.

A type 54LS00 NAND gate Z86B has inputs from leads MAPREQ* and SENATN*, and its output to lead ENT87.

Leads OE41 and WE41 go to the output enable and write enable inputs OE and WE of the memory Z41 in FIG. 22. Leads ENT87 and ENP 87 go the the ENT and ENP inputs of the counter Z87 in FIG. 22.

60 line×1-bit Delay

Figure 23:
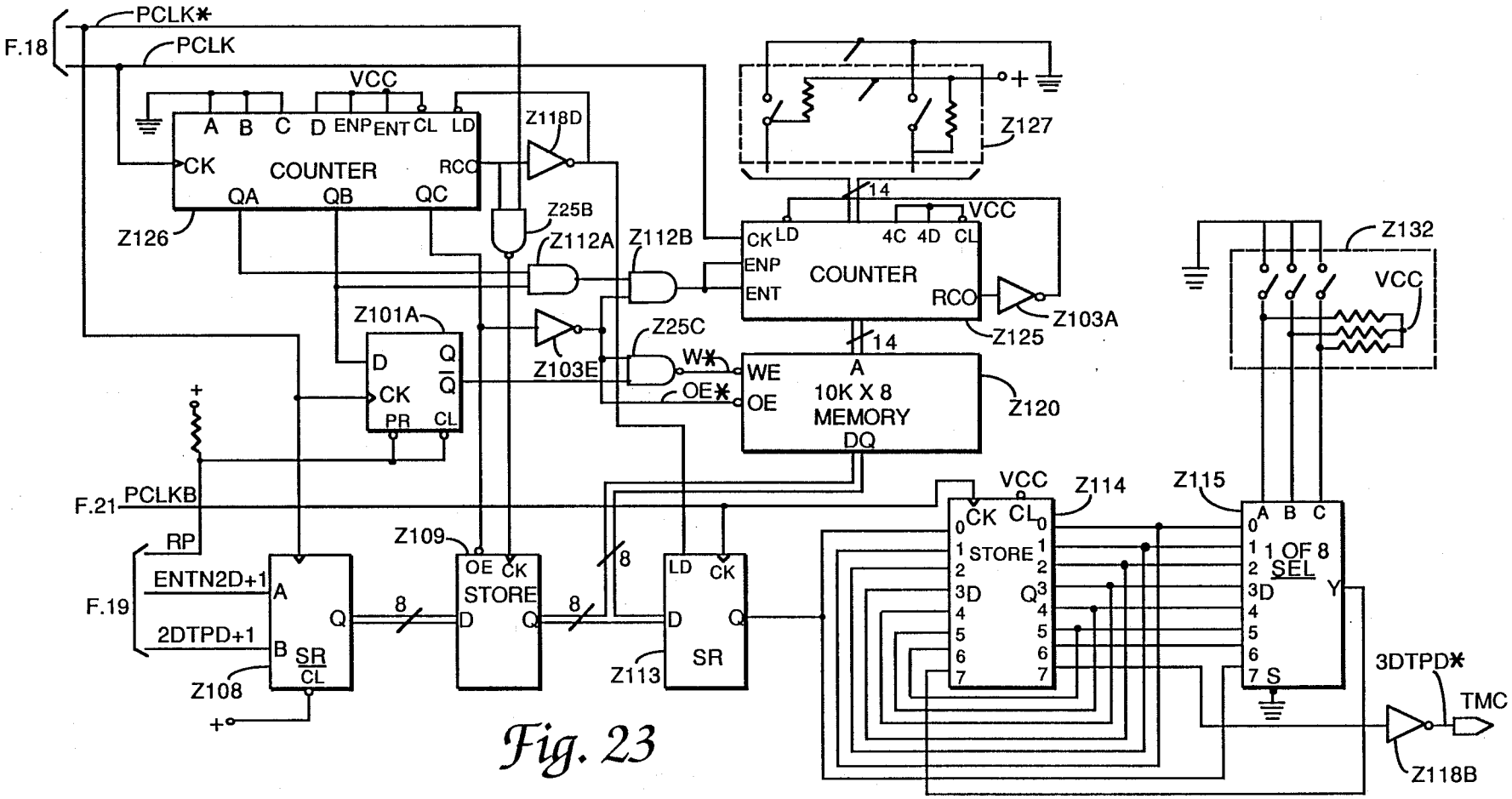

FIG. 23 shows the 60 line×1-bit delay (three-dimensional sync. memory) unit F23 of FIG. 18. A counter Z126 comprises one type 54LS163 chip having the A, B and C inputs grounded; the D, ENP, ENT and clear* inputs at VCC for high; the clock input to lead PCLK; the ripple carry out RCO to an input of a type 54LS00 NAND gate Z25B and also via a type 54LS04 inverter Z118D to the load input of the counter; the QA output to an input of an AND gate Z112A; the QB output to the other input of gate Z112A and also to the D input of a type 54LS74 flip-flop Z101A1, and the QC output to the input of a type 54S04 inverter Z103E and also to the OE input of a store unit Z109.

The flip-flop Z101A has the clock input from lead PCLK*, and the Preset and clear leads to RP for resistance +5 volts. The gate Z25B has another input from the clock lead PCLK* and a output to the clock input of store unit Z109. The output of the inverter Z103E goes to an input of a type 54S08 AND gate Z112B, to an input of a type 54LS00 NAND gate Z25C, and to the output enable pin of a memory Z120. Gate Z112B has its other input from the output of gate Z112A, and its output to the ENP and ENT inputs of a counter Z125. The other input of gate Z25C in from the Q* output of the flip-flop Z101A and its output to the write enable input of the memory Z120.

A 14-bit counter Z125 has four type 54LS163 counter chips, each having four pins 3, 4, 5 & 6 for inputs A-D. the C and D inputs of the last one along with the clear inputs of all four chips being at VCC for high, leaving fourteen inputs supplied from a unit Z127 comprising DIP switches to ground and DIP 1K pull-up resistors to VCC for high. The clock pin 2 of all three chips are connected to lead PCLK. The ten outputs from pins 14, 13, 12 & 11 of the first three chips and pins 14 & 13 of the last chip form a fourteen-bit line to the address inputs of the memory Z120. The ripple carry out RCO pin 15 of each counter chip is connected to the ENP & ENT pins of the next chip. The RCO pin of the fourth chip is connected via a type 54S04 inverter Z103A to load (L) pin 9 of all four chips.

The memory Z120 comprises five type MK4802J-1 2K×8 RAM chips and a type 54LS138 decoder chip to form a 10K×8 memory. For the address, eleven bits 0–10 are connected to the address of the five chips in parallel. The other three address bits go to inputs of the decoder, which has pin 4 at VCC and pins 4 & 5 grounded, with five Y outputs going respectively to the chip-select inputs of the memory chips.

A serial in, parallel out shift register Z108 comprises a type 54LS164 chip having the clock input to lead PCLK*, the A & B inputs to leads ENTN2D and 2DTpD+1 from FIG. 19, and the eight parallel Q outputs to the D inputs of a store unit Z109. Unit Z109 comprises a type 54LS374 octal flip-flop chip, having its Q outputs connected to the D/Q terminals of the memory Z120, and also to the inputs of a parallel in, serial out type 54LS166 shift register Z113. The clock input for shift register Z113 is from lead PCLKB from FIG. 21.

A store unit Z114 comprises a type 54LS273 octal D flip-flop chip having the clear* input to VCC, and the clock input from lead PCLKB. A type 54LS151 1-of-8 selector Z115 has its A,B & C select inputs connected in a unit Z132 to DIP switches for selective connection to ground, and via 1K pull-up resistors to VCC, so that the setting of the switches selects on of the eight inputs of the selector Z115. The Q output of the shift register Z113 is conected to the DO input of the store unit Z114, and also to the D7 input of the selector Z115. Six Q outputs 0–5 of the store Z114 are connected back to its D inputs 1–6, and also to the D inputs 0–5 of the selector Z115. The Q6 output of the store Z114 is connected only to the D6 input of the selector. The Y output of the selector Zl15 is connected to the D7 input of the store Z114, and the D7 output of the store Z114 is connected via a type 54LS04 inverter Zl18B to a lead 3DTPD* to an edge connector.

TARGET MEMORY/CONTROLLER

Figure 24:
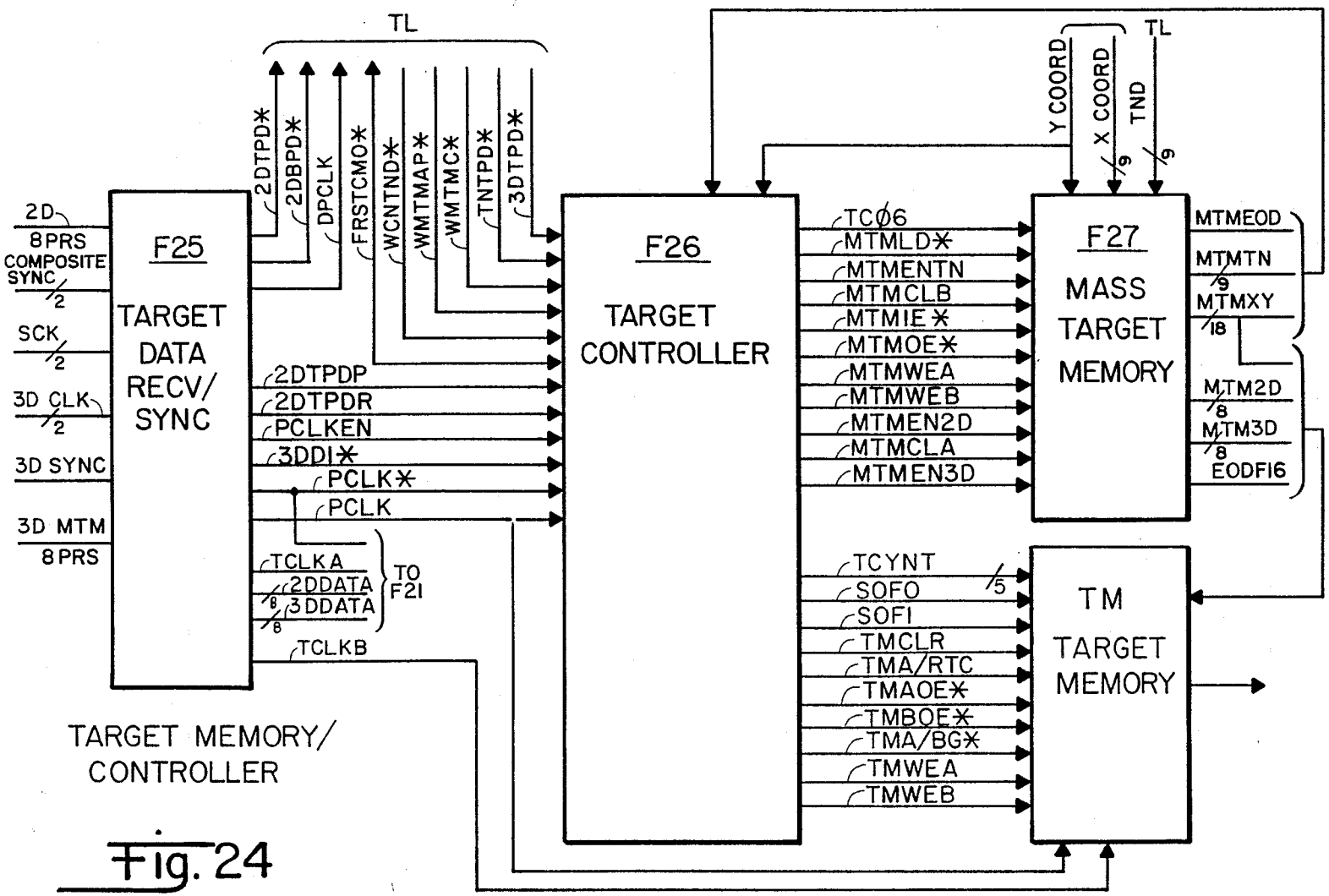
FIG. 24 is a block diagram of a specific embodiment of a target (segment) memory/controller.

A block diagram of the wirewrap circuit board for the target memory/controller is shown in FIG. 24. It comprises the target data receiver/synchronizer F25, the target controller F26, the mass target memory F27, and the target memory F22 (see segment memory SM in FIG. 7).

The segment labeler subelement descriptions follow.

Target Data Receiver/Synchronizer

The target data receiver/ synchronizer F25 (functional block diagram in FIG. 25) includes a line-receiver block Z'166 comprising five type AM26LS32 quad line-receiver chips. The inputs are in the form of balanced pairs with a shunt resistor across each pair. There are eight pairs for the 2D line, eight pairs for the 3DMTM line, one pair for composite sync, one pair for the system clock SCK, one pair for the 3D clock, and one pair for the 3D SYNC. The outputs of the line receivers are single ended.

For the 2D line, the eight ouput leads from the line receivers go to the D inputs of a type 54LS273 octal flip-flop chip Z'205, whose Q outputs go to the D inputs of another chip Z'204 of the same type. The Q outputs of the flip-flops of chip Z'204 are an 8-bit line 2DDATA to FIG. 27. The leads for bits 4–7 are also used for logic which includes a programmed array logic chit Z'78. A type 54LS02 NOR gate Z'21B has inputs for bits 4 & 7 and output to input A of the logic array. The leads for bits 6 & 5 are connected respectively to the B & C inputs of the logic array. The leads for bits 6 & 7 are connected to the inputs of a type 54LS00 NAND gate Z'64A, whose output is coupled via a type 54LS04 inverter Z'46F to lead 2DTPDD to FIG. 26B. The W output of the array logic Z'78 goes via lead 2DDTPDR to FIG. 26B, and also via a type 54LS04 inverter Z'83A and lead 2DTPD* to the target labeller board TL of FIG. 18. The X output of the logic Z'78 goes via lead 2DBPD* to the target labeller TL.

For the 3DMTM line, the eight output leads from the line receivers go to the D inputs of a type 54LS273 octal flip-flop chip Z'182, whose Q outputs go in parallel to the D inputs of two type 54LS374 octal tristate D flip-flop chips A'193 and Z'181. The Q outputs of these two flip-flops are connected together to an 8-bit line to the D inputs of a type 54LS273 octal flip-flop chip Z'180, whose Q outputs are an 8-bit line 3DDATA to FIG. 27.

The output of the Composite Sync line receiver goes to the D input of a type 54LS74 flip-flop Z'206A, whose Q output goes to the the D input of the other flip-flop Z'206B on the same chip. The outputs Q of flip-flop Z'206B and Q* of flip-flop Z'206A go to separate inputs of a type 54LS00 NAND gate Z'207B, whose output is connected to the J input of a type 54LS109 JK flip-flop Z'192B. The K input of flip-flop Z'192B is grounded, and the Q & Q* output leads are designated OE0 & OE1 respectively.

The output of the line receiver for the system clock (SCK) goes via a type 54LS04 inverter to lead SCK*, which provides the clock signal to flip-flops Z'206A, Z'206B and Z'192 for composite sync. The output of inverter Z'142A also is buffered via type 54S04 inverters Z'65C in tandem with two inverters in parallel shown as a single device Z'65D, to lead PCLK*, which goes to FIGS. 26A, 26C, 26D & 27; and also to inverters and gates Z'45C, Z'65F Z'45A, and Z'45B. The chip Z'45 is type 54S00 NAND gates. The output of inverter Z'65F via lead DPCLK provides the data processing clock for the target labeler module TL of FIG. 18. Gate Z'45C is connected as an inverter to buffer the clock signal to lead PCLK, which provides the clock signal for flip-flops Z'81A, flip-flops Z'180, and the target memory TM in FIG. 24.

The three flip-flops Z'81A are part of a type 54LS273 chip, with the clock signal from lead PCLK. The Q3 output is connected via a type 54LS04 inverter Z'82F to gate Z'45D, and also to the D3 input to provide a (PCLK/2) function. A signal on lead TC/2EN from FIG. 26D provides another input to gate Z'45D, whose output on lead PCLKEN goes to FIG. 26C, and also to inputs of gates Z'45A and Z'45B. The output of gate Z'45A on lead TCCLKB goes to FIGS. 26A & 26C; and the output of gate Z'45B on lead TCCLKA goes to FIG. 27 and to the memory TM in FIG. 24.

The output of the 3D CLK line receiver is coupled via an inverter Z'142F to lead 3DCLK*, which provides the clock signal to flip-flops Z'194A, Z'192 & Z'194B, and via another inverter Z'142C to flip-flop Z'192A.

The output of the 3D Sync line receiver goes to the D input of a type 54LS74 flip-flop Z'194A, whose Q output goes to the D input of the other flip-flop Z'194B on the same chip. The outputs Q of flip-flop Z'194B and Q* of flip-flop Z'194A go to separate inputs of a type 54LS00 NAND gate Z'207D, whose output is connected to the J input of a type 54LS109 JK flip-flop Z'192A. The K input of flip-flop Z'192A is grounded, and the Q & Q* output leads are connected respectively to inputs of type 54LS00 NAND gates Z'207B & Z'207C, each having another input from lead 3DCLK*, and outputs respectively to leads CK1 & CK2.

Flip-flops Z'213A & Z'213B on a type 54LS74 chip have clock inputs respectively from leads CK1 & CK0, and their D inputs in common from the Q output of flip-flop Z'194A. Type 54LS00 NAND gates Z'212A & Z'212B have inputs respectively from the Q outputs of flip-flops Z'213A & Z'213B, and the other inputs respectively from leads OE0 & OE1. A NAND gate Z'212C has inputs from gates Z'212A & Z'212B and output via lead 3DSYNC to the input D1 of flip-flops Z'81A. The Q1 output is connected to the D2 input. A type 54S00 NAND gate Z'103C has one input from the Q1 output of flip-flops Z'81A and the other input from the Q2 input via an inverter Z'82A, and its output via lead XYSYNC to the target memory TM in FIG. 24. The output of the inverter Z'82A also goes via lead 3DD1* to FIG. 26B.

The flip-flop units Z'193 and Z'181 have their clock inputs respectively from leads CK0 & CK1, and their output enable inputs respectively from leads OE0 & OE1.

Target Controller

The target controller F26 of FIG. 24 is shown in the functional block diagrams on four sheets FIGS. 26A–26D.

Figure 26A:
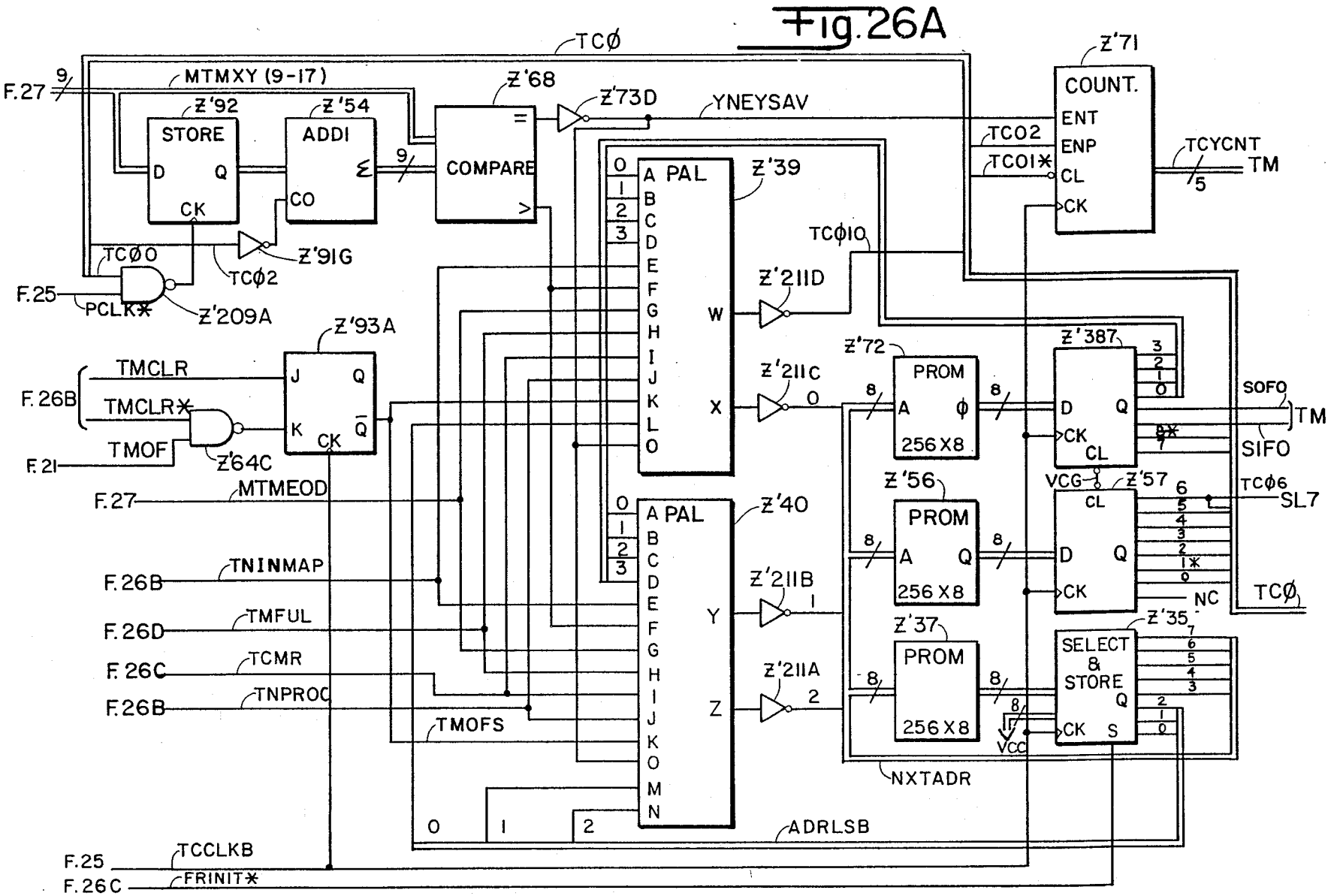

In FIG. 26A, there are two programmed array logic units Z'39 and Z'40 on type 16H2 chips. The logic for the unit Z'39 is as follows:

$$W = AB^*CG^*J + ABC^*E^*F^*G^* + A^*BCE^*F^*G^* + A^*B^*C$$

$$X = A^*B^*L + A^*BE + AB^*C^*H^*I + ABC^*EF^*G^* + ABC^*E^*F^*G^*J + AB^*CG^*J + ABCK$$

The logic for the unit Z'40 is as follows:

$$Y = B^*M + A^*BG^*F^* + ABCO + ABC^*E^*G^*F^*$$

$$Z = N$$

Figure 27:
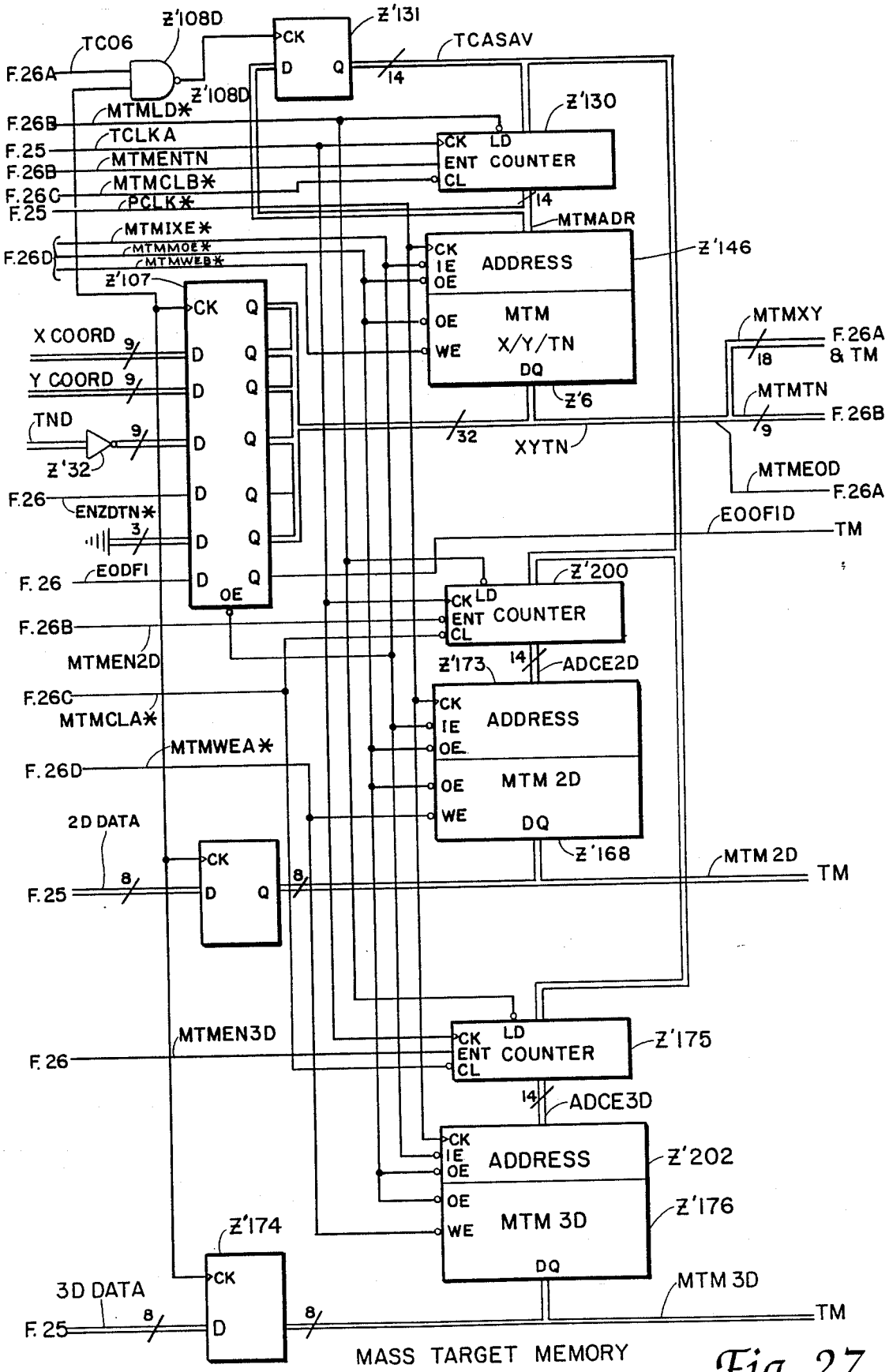

The leads for nine bits 9–17 of line MTMXY from FIG. 27 are connected to inputs of a store unit Z'92, and also to a comparator Z'68. The store unit Z'92 comprises a type 54LS273 octal D flip-flop chip plus one flip-flop type 54LS74. The clock input is supplied via a type 54S00 NAND gate Z'209A having inputs on leads TCØO (bit 0 of line TCØ) and lead PCLK* from FIG. 25.

The Q outputs of the store unit Z'92 go to an ADD 1 unit Z'54, which comprises two type 54LS283 adder chips plus one exclusive-or gate type 54LS08. The inputs are to the four A terminals of each adder chip and one input of the exclusive-or gate. The four B inputs of each adder chip are grounded. The CO input of the first adder chip is supplied from lead TCØ2 (bit 2 of line TCØ) via a type 54LS04 inverter Z'91G. The C4 terminal of the first adder chip is connected to the CO input of the second adder chip, and the C4 terminal of the second adder chip is connected to the other input of the exclusive-or gate. The nine outputs (four from each adder chip and one from the exclusive-or gate) go the a second set of inputs of the comparator Z'68.

The comparator Z'68 comprises three type 54LS85 4-bit compare chips. The first chip has A inputs for bits 9–12 of line MTMXY, B inputs from the first chip of the ADD 1 unit Z'53, pin 3 at VCC, pins 2 & 4 grounded, and pins 7, 6 & 5 connected respectively to pins 2, 3 & 4 of the third chip. The second chip has bit 13 to pin 4 and A inputs for bits 14–17 of line MTMXY. pin 7 and three B inputs from the second chip of the ADD 1 unit Z'53, the last B input from the exclusive-or gate of the ADD 1 unit, pin 3 grounded, and pins 7 & 5 connected respectively to pins 9 & 10 (B0 & A0) of the third chip. The third chip has three A and three B (bits 1–3 of each) inputs grounded, the "equal" output at pin 6 coupled via a type 54LS04 inverter Z'73D to lead YNEYSAV, and the "greater than" output at pin 5 to the F inputs of the logic arrays Z39 and Z'40. Lead YNEYSAV is connected to the 0 inputs of the two logic arrays and also to the ENT input of a counter Z'71.

Figure 26B:
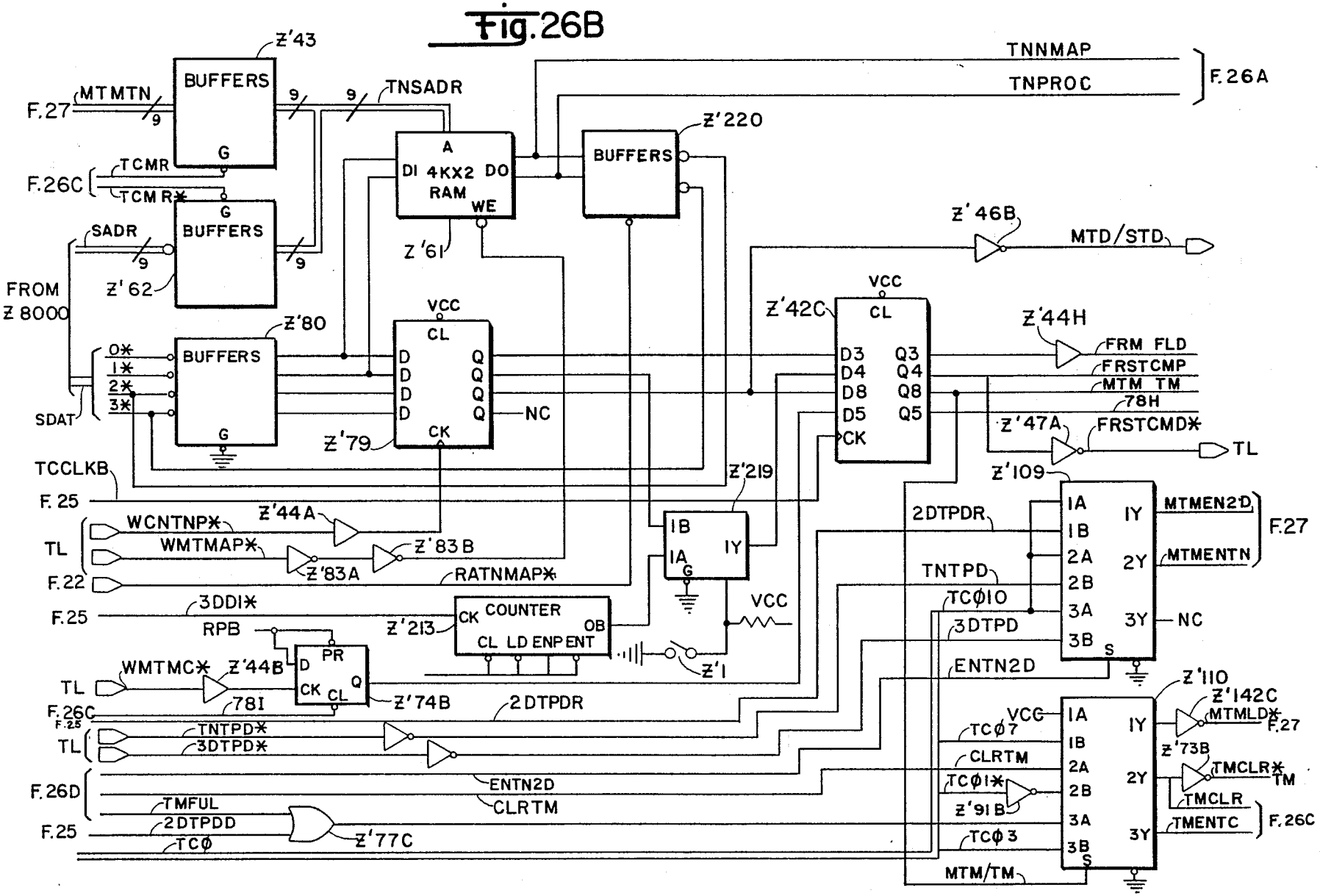

A type 54LS109 JK flip-flop Z'93A has its J input via lead TMCLR from FIG. 26B, its K input from a type 54LS00 NAND gate Z'64C having inputs on lead TMCLR* from FIG. 26B and lead TMOF from F21.

A counter Z'71 comprises a type 54LS163 4-bit counter chip, a type 54LS109 JK flip-flop to provide a fifth bit, a type 54LS04 inverter to the J input of the flip-flop, and a type 54LS10 NAND gate to the K input. Lead YNEYSAV is connected to the ENT input of the counter chip. Leads TCØ2 and TCØ1* (bits 2 and 1* of line TCØ) are connected respectively to the ENP and clear inputs of the counter chip and also to inputs of the NAND gate, with lead TCØ1* also connected to the inverter. The clock inputs of the counter chip and flip-flop ar connected to lead TCCLKB from FIG. 25. The load input pin 9 of the counter chip is to VCC. The ripple carry out of the counter chip goes to a third input of the NAND gate. The clear* and preset* input pins 15 & 11 of the flip-flop are point RPB resistance to VCC. The five outputs of the counter form line TCYNT to the target memory TM in FIG. 24.

There are three (256×8) memories Z'72, Z'56 and Z'37 on PROM chips type 5309-1 The eight address inputs of the three memories are in parallel from line NXTADR. Pins 15 and 16 of the three chips are grounded.

The 8-bit outputs of the two memories Z'72 and Z'56 go respectively to the D inputs of two type 54LS273 octal flip-flop chips Z'38 and Z'57. The clock inputs of the store units Z'38 and Z'57, and of a select and store unit Z'35 are from lead TCCLKB.

Figure 26C:
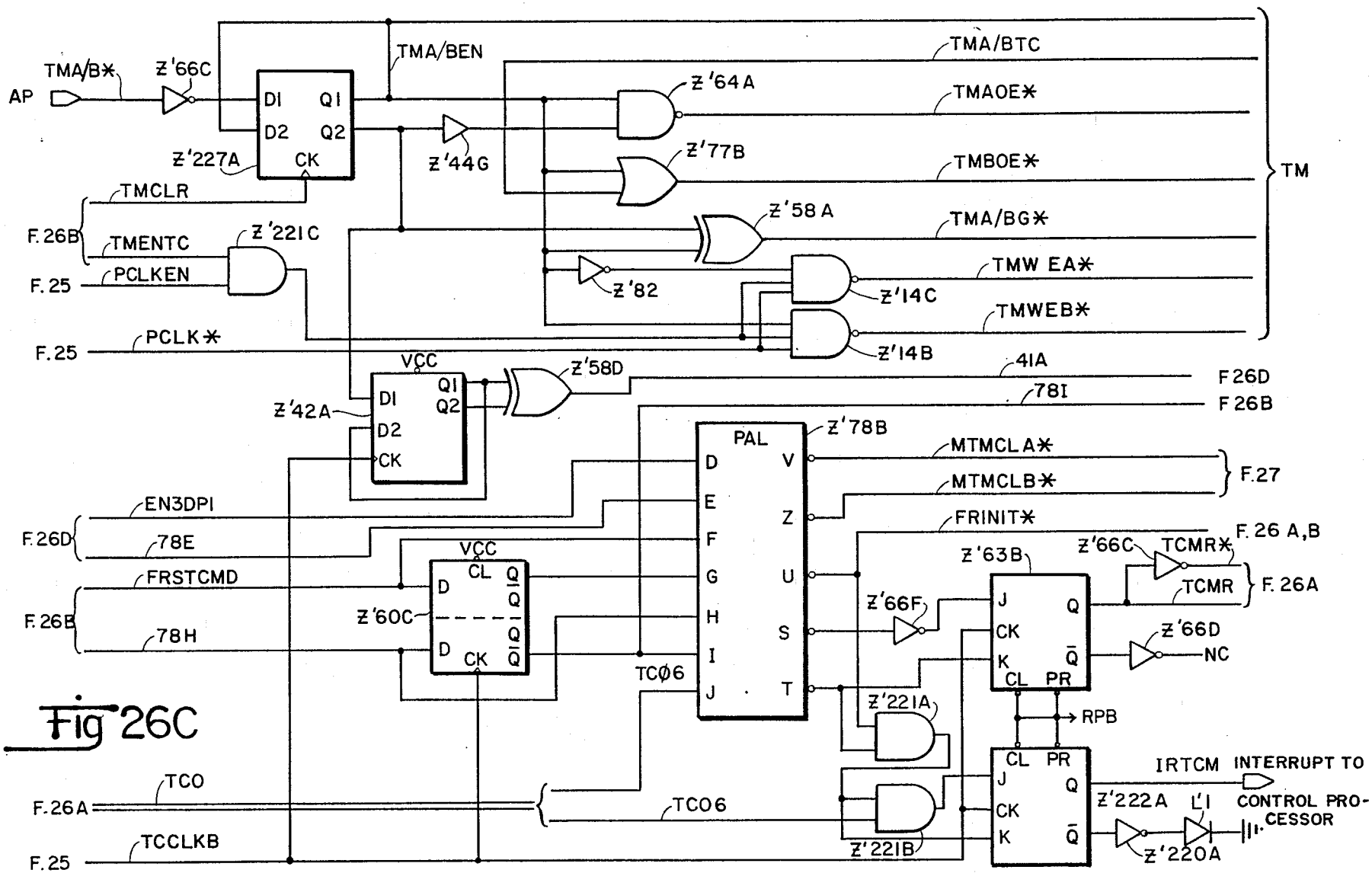
Figure 26D:
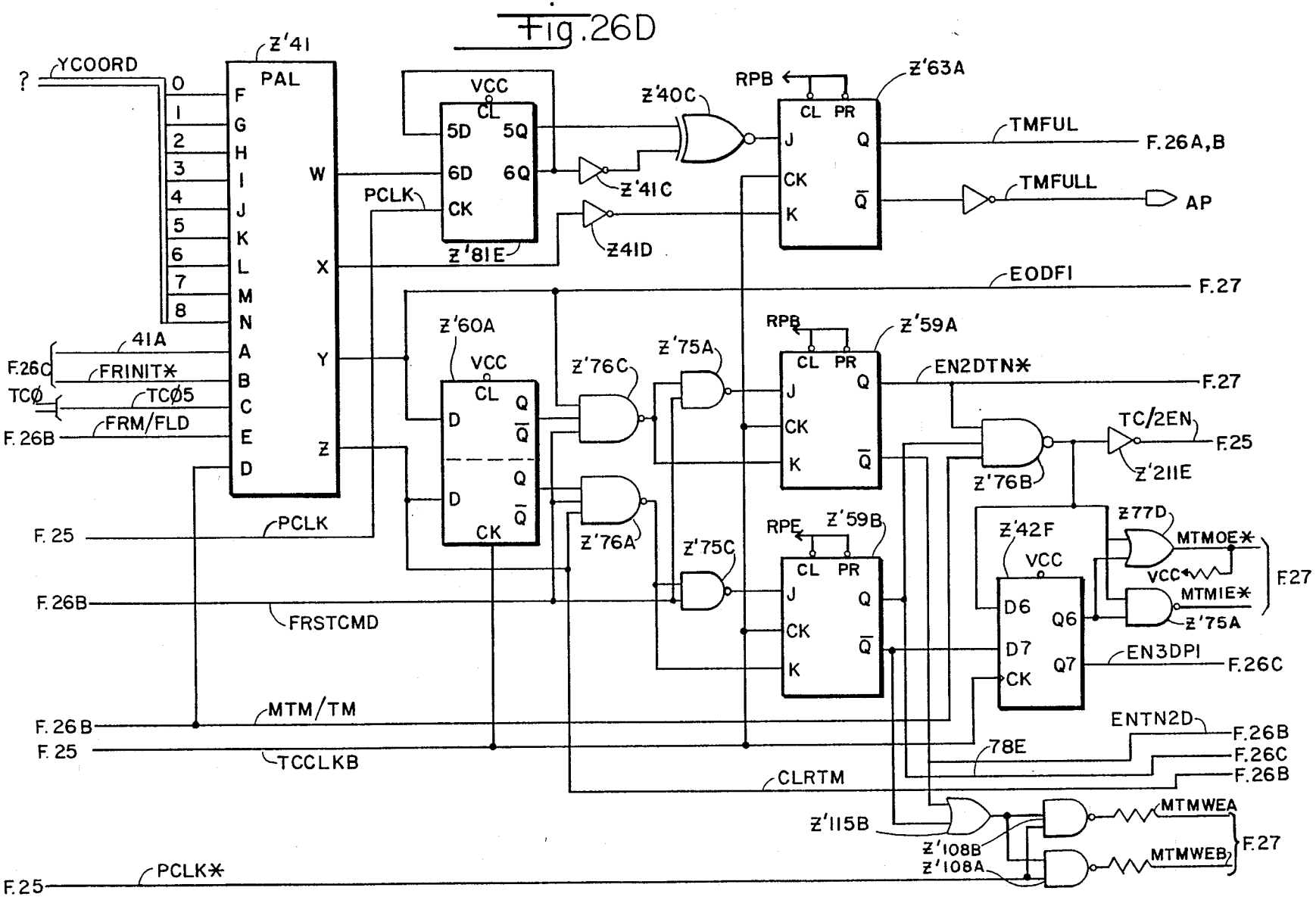

The select and store unit Z'35 comprises two type 54LS399 quad flip-flop chips with storage, having the the select input connected to lead FRINIT* from FIG. 26C. One set of eight inputs is connected to VCC for high, and the other set of eight inputs comes from the output of the third memory Z'37.

The Q outputs of the first four flip-flops of unit Z'38 are designated bits 3-1 to the D, C, B & A inputs respectively of the logic arrays Z'39 and Z'40. The fifth and sixth Q outputs are to leads SOFO and SlFO to the target memory TM in FIG. 25. The seventh and eighth Q outputs are designated bits 8* and 7 of the line TCØ.

From the store unit Z'57 the first seven Q outputs are designated bits 6, 5, 4, 3, 2, 1* & 0 of the line TCØ. The last Q output has no connection.

From the select and store unit Z'35, the first five outputs are to the leads for bits 7, 6, 5, 4 & 3 of line NXTADR. which provides the address inputs to the three memories Z'72. Z'56 and Z'37. Bit 0 for this address line is from the X output of the logic array Z'39 via a type 54LS04 inverter Z'211C. and bits 1 & 2 are via inverters Z'211B and Z'211A respectively from the Y and Z outputs of the logic array Z'40. The W output of the logic array Z'39 goes to the lead for bit 10 of line TCØ. The last three Q outputs of the select and store unit Z'35 go the the leads for bits 2, 1 & 0 of a line ADRLSB, connected respectively to the inputs N & M of logic array Z'40, and input L of the logic array Z'39.

The inputs of the array units Z'39 and Z'40 not already mentioned are in parallel, with input E to lead TNINMAP from FIG. 26B, input G to lead MTMEOD from FIG. 27, input H to lead TMFUL from FIG. 26D, input I to lead TCMR from FIG. 26C, and input J to lead TNFROC from FIG. 26B. Input K of the logic array Z'40 is connected to lead TMOFS.

FIG. 26B shows three buffer units Z'43, Z'62 and Z'80. Unit Z'43 comprises an octal non-inverting buffer chip type 54LS244, and one buffer from another like chip, with the gate inputs to lead TCMR from FIG. 26C. The nine inputs are on line MTMTN from FIG. 27. Units Z'62 and Z'80 comprise two octal inverting buffer chips type 54LS240. Unit Z'62 uses the eight buffers of one chip and one buffer from the other, with the gate inputs to lead TCMR* from FIG. 26C The buffer unit Z'80 comprises a set of four buffers on one of these inverting buffer chips with its gate input grounded. The nine inputs of unit Z'62 are line SADR, and the four inputs of unit Z'80 are line SDAT from the Z8000 (see FIG. 4).

A random access memory Z'61 comprises two type MD2147H-3 4K×1 bit RAM chips, to form a 4K×2 memory. Only nine address bits 0–8 of the twelve address inputs are used, with the inputs for bits 9–11 along with pin 10 for CS grounded. The nine outputs of the buffer unit Z'43 are connected in parallel with the outputs of units Z'62 as line TNSADR to the nine address inputs of the memory Z'61. The memory write enable input is coupled to lead WMTMAP* from the target labeller TL of FIG. 18 via two type 54LS244 inverting buffers Z'83A and Z'83B in tandem. The outputs of the first two buffers of unit Z'80 are connected to tbe DI inputs of the Memory Z'61, and all four outputs are connected respectively to the D inputs of four flip-flops of a unit Z'79. The two memory DO outputs are leads TNNMAP and TNPROC to FIG. 26A, and are also connected to two type 54LS240 inverting buffers of a unit Z'220. The outputs of these two buffers go to the leads for bits 2* and 3* of line SDAT at the input of the buffer unit Z'80. The gate input is connected to lead RATNMAP* from F22.

The store unit Z'79 is a type 54LS175 quad D flip-flop chip, having its clock input from the target labeller TL on lead WCNTND* via a type 54LS04 inverter Z'44A. The first Q output of unit Z'79 goes to the D3 input of a store unit Z'42C, the second Q output goes to the IB input of a selector unit Z'219, the third Q output is to the D8 input of unit Z'42C and also goes via an inverter Z'46B to a connector terminal on lead MTD/STD, and the fourth Q output has no connection.

Figure 25:
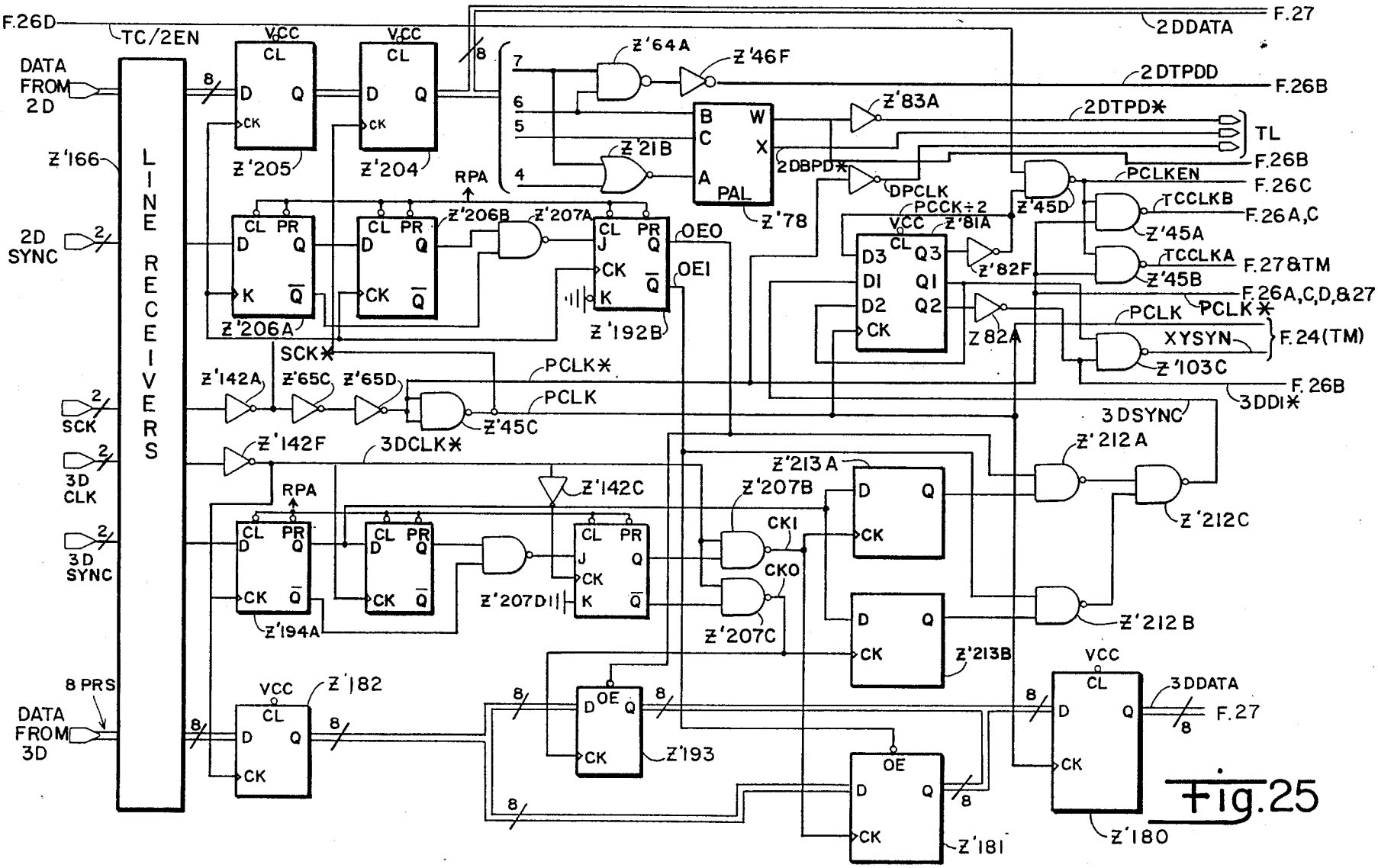
FIGS. 25, 26A, 26B, 26C, 26D and 27 together comprise a more detailed functional block diagram of the target memory/controller of FIG. 24.

A counter Z'213 comprises a type 54LS163 chip with its clock input via lead 3DD1* from FIG. 25, and its QB output to the 1A input of the selector Z'219.

The selector unit A'219 is part of a 54LS157 2-to-1 multiplex chip, having its gate input grounded. The control input at pin 1 is connected via a resistor to VCC for high, and may be connected to ground for low via a switch Z'l. The 1Y output goes to the D4 input of the store unit Z'42.

A type 54LS74 flip-flop Z'74B has its clock input from the target labeler TL on lead WMTMC* Via a type 54LS244 inverting buffer Z'44B. The d and preset inputs are high at point RPB resistance to VCC. The clear input is connected to lead 78I from FIG. 26C. The Q output goes to the D5 input of the store unit Z'42C.

The store unit Z'42C is part of a type 54LS273 flip-flop chip, having its clock input via lead TCCLKB from FIG. 25. The Q3 output goes via a type 54LS244 buffer Z'44H to lead FRM/FLD to FIG. 26B, and also to the target memory TM. The Q4 output goes via lead FRSTCMD to FIG. 26C. and also via a type 54LS04 inverter Z'47A and lead FRSTCMD* to the target labeller. The Q8 output goes via lead MTM/TM. The Q5 output goes via lead 78H to FIG. 26C.

There are two type 54LS157 quad two-to-one multiplex units Z'109 and Z'110, each having the 4A & 4B inputs grounded and the 4Y output not used. The unit Z'109 has the 1A. 2A & 3A inputs connected together to lead TCØ10 (bit 10 of line TCØ). The 1B, 2B & 3B inputs are respectively on leads 2DTPDR, TNTPD and 3DTPD. the first from FIG. 25, and the last two from the target labeler TL via type 54LS04 inverters. The select input is via lead ENTN2D from FIG. 26D. The 1Y and 2Y outputs are respectively on leads MTMEN2D and MTMENTN to FIG. 27. The 3Y output had no connection.

The unit Z'110 has the 1A input to VCC for high, the 2A input on lead CLRTM from FIG. 26, and the 3A input from a type 54LS32 OR gate Z'77C having inputs on lead TMFUL from FIG. 26D and lead 2DTPDD from FIG. 25. The 1B, 2B & 3B inputs are on leads TCØ7, TCØ1* via an inverter Z'91B, and TCØ3 of the line TCØ. The select input is via lead MTM/TM. The 1Y and 2Y outputs are respectively via type 54LS04 inverters Z'142C and Z'73B on leads MTMLD and TMCLR to FIG. 27 and the target memory TM. The 2Y output also goes via lead TMCLR to FIG. 26C. The 3Y output is via lead TMENTC to FIG. 26C.

In FIG. 26C, a programmed array logic unit Z'78B which is part of a type 10L8 chip is programmed as follows:

S=FG+J

T=ED+HI

U=FG

Z=V=FG+HI

The D & E inputs are from FIG. 26D via leads EN3-DPI & 78E respectively. From FIG. 26B, two leads FRSTCMD and 78H are connected respectively to inputs F & H and also to D inputs of flip-flops of a type 54LS175 unit Z'60C. The Q* outputs of these two flip-flops are connected respectively to inputs G & I of the logic array Z'78B. The J input is connected to the lead for bit 6 of line TCØ from FIG. 26C. The V and Z outputs of the logic array Z'78B go via leads MTMCLA* and MTMCLB* to FIG. 27. The U output goes via lead FRINIT to FIGS. 26A & 26B, and also to an input of a type 54LS08 AND gate Z'221A. The S output goes via a type 54LS04 inverter Z'66F to the J input of a type 54LS109JK flip-flop Z'63B. The T output goes to the K input of flip-flop Z'63B. and also to a second input of the gate Z'221A. The output of gate Z'221A goes to the input of an AND gate Z'221B. The other input of gate Z'221B is via a lead of line TCØ. A type 54LS109 flip-flop Z'222A has its J & K inputs connected respectively to the outputs of the gates Z'221B and Z'221B. The clock inputs for the flip-flops Z'60C, Z'63B and Z'2221A are via lead TCCLKB from FIG. 25. The Q output of flip-flop Z'63B is to lead TCMR, and also via an inverter Z'66C to lead TCMR* to FIG. 26A. The Q* output is to an inverter Z'66D which has no output connection. The Q output of flip-flop Z'222A is to lead IRTCM, and also via an inverter to lead SDATA*. The Q* output is via an inverter Z'220A to a light emitting diode L'1.

An input to the board on lead TMA/B* is connected via a type 54LS04 inverter Z'66C to the D1 input of a type 54LS175 flip-flop unit Z'226A. The Q1 output of this flip-flop is connected to the D2 input, to lead TMA/BEN to the target memory TM, to an input of a type 54LS00 NAND gate Z'64A, an input of a type 54LS32 OR gate Z'77B, to an input of a type 54LS86 exclusive-or gate Z'58A, via an inverter Z'82 to an input of a type 54LS10 NAND gate Z'14C, and to an input of a NAND gate Z'14B. The Q2 output is connected to a type 54LS04 inverter Z'44G, to another input of exclusive-or gate Z'58A, and to the D1 input of a type 54LS273 flip-flop unit Z'42A. The clock input of the flip-flop unit Z'227A is via lead TMCLR from FIG. 26B. The output of the inverter Z'44G is connected to the other input of gate Z'64A, to another input of gate Z'77B, and via lead TMA/BTC to the target memory TM. Leads TMENTC from FIG. 26B and PCLKEN from FIG. 25 are connected as inputs to a type 54LS08 AND gate Z'221C, whose output is connected to inputs of gates Z'14C and Z'14B. These two gates also have inputs connected to lead PCLK* from FIG. 25. The outputs of the gates Z'64A, Z'77B, Z'58A, Z'14C and Z'14B are respectively via leads TMAOE*, TMBOE*, TMA/BG*, TMWEA* and TMWEB* to the target memory TM.

The flip-flop unit Z'42A has the Q1 output connected to the D2 input. The clock input is on lead TCCLKB. The Q1 and Q2 outputs are inputs of an exclusive-or gate Z'58D, whose output goes via lead 41A to FIG. 26D.

In FIG. 26D, a programmed array logic unit Z'41 which is a type 14H4 chip is programmed as follows:

W=E*F*G*HI*JKL*MN*+D*EF*G*-
H*IJ*KLM*N+CDE

X=E*FGH*I*J*K*LMN*+D*EFG-
HI*J*K*L*MN+B*DE

Y=E*F*G*HI*JKL*MN+EF*G**H*IJ*KLM*N

Z=E*FGH*I*J*K*LMN*+D*EFH-
GHI*J*K*L*MN*+DEFG*H*IJK*L*M*

The nine inputs F–N are connected to the leads for bits 0–8 of line YCOORD. The inputs A, B, C, D & E are connected respectively to leads 41A of FIG. 26C. FRINT* of FIG. 26C, TCØ5 of FIG. 26A, MTM/TM of FIG. 26B and FRM/FLD of FIG. 26B.

Output W of the logic array is connected to the input 6D of a type 54LS273 flip-flop unit Z'81E, which has the 6Q output connected to the 5D input. The outputs 6Q via an inverter Z'41C and 5Q directly are connected to inputs of a type 54LS02 NOR gate Z'40C. The clock input of the flip-flop unit Z'81E is from FIG. 25 via lead PCLK.

A type 54LS109 JK flip-flop unit Z'63A has its J input from gate Z'40C, and its K input from the X output of the logic array Z'41 via an inverter Z'41D. The Q output is to lead TMFUL of FIG$. 26A & B. The Q* output is via an inverter to a connector lead TMFULL. The clock input from FIG. 25 on lead TCCLKB goes to flip-flop units Z'60A, Z'63A, Z'59A, Z'59B, and Z'42F.

A unit Z'60A comprising two flip-flops on a type 54LS175 chip has the D inputs connected to outputs Y and Z of the logic array Z'41. The Y output is also connected to lead EODFI to FIG. 27, and to an input of a type 54LS10 NAND gate Z'76C. The Z output is also connected to an input of a NAND gate Z'76A, and to via lead CLRTM to FIG. 26B. The gates Z'76C and Z'76A respectively have inputs to the Q* outputs of the flip-flops of unit Z'60A. From FIG. 26B a lead FRSTCMD is connected to inputs of each of the gates Z'76C. Z'76A, Z'75A and Z'75C.

Two flip-flops Z'59A and Z'59B comprise a type 54LS109 dual JK chip. The outputs of gates Z'76C and Z'76A are connected respectively directly to the K inputs of the flip-flops Z'59A and Z'59B, and via gates Z'75A and Z'75C to the J inputs. The Q output of flip-flop Z'59A is connected to lead EN2DTN* to FIG. 27, and also to an input of a NAND gate Z'76B; and its Q* output is connected via lead ENTN2D to FIG. 26B, and to an input of a type 54S32 OR gate Z'115B The Q output of flip-flop Z'59B is connected to lead 78E to FIG. 26C, and also to an input of gate Z'76B; and its Q* output is connected to input D7 of the flip-flop unit Z'42F. and to another input of gate Z'115B.

Gate Z'76B has a third input from FIG. 26B via lead MTM/TM; and its output is connected to an inverter Z'211E, the D6 input of the flip-flop unit Z'42F, to an input of a type 54LS32 OR gate Z'77D, and to an input of a type 54LS00 NAND gate Z'75A. The gates Z'77D and Z'75A each have an input connected to the Q6 output of the flip-flop unit Z'42F. The output of the inverter Z'211E is lead TC/2En to FIG. 25. The output of gate Z'77D has a pull-up resistor to VCC, and is connected to lead MTMOE* to FIG. 27. The output of gate Z'75A is to lead MTMIE to FIG. 27. The Q7 output of the flip-flop unit Z'42F is on lead EN3DP1 to FIG. 26C.

A type 54S32 OR gate Z'115B, with inputs from the Q* outputs of flip-flops Z'59A and Z'59, has an output to inputs of both of a pair of type 54LS00 NAND gates Z'108B and Z'108A. These NAND gates also each have an input to the clock lead PCLK* and respective outputs via 33-ohm series resistors to leads MTMWEA and MTMWEB to FIG. 27.

Mass Target Memory

The mass target memory F27 of FIG. 24 is shown by a functional block diagram in FIG. 27. The memory Z'6 comprises thirty-two type MK4802J-1 2K×8-bit RAM chips organized to form a 16K×32-bit memory. An address block Z'146 for the memory includes eleven buffers on two type 54LS244 chips coupling bits 0–10 of an address line MTMADR via 33-ohm series resistors to the address inputs of all thirty two chips. The gate inputs of these buffers are grounded. The address block also includes a type 54LS138 decoder having eight outputs in series with 33-ohm resistors, each going to the chip enable inputs CE of a set of four chips. The three bits 11–13 of line MTMADR are coupled via type 54LS244 buffers to the input of !he decoder, the gate input for these buffers shown as OE being connected to lead MTMOE* from FIG. 26D. A set of three type 54S374 flip-flops has its D inputs and Q outputs connected respectively in parallel with the inputs and outputs of the buffers for bits 11–13, these flip-flops having a clock input via lead PCLK* and an enable input at pin 1 shown as IE connected to lead MTMIE*. The output enable and write enable inputs of all thirty-two of the chips of memory Z'6 are connected respectively to leads MTMOE* and MTMWEB*.

The 14-bit address on line MTMADR is supplied from a counter Z'130, which comprises four type 54LS163A counter chips. The load, clock, and clear inputs to all four chips are respectively from leads MTMLD*, TCLKA, and MTMCLB*. The ENT input of the first chip is on lead MTMENTN, and the ripple carry out of each of the first three chips is connected to the ENT input of the next chip. The counter also includes a type 54LS10 NAND gate having inputs from the ripple carry out of the third chip and the leads for bits 12 and 13 of line MTMADR which are the A and B outputs of the fourth chip. The output of the NAND gate goes to the ENP input of all four chips. Parallel inputs for the four counter chips are supplied from a 14-bit line TCASAV.

A store unit Z'131 comrises eight flip-flops of a type 54LS273 chip plus six flip-flops of a type 54LS174 chip. The clock input to both chips is from a type 54S00 NAND gate Z'108D. which has inputs on leads TCØ6 and PCLK*. The D inputs are from the address line MTMADR, the Q outputs are to the address save line TCASAV.

A set of flip-flops Z'107 comprises four type 54LS374 chips, having the clock inputs connected to lead PCLK*, and output enable pins 1 connected to lead MTMIE*. Nine of the D inputs are from line XCOORD for bits 0–8, nine from line YCOORD for bits 9–17, nine from line TND via a set of nine type 54LS04 inverters Z'32 for the next nine bits, one D input from lead EN2DTN* for bit 27, three D inputs grounded for bits 28–30 and one D input on lead EODF1 for bit 31, for a total of thirty two. Thirty one of the Q outputs go to line XYTN, and the last one for bit 31 goes to lead EODFID. The line XYTN has thirty two leads connected to D/Q terminals of the memory. For output, line XYTN is divided into an 18-bit line MTMXY for bits 0–17 to FIG. 26A and the target memory TM, a 9-bit line MTMTN for the next nine bits to FIG. 26B, and one lead MTMEOD for bit 27 to FIG. 26A. Bits 28–31 are unused, three are grounded at the Z28 inputs and one floats, and the outputs are not used.

There are two additional memories Z'168 and Z'176 shown in FIG. 27, for two-dimensional and three-dimensional data storage respectively. Each of these memories comprises eight type MK4802J-1 2K×8-bit RAM chips organized to form a 2K×32-bit memory. Except for size, these two memories along with the address blocks Z'200 and Z'202, and counters Z'200 and Z'175 are the same as the corresponding units Z'6,Z'146 and Z'130. All three counters Z'130, Z'200 and Z'175 have 14-bit parallel inputs from line YCASAV. clock inputs from lead TCLKA, load inputs from lead MTMLD*, and clear inputs from lead MTMCLB*. The ENT inputs to the first chips of each of the two counters Z'200 and Z'175 are respectively on leads MTMEN2D and MTMEN3D. The three inputs shown as CK. IE and OE for ®ach of th®address blocks Z'200 and Z'175 are the same as for the address block Z'146. The memories Z'168 and Z'176 have the output enable from lead MTMOE*, and the wrlte enable from lead MTMWEA*.

There are two sets of type 54LS374 octal flip-flop units Z'172 and Z'174, having the clock inputs from lead PCLK*. The eight D inputs of unit Z'172 are on line 2DDATA from FIG. 25 and the Q outputs are to line MTM2D which is connected to the D/Q terminals for memory Z'168 and also to the target memory TM. The eight D inputs of unit Z'174 are on line 3DDATA from FIG. 25, and the Q outputs are to line MTM3D, which is connected to the D/Q terminals for memory Z'176 and also to the target memory TM.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed is:

1. A method for segment Iabeling and extracting which outputs segments of video data stored in a random access memory (RAM) for feature extraction and classification as targets, this function being accomplished by the steps:

labeling the segments of a video frame as the segments are stored in a mass segment memory, sorting the mass segment memory to extract individual segment data, and storing this data in a segment memory where it can be accessed by an algorithm processor:

wherein the step of labeling the segments includes using a segment labeler which consists of a segment label filter, adjacent label filter, memory, and sorter, the inputs to the segment labeler being a segment designator discrete which is set for only pixels which are in segments and a segment boundary designation discrete which is set for only pixels which are in segments and on the perimeter of the segment, the output of the segment labeler being a unique group of labels which define each segment, the segments then being passed on to a control processor and handed to a segment extractor upon request, for the steps of storing the segment intensity, position, status and label for all pixels in time sequence for a faame of data.

2. A screener post processor (FIGS. 5 and 6) for a target recognizer system, comprising a target laqbeler, target memory means, an algorithm procdssor, and a control processor;

wherein the target labeler includes targer filter means, adjacent boundary filter means, and adjacent target number sorter means;

wherein the target memory means includes a mass target memory, and two single target memories;

wherein the target labeler includes means for examining each pixel output from a pipeline video processor and storing into one of said two single segment memories only those which have been tagged by a 2-D pipeline for further evaluation, wherein the target labeler also includes means for appending an identification onto each pixel stored, which is sufficient to sort the stored data into single target groupings.

3. A screener post processor according to claim 2, wherein said target memory means further includes a hardware controller, and the mass target memory provides storage for two-dimensional and video pipeline data, target number labels and controller generated X, Y coordinates, wherein said hardware controller includes means for receiving groups of adjacent target numbers from a system (Z-8000) controller and for sorting the mass target memory data into candidate targets data which are loaded into one of the single memories;

wherein said two single target memories are configured to allow parallel processing time for the loading of one single target memory during the algorithm processing of the other.

* * * * *